US007002887B2

(12) United States Patent
Kakiuchi et al.

(10) Patent No.: US 7,002,887 B2
(45) Date of Patent: Feb. 21, 2006

(54) METHOD OF RECORDING DATA IN OPTICAL RECORDING MEDIUM AND AN APPARATUS FOR RECORDING DATA IN OPTICAL RECORDING MEDIUM

(75) Inventors: Hironori Kakiuchi, Tokyo (JP); Hiroyasu Inoue, Tokyo (JP)

(73) Assignee: TDK Corporation, Tokyo (JP)

( * ) Notice: Subject to any disclaimer, the term of this patent is extended or adjusted under 35 U.S.C. 154(b) by 6 days.

(21) Appl. No.: 10/886,948

(22) Filed: Jul. 7, 2004

(65) Prior Publication Data

US 2005/0094526 A1 May 5, 2005

(30) Foreign Application Priority Data

Jul. 7, 2003 (JP) ............................ 2003-271251

(51) Int. Cl.
*G11B 7/125* (2006.01)

(52) U.S. Cl. .................. 369/59.12; 369/47.5; 369/100

(58) Field of Classification Search ................ 369/100, 369/53.26, 59.1, 59.11, 59.12, 116, 47.5, 369/47.51, 275.1–275.5

See application file for complete search history.

(56) References Cited

U.S. PATENT DOCUMENTS 5,949,747 A * 9/1999 Miyashita et al. ....... 369/53.26

FOREIGN PATENT DOCUMENTS

JP 62-204442 9/1987

* cited by examiner

*Primary Examiner*—Ali Neyzari
(74) *Attorney, Agent, or Firm*—Seed IP Law Group PLLC

(57) ABSTRACT

A method for recording data in an optical recording medium according to present invention is constituted so that data are recorded in an optical recording medium including a light transmission layer and two recording layers by projecting a laser beam whose power is pulse-like modulated between a recording power and a bottom power lower than the recording power onto the optical recording medium from a side of the light transmission layer and forming recording marks having different lengths in the recording layers and that when a recording mark having a longer length than that of the shortest recording mark is to be formed in the recording layers by modulating the power of a laser beam using a single pulse, a time of raising the power of the laser beam to the recording power is delayed relative to a time of raising the power of the laser beam to the recording power when the shortest recording mark is to be formed. In the case of recording data in the optical recording medium in accordance with the thus constituted method for recording data in an optical recording medium, jitter of a reproduced signal obtained by reproducing the recorded data can be markedly reduced.

16 Claims, 38 Drawing Sheets

METHOD OF RECORDING DATA IN OPTICAL RECORDING MEDIUM AND AN APPARATUS FOR RECORDING DATA IN OPTICAL RECORDING MEDIUM

BACKGROUND OF THE INVENTION

The present invention relates to a method for recording data in an optical recording medium and an apparatus for recording data in an optical recording medium, and particularly, to a method for recording data in a write-once type optical recording medium, an apparatus for recording data in a write-once type optical recording medium and a write-once type optical recording medium which can reduce jitter of a reproduced signal.

DESCRIPTION OF THE PRIOR ART

Recently, optical recording media such as the CD, DVD and the like have been widely used as recording media for recording digital data. These optical recording media can be roughly classified into ROM type optical recording media such as the CD-ROM and the DVD-ROM that do not enable writing and rewriting of data, write-once type optical recording media such as the CD-R and DVD-R that enable writing but not rewriting of data, and data rewritable type optical recording media such as the CD-RW and DVD-RW that enable rewriting of data.

As well known in the art, data are generally recorded in a ROM type optical recording medium using pre-pits formed in a substrate in the manufacturing process thereof, while in a data rewritable type optical recording medium a phase change material is generally used as the material of the recording layer and data are recorded utilizing changes in an optical characteristic caused by phase change of the phase change material.

On the other hand, in a write-once type optical recording medium, an organic dye such as a cyanine dye, phthalocyanine dye or azo dye is generally used as the material of the recording layer and data are recorded utilizing changes in an optical characteristic caused by chemical change of the organic dye, or chemical change and physical change of the organic dye.

Further, there is known a write-once type recording medium formed by laminating two recording layers each containing an inorganic element (See Japanese Patent Application Laid Open No. 62-204442, for example) and in this optical recording medium, data are recorded therein by projecting a laser beam thereon and mixing elements contained in the two recording layers to form a region whose optical characteristic differs from those of regions therearound.

In this specification, in the case where an optical recording medium includes a recording layer containing an organic dye, a region in which an organic dye chemically changes or chemically and physically changes upon being irradiated with a laser beam is referred to as "a recording mark" and in the case where an optical recording medium includes two recording layers each containing an inorganic element as a primary component, a region in which the inorganic elements contained in the two recording layers as a primary component are mixed upon being irradiated with a laser beam is referred to as "a recording mark".

When recording marks are to be formed in a recording layer of an optical recording medium to record data therein, a laser beam whose power is modulated in accordance with a recording mark to be formed is projected onto the recording layer.

A method for modulating the power of a laser beam projected onto an optical recording medium for recording data therein is generally called a recording strategy. For example, in the case where the (1,7)RLL Modulation Code is employed, when a recording mark having a length corresponding to an nT signal where n is an integer from 2 to 8 is to be formed in a recording layer of an optical recording medium, the general is to divide a pulse for recording an nT signal into (n−1) divided pulses and set the power of the laser beam to a recording power Pw at the top of the divided pulse and set it to a bottom power Pb at the bottom of the divided pulse. The method for modulating the power of a laser beam in this manner is generally called a (n−1) recording strategy.

The (n−1) recording strategy is generally employed for recording an nT signal in an optical recording medium. However, in the case where data are to be recorded in an optical recording medium at a high linear recording velocity, it becomes difficult to divide a pulse for recording an nT signal into (n−1) divided pulses. Therefore, there has been proposed a recording strategy that modulates the power of a laser beam using a single pulse when a recording mark having a length corresponding to a 2T signal is to be formed or when a recording mark having a length corresponding to a 3T signal is to be formed, modulates the power of the laser beam using two pulses when a recording mark having a length corresponding to a 4T signal is to be formed or when a recording mark having a length corresponding to a 5T signal is to be formed, modulates the power of the laser beam using three pulses when a recording mark having a length corresponding to a 6T signal is to be formed or when a recording mark having a length corresponding to a 7T signal is to be formed, and modulates the power of the laser beam using four pulses when a recording mark having a length corresponding to an 8T signal is to be formed.

However, in the case where data are recorded in a recording layer of an optical recording medium by modulating the power of a laser beam using this recording strategy, since the power of the laser beam is modulated using a single pulse when a recording mark having a length corresponding to a 3T signal is to be formed as well as when a recording a mark having a length corresponding to a 2T signal is to be formed, the term during which the power of the laser beam is set to a recording power Pw inevitably becomes longer than that for forming a recording mark having a length corresponding to a 2T signal or that for forming a recording mark having a length corresponding to one of other signals. As a result, the front portion of the recording mark extends forward owing to the influence of heat transmitted from the immediately preceding recording mark formed in the recording layer and it becomes difficult to form a recording mark having a desired length, whereby jitter of a reproduced signal increases.

In particular, in an optical recording medium including a plurality of recording layers, when a recording mark having a length corresponding to a 3T signal is to be formed in a recording layer other than the recording layer farthest from the light incidence plane, since the front portion of recording mark tends to be influenced by heat transmitted from the immediately preceding recording mark formed in the recording layer, the recording mark becomes longer and jitter of the reproduced signal greatly increases.

More specifically, in an optical recording medium including a plurality of recording layers, each of recording layers other than the recording layer farthest from the light incidence plane through which a laser beam enters the optical recording medium is required to have high light transmittance since the laser beam passes therethrough when data are to be recorded in the recording layer farthest from the light incidence plane or when data recorded in the recording layer farthest from the light incidence plane are to be reproduced and, therefore, a reflective layer cannot be provided therein. Therefore, since heat generated in a region of the recording layer where a recording mark is to be formed by a laser beam projected thereonto for forming a recording mark cannot be transmitted through a reflective layer to other layers and heat is accumulated in the region of the recording layer where a recording mark is to be formed, the front portion of the recording mark is liable to be influenced by heat transmitted from the recording mark formed immediately before the formation of a recording mark in the recording layer. As a result, in the case where a recording mark having a length corresponding to a 3T signal is to be formed by modulating the power of a laser beam using a single pulse, the recording mark particularly tends to become longer and jitter of the reproduced signal becomes extremely worse.

SUMMARY OF THE INVENTION

It is therefore an object of the present invention to provide a method for recording data in an optical recording medium and an apparatus for recording data in an optical recording medium which can reduce jitter of a reproduced signal.

The inventors of the present invention vigorously pursued a study for accomplishing the above object and, as a result, made the discovery that when a recording mark having a length corresponding to a 3T signal was to be formed by modulating the power of a laser beam using a single pulse, if the time of raising the power of the laser beam to the recording power was delayed relative to the time of raising the power of the laser beam to the recording power when a recording mark having a length corresponding to a 2T signal was to be formed, it was possible to effectively prevent the front portion of the recording mark from being influenced by heat transmitted from the recording mark formed immediately before the formation of the recording mark in the recording layer and extending forwardly and markedly lower jitter of the reproduced signal obtained by reproducing thus recorded data.

Therefore, the inventors of the present invention continued their investigation and tried to record data at a higher linear recording velocity and reproduce data to measure jitter of a reproduced signal and, as a result, made the further discovery that in the case where a recording mark having a length corresponding to a 4T signal was to be formed by modulating the power of a laser beam using a single pulse, where a recording mark having a length corresponding to a 5T signal was to be formed by modulating the power of a laser beam using a single pulse and where a recording mark having a length corresponding to a 6T signal was to be formed by modulating the power of a laser beam using a single pulse, if the time of raising the power of the laser beam to the recording power was delayed relative to the time of raising the power of the laser beam to the recording power when a recording mark having a length corresponding to a 2T signal was to be formed, it was possible to effectively prevent the front portion of the recording mark from being influenced by heat transmitted from the recording mark formed immediately before the formation of the recording mark in the recording layer and extending forwardly and markedly lower jitter of the signal obtained by reproducing the thus recorded data and that in the case where a recording mark having a longer length than that of the shortest recording mark was to be formed in a recording layer of an optical recording medium by modulating the power of a laser beam using a single pulse in order to record data at a high linear recording velocity, if the time of raising the power of the laser beam to the recording power was delayed relative to the time of raising the power of the laser beam to the recording power when the shortest recording mark was to be formed, it was possible to effectively prevent the front portion of the recording mark from being influenced by heat transmitted from the recording mark formed immediately before the formation of the recording mark in the recording layer and extending forwardly and markedly lower jitter of the reproduced signal obtained by reproducing thus recorded data.

Therefore, the above object of the present invention can be accomplished by a method for recording data in an optical recording medium wherein data are recorded in an optical recording medium including a light transmission layer and at least one recording layer by projecting a laser beam whose power is pulse-like modulated between at least a recording power and a bottom power lower than the recording power onto the optical recording medium from a side of the light transmission layer and forming recording marks having different lengths, which method for recording data in an optical recording medium is constituted so that when a recording mark having a longer length than that of the shortest recording mark is to be formed in the at least one recording layer by modulating the power of a laser beam using a single pulse, a time of raising the power of the laser beam to the recording power is delayed relative to a time of raising the power of the laser beam to the recording power when the shortest recording mark is to be formed.

According to the present invention, in the case where data are recorded by forming a recording mark having a longer length that that of the shortest recording mark in the recording layer, jitter of a reproduced signal obtained by reproducing the recorded data can be markedly reduced.

In a preferred aspect of the present invention, the power of a laser beam is modulated between the recording power, the bottom power and an intermediate power lower than the recording power and higher than the bottom power.

In a preferred aspect of the present invention, the optical recording medium comprises a plurality of recording layers.

In a further preferred aspect of the present invention, at least a recording layer other than a recording layer farthest from the light transmission layer among the plurality of recording layers comprises a first recording film containing an element selected from a group consisting of Si, Ge, Sn, Mg, In, Zn, Bi and Al as a primary component and a second recording film disposed in the vicinity of the first recording film and containing an element selected from a group consisting of Cu, Al, Zn, Ti and Ag and different from the element contained as a primary component in the first recording film as a primary component and the element contained in the first recording film as a primary component and the element contained in the second recording film as a primary component mix with each other when a laser beam is projected onto the optical recording medium, thereby forming a recording mark.

In this specification, the statement that the first recording film contains a certain element as a primary component means that the content of the element is maximum among the elements contained in the first recording film, while the statement that the second recording film contains a certain element as a primary component means that the content of the element is maximum among the elements contained in the second recording film.

In this preferred aspect of the present invention, it is not absolutely necessary for the second recording film to be in contact with the first recording film and it is sufficient for the second recording film to be so located in the vicinity of the first recording film as to enable formation of a mixed region including the primary component element of the first recording film and the primary component element of the second recording film when the region is irradiated with a laser beam. Further, one or more other films such as a dielectric film may be interposed between the first recording film and the second recording film.

In a further preferred aspect of the present invention, the second recording film is formed so as to be in contact with the first recording film.

Although the reason why the element contained in the first recording film as a primary component and the element contained in the second recording film as a primary component mix with each other when irradiated with a laser beam and a recording mark is formed is not altogether clear, it is reasonable to conclude that the element contained in the first recording film as a primary component and the element contained in the second recording film as a primary component are partially or totally fused or diffused, whereby the element contained in the first recording film as a primary component and the element contained in the second recording film as a primary component mix with each other to form a recording mark.

In a further preferred aspect of the present invention, the first recording film contains Si as a primary component and the second recording film contains Cu as a primary component.

In a further preferred aspect of the present invention, one or more elements selected from the group consisting of Al, Zn, Sn Mg and Au are added to the second recording film.

In a further preferred aspect of the present invention, data are recorded in the optical recording medium by projecting a laser beam having a wavelength of 350 nm to 450 nm onto the optical recording medium.

In another preferred aspect of the present invention, data are recorded in the optical recording medium by employing an objective lens and a laser beam whose numerical aperture NA and wavelength $\lambda$ satisfy $\lambda/NA \leqq 640$ nm, and projecting a laser beam onto the optical recording medium via the objective lens.

The above objects of the present invention can be also accomplished by an apparatus for recording data in an optical recording medium, which comprises a laser beam source for emitting a laser beam, an objective lens, a laser power controlling means for pulse-like modulating a power of a laser beam emitted from a laser beam source between a recording power and a bottom power lower than the recording power, a memory and a control unit for controlling overall operation, the control unit being constituted so as to create, based on ID data recorded in the optical recording medium and stored in the memory, a recording strategy determined so that when a recording mark having a longer length than that of the shortest recording mark is to be formed in a recording layer of the optical recording medium by modulating the power of a laser beam using a single pulse, a time of raising the power of the laser beam to the recording power is delayed relative to a time of raising the power of the laser beam to the recording power when the shortest recording mark is to be formed, thereby forming a recording mark in the recording layer.

In a preferred aspect of the present invention, the laser power controlling means is constituted so as to modulate the power of a laser beam between the recording power, the bottom power and an intermediate power lower than the recording power and higher than the bottom power.

In a further preferred aspect of the present invention, a laser beam source is constituted so as to emit a laser beam having a wavelength of 350 nm to 450 nm.

In a further preferred aspect of the present invention, a wavelength $\lambda$ of a laser beam emitted from a laser beam source and a numerical aperture NA of the objective lens satisfy $\lambda/NA \leqq 640$ nm.

The above and other objects and features of the present invention will become apparent from the following description made with reference to the accompanying drawings.

DESCRIPTION OF THE PREFERRED EMBODIMENTS

Figure 1:
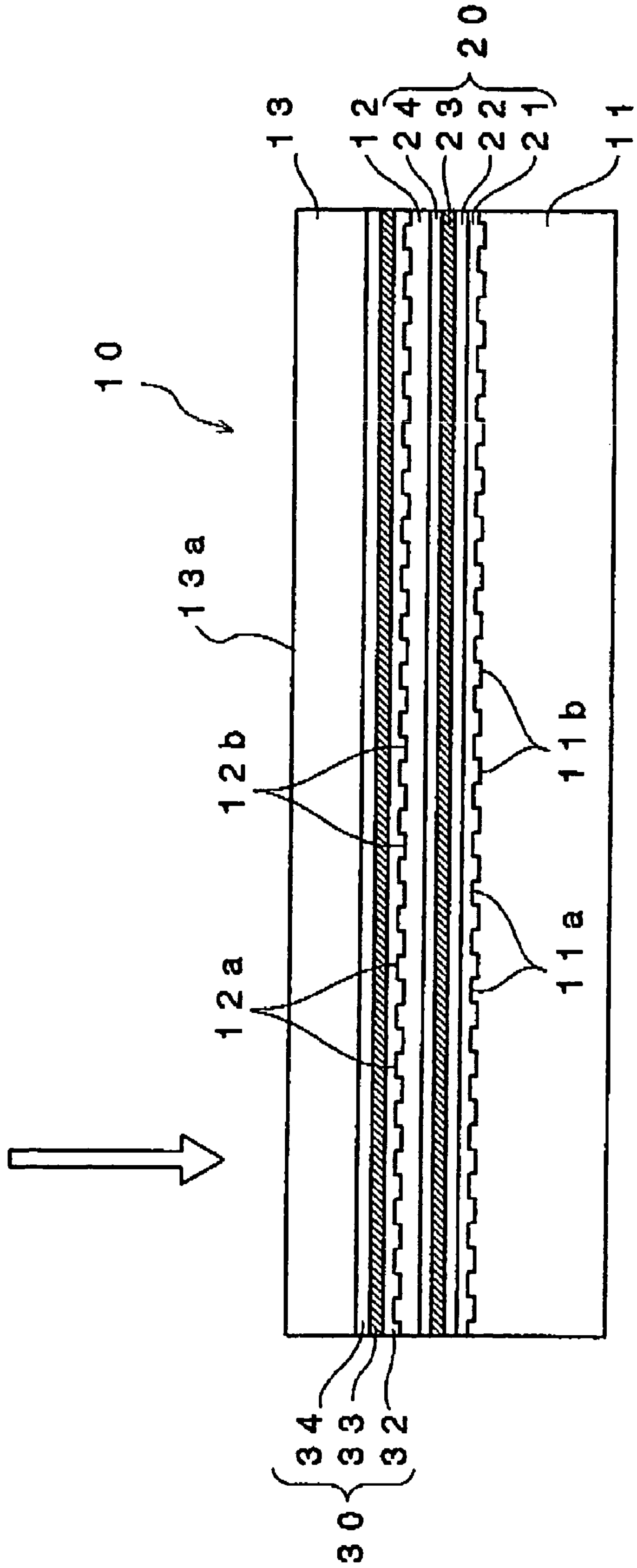
FIG. 1 is a schematic cross-sectional view showing an optical recording medium in which data are to be recorded by a method for recording data in an optical recording medium that is a preferred embodiment of the present invention.

FIG. 1 is a schematic cross-sectional view showing an optical recording medium in which data are recorded by a method for recording data in an optical recording medium that is a preferred embodiment of the present invention.

As shown in FIG. 1, the optical recording medium 10 is constituted as a write-once type optical recording medium and includes a disk-like support substrate 11, a transparent intermediate layer 12, a light transmission layer 13, an L0 layer 20 formed between the support substrate 11 and the transparent intermediate layer 12, and an L1 layer 30 formed between the transparent intermediate layer 12 and the light transmission layer 13.

The L0 layer 20 and the L1 layer 30 are recording layers in which data are to be recorded and therefore, the optical recording medium 10 according to this embodiment includes two recording layers.

The L0 layer 20 constitutes a recording layer far form the light transmission layer 13 and is constituted by laminating a reflective film 21, a fourth dielectric film 22, an L0 recording layer 23 and a third dielectric film 24 from the side of the support substrate 11.

On the other hand, the L1 layer 30 constitutes a recording layer close to the light transmission layer 13 and is constituted by laminating a second dielectric film 32, an L1 recording layer 33 and a first dielectric film 34 from the side of the support substrate 11.

The support substrate 11 serves as a support for ensuring mechanical strength required for the optical recording medium 10.

The material used to form the support substrate 11 is not particularly limited insofar as the support 11 can serve as the support of the optical recording medium 10. The support substrate 11 can be formed of glass, ceramic, resin or like. Among these, resin is preferably used for forming the support substrate 11 since resin can be easily shaped. Illustrative examples of resins suitable for forming the support substrate 11 include polycarbonate resin, acrylic resin, epoxy resin, polystyrene resin, polyethylene resin, polypropylene resin, silicone resin, fluoropolymers, acrylonitrile butadiene styrene resin, urethane resin and the like. Among these, polycarbonates resin is most preferably used for forming the support substrate 11 from the viewpoint of easy processing, optical characteristics and the like and in this embodiment, the support substrate 11 is formed of polycarbonate resin. In this embodiment, since a laser beam is projected via the light transmission layer 13 located opposite to the support substrate 11, it is unnecessary for the support substrate 11 to have a light transmittance property.

In this embodiment, the support substrate 11 has a thickness of about 1.1 mm.

As shown in FIG. 1, grooves 11*a* and lands 11*b* are alternately formed on the surface of the support substrate 11. The grooves 11*a* and/or lands 11*b* serve as a guide track for a laser beam when data are to be recorded in the L0 layer 20 or when data are to be reproduced from the L0 layer 20.

The depth of the grooves 11*a* is not particularly limited and is preferably set to 10 nm to 40 nm. The pitch of the grooves 11*a* is not particularly limited and is preferably set to 0.2 μm to 0.4 μm.

The transparent intermediate layer 12 serves as space the L0 layer 20 and the L1 layer 30 apart by a physically and optically sufficient distance.

As shown in FIG. 1, grooves 12*a* and lands 12*b* are alternatively formed on the surface of the transparent intermediate layer 12. The grooves 12*a* and/or lands 12*b* serve as a guide track for a laser beam when data are recorded in the L1 layer 30 or when data are reproduced from the L1 layer 30.

The depth of the grooves 12*a* and the pitch of the grooves 12*a* can be set to be substantially the same as those of the grooves 11*a* formed on the surface of the support substrate 11.

It is preferable to form the transparent intermediate layer 12 so as to have a thickness of 5 μm to 50 μm and it is more preferable to form it so as to have a thickness of 10 μm to 40 μm.

The material for forming the transparent intermediate layer 12 is not particularly limited and an ultraviolet ray curable acrylic resin is preferably used for the transparent intermediate layer 12.

It is necessary for the transparent intermediate layer 12 to have sufficiently high light transmittance since a laser beam passes through the transparent intermediate layer 12 when data are to be recorded in the L0 layer 20 or when data are to be reproduced from the L0 layer 20.

The light transmission layer 13 serves to transmit a laser beam and the light incident plane 13*a* is constituted by one of the surfaces thereof.

It is preferable to form the light transmission layer 13 so as to have a thickness of 30 μm to 200 μm.

The material for forming the light transmission layer 13 is not particularly limited and, similarly to transparent intermediate layer 12, an ultraviolet ray curable acrylic resin is preferably used for forming the light transmission layer 13.

It is necessary for the light transmission layer 13 to have sufficiently high light transmittance since a laser beam passes through the transparent intermediate layer 13 when data are to be recorded in the L0 layer or the L1 layer or when data are to be reproduced from the L0 layer or the L1 layer.

Figure 2:
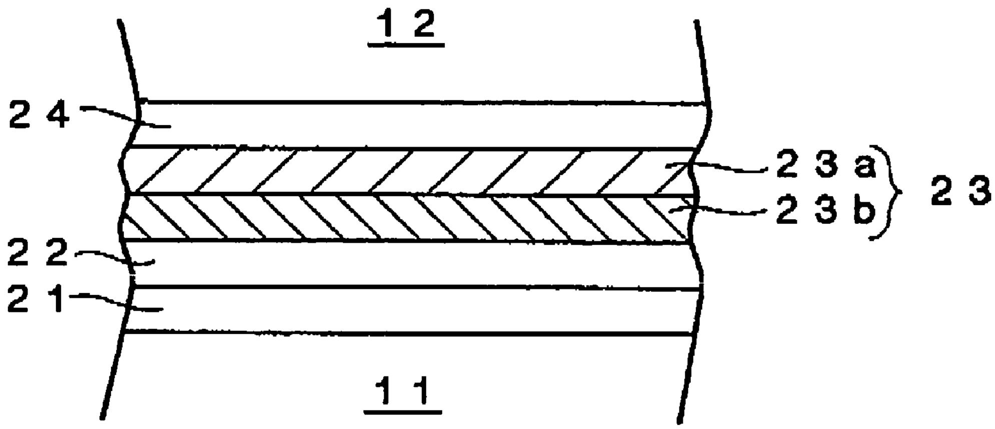
FIG. 2 is a schematic partial enlarged cross-sectional view showing an L0 layer of an optical recording medium shown in FIG. 1.

FIG. 2 is a schematic enlarged cross-sectional view showing the L0 layer 20 of the optical recording medium 10 shown in FIG. 1.

As shown in FIG. 2, the L0 recording layer 23 includes a first L0 recording film 23*a* and a second L0 recording film 23*b*.

In this embodiment, the first L0 recording film 23*a* contains Si as a primary component and the second L0 recording film 23*b* contains Cu as a primary component.

In order to lower the noise level of a reproduced signal and improve the storage reliability of the optical recording medium 10, it is preferable to add one or more elements selected from the group consisting of Al, Zn, Sn, Mg and Au to the second L0 recording film 23*b*.

Figure 3:
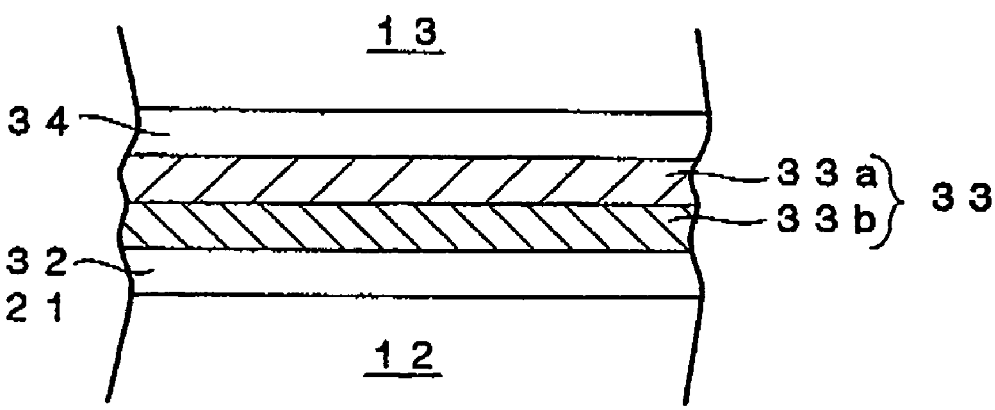
FIG. 3 is a schematic partial enlarged cross-sectional view showing an L1 layer of an optical recording medium shown in FIG. 1.

FIG. 3 is a schematic enlarged cross-sectional view showing the L1 layer 30 of the optical recording medium 10 shown in FIG. 1.

As shown in FIG. 3, the L1 recording layer 33 includes a first L1 recording film 33*a* and a second L1 recording film 33*b*.

In this embodiment, the first L1 recording film 33*a* contains Si as a primary component and the second L1 recording film 33*b* contains Cu as a primary component.

In order to lower the noise lever of a reproduced signal and improve the storage reliability of the optical recording medium 10, it is preferable to add one or more elements selected from the group consisting of Al, Zn, Sn, Mg and Au to the second L1 recording film 33*b*.

In the case where data are to be recorded in the L0 layer 20 and data recorded in the L0 layer are to be reproduced, a laser beam is projected thereon through the L1 layer 30 located closer to the light transmission layer 13.

Therefore, it is necessary for the L0 layer 20 to have a high light transmittance. Concretely, the L1 layer 30 has a light transmittance equal to or higher than 30% with respect to a laser beam used for recording data and reproducing data and preferably has a light transmittance equal to or higher than 40%.

It is preferable to form the L1 recording layer 33 so as to be thinner than the L0 recording layer 23 so that the L1 recording layer 33 having a high light transmittance. Concretely, it is preferable to form the L0 recording layer 23 so as to have a thickness of 2 nm to 40 nm and form the L1 recording layer 33 so as to have a thickness of 2 nm to 15 nm.

In the case where the thickness of each of the L0 recording layer 23 and the L1 recording layer 33 is thinner than 2 nm, the change in reflection coefficient between before and after irradiation with a laser beam is small so that a reproduced signal having high strength (C/N ratio) cannot to be obtained.

On the other hand, when the thickness of the L1 recording layer 33 exceeds 15 nm, the light transmittance of the L1 layer 30 is lowered and the recording characteristic and the reproducing characteristic of the L0 layer 20 are degraded.

Further, when the thickness of the L0 recording layer 23 exceeds 40 nm, the recording sensitivity of the L0 recording layer 23 is degraded.

Furthermore, in order to increase the change in reflection coefficient between before and after irradiation with a laser beam, it is preferable to form the first L1 recording film 33*a*, the second L1 recording film 33*b*, the first L0 recording film 23*a* and the second L0 recording film 23*b* so as to be the ratio of the thickness of the first L1 recording film 33*a* included in the L1 recording layer 33 to the thickness of the second L1 recording film 33*b* (thickness of the first L1 recording film 33*a*/thickness of the second L1 recording film 33*b*) and the ratio of the thickness of the first L0 recording film 23*a* included in the L0 recording layer 23 to the thickness of the second L1 recording film 23*b* (thickness of the first L0 recording film 23*a*/thickness of the second L0 recording film 23*b*) to be from 0.2 to 5.0.

The first dielectric film 34 and the second dielectric film 32 serve as protective layers for protecting the L1 recording layer 33 and the third dielectric film 24 and the fourth dielectric film 22 serve as protective layers for protecting the L0 recording layer 23.

The thickness of each of the first dielectric film 34, the second dielectric film 32, the third dielectric film 24 and the fourth dielectric film 22 is not particularly limited and it preferably has a thickness of 10 nm to 200 nm. In the case where the thickness of each of the first dielectric film 34, the second dielectric film 32, the third dielectric film 24 and the fourth dielectric film 22 is thinner than 10 nm, each of the first dielectric film 34, the second dielectric film 32, the third dielectric film 24 and the fourth dielectric film 22 does not sufficiently serve as a protective a layer. On the other hand, in the case where the thickness of each of the first dielectric film 34, the second dielectric film 32, the third dielectric film 24 and the fourth dielectric film 22 exceeds 200 nm, a long time is required for forming it, thereby lowering the productivity of the optical recording medium 10 and there is some risk of cracking the L0 recording layer 23 and the L1 recording layer 33 due to internal stress.

The first dielectric film 34, the second dielectric film 32, the third dielectric film 24 and the fourth dielectric film 22 may have a single-layered structure or may have a multi-layered structure including a plurality of dielectric films. For example, if the first dielectric film 34 by two dielectric films formed of materials having different refractive indexes, light interference effect can be increased.

The material for forming the first dielectric film 34, the second dielectric film 32, the third dielectric film 24 and the fourth dielectric film 22 is not particularly limited but it is preferable to form the first dielectric film 34, the second dielectric film 32, the third dielectric film 24 and the fourth dielectric film 22 of oxide, sulfide, nitride of Al, Si, Ce, Zn, Ta, Ti and the like such as $Al_2O_3$, ALN, $SiO_2$, $Si_3N_4$, $CeO_2$, ZnS, TaO and the like or a combination thereof and it is more preferable for them to contain $ZnS{\cdot}SiO_2$ as a primary component. $ZnS{\cdot}SiO_2$ means a mixture.

The reflective layer 21 included in the L0 layer serves to reflect a laser beam entering through the light incident plane 13*a* so as to emit it from the light incident plane 13*a* and effectively radiate heat generated in the L0 recording layer 23 by the irradiation with a laser beam.

The reflective film 21 included the L0 layer 20 is preferably formed so as to have a thickness of 20 nm to 200 nm. When the reflective film 21 is thinner than 20 nm, it is does not readily radiate heat generated in the L0 recording layer 23. On the other hand, when the reflective film 21 is thicker than 200 nm, the productivity of the optical recording medium 10 is lowered since a long time is required for forming the reflective film 31 and there is a risk of cracking the reflective film 31 due to internal stress or the like.

The material for forming the reflective film 21 included the L0 layer 20 is not particularly limited insofar as it can reflect a laser beam and the reflective film 21 can be formed of Mg, Al, Ti, Cr, Fe, Co, Ni, Cu, Zn, Ge, Ag, Pt, Au or the like. Among these, a metal material such as Al, Au, Ag and Cu or an alloy containing at least one of these metals such as an alloy of Ag and Cu is preferably used for forming the reflective film 21 because it has high reflective coefficient.

The optical medium 10 having the above-described configuration can, for example, be fabricated in the following manner.

FIGS. 4 to 7 show the steps of a method for fabricating the optical recording medium 10 according to this embodiment.

Figure 4:
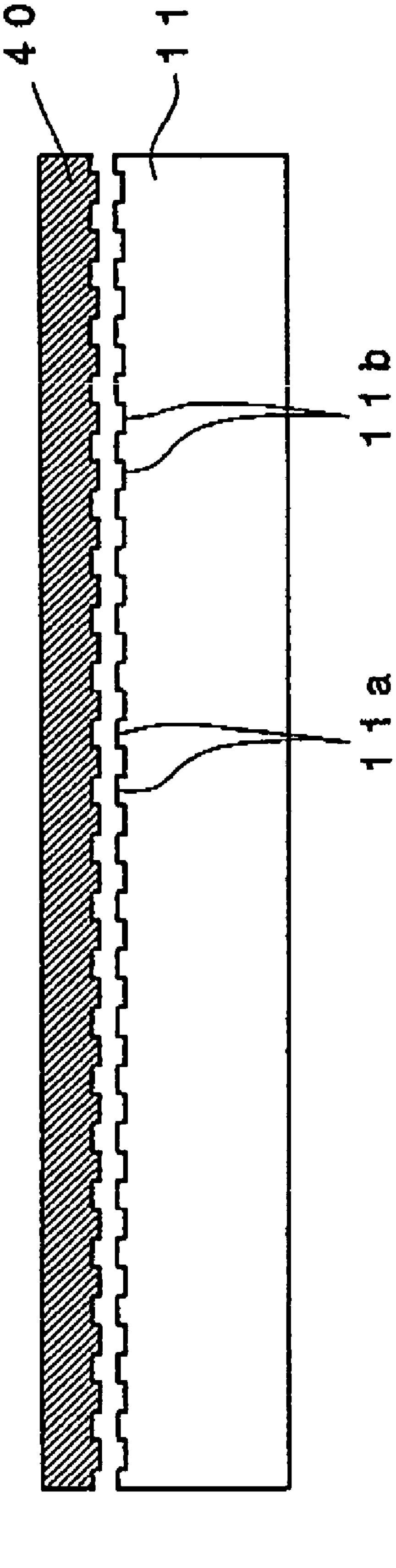
FIG. 4 is a drawing showing a step of a method for fabricating an optical recording medium shown in FIG. 1.

As shown in FIG. 4, the support substrate 11 having grooves 11*a* and lands 11*b* on the surface thereof is first fabricated by injection molding process using a stamper 40.

Then, the reflective film 21 is formed on substantially entire surface of the support substrate 11 on which grooves 11*a* and lands 11*b* are formed by a gas phase growth process using chemical species containing elements of the reflective film 21. Illustrative examples of the gas phase growth process include vacuum deposition process, sputtering process and the like.

Further, the fourth dielectric film 22 is formed on the reflective film 21 by the gas phase growth process using chemical species containing elements of the fourth dielectric film 22. Illustrative examples of the gas phase growth process include vacuum deposition process, sputtering process and the like.

Then, the second L0 recording film 23*b* is formed on the fourth dielectric film 22 by the gas phase growth process using chemical species containing elements of the L0 second recording film 23*b*, the first L0 recording film 23*a* is formed on the second L0 recording film 23*b* by the gas phase growth process using chemical species containing elements of the first L0 recording film 23*a*, thereby forming the L0 recording layer 23. Illustrative examples of the gas phase growth process include vacuum deposition process, sputtering process and the like.

Figure 5:
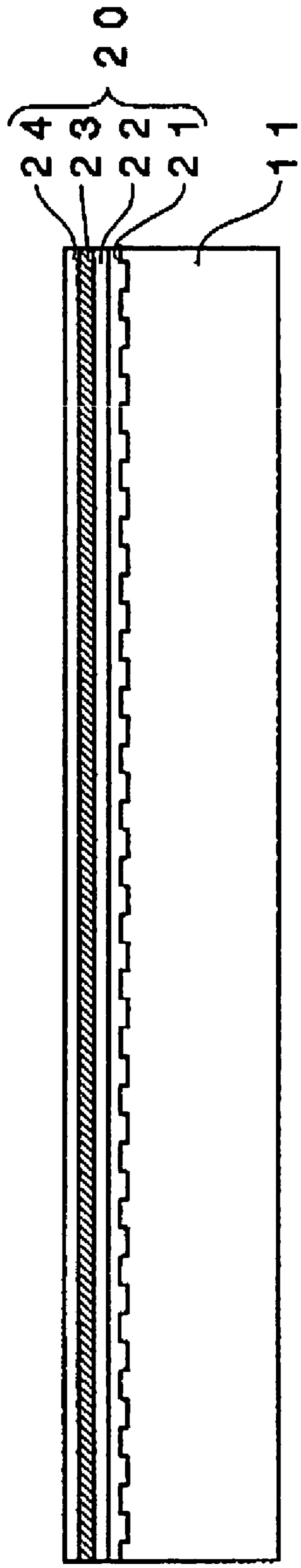
FIG. 5 is a drawing showing a step of a method for fabricating an optical recording medium shown in FIG. 1.

Further, as shown in FIG. 5, the third dielectric film 24 is formed on the first L0 recording film 23*a* by the gas phase growth process using chemical species containing elements of the third dielectric film 24, thereby forming the L0 layer 20. Illustration examples of the gas phase growth process include vacuum deposition process, sputtering process and the like.

Figure 6:
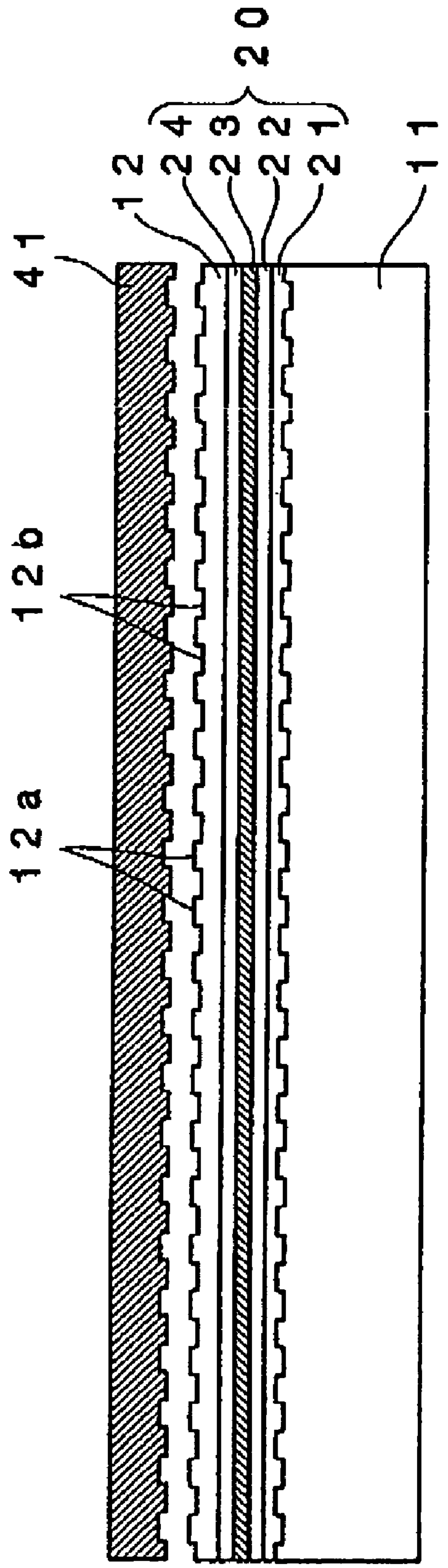
FIG. 6 is a drawing showing a step of a method for fabricating an optical recording medium shown in FIG. 1.

Then, as shown in FIG. 6, an ultraviolet ray curable resin is coated on the L0 layer 20 by a spin coating method to form a coating film and the surface of the coating film is irradiated with an ultraviolet ray via a stamper 41 while it is covered by the stamper 41, thereby forming the transparent intermediate layer 12 formed with grooves 12*a* and lands 12*b* on the surface thereof.

Further, the second dielectric 32 is formed on substantially entire surface of the transparent intermediate layer 12 on which the grooves 12*a* and the lands 12*b* are formed. Illustration examples of the gas phase growth process include vacuum deposition process, sputtering process and the like.

Then, the second L1 recording film 33*b* is formed on the second dielectric film 32 by the gas phase growth process using chemical species containing elements of the second L1 recording film 33*b*, the first L1 recording film 33*a* is formed on the second L1 recording film 33*b* by the gas phase growth process using chemical species containing elements of the first L1 recording film 33*a*, thereby forming the L1 recording layer 33. Illustration examples of the gas phase growth process include vacuum deposition process, sputtering process and the like.

Figure 7:
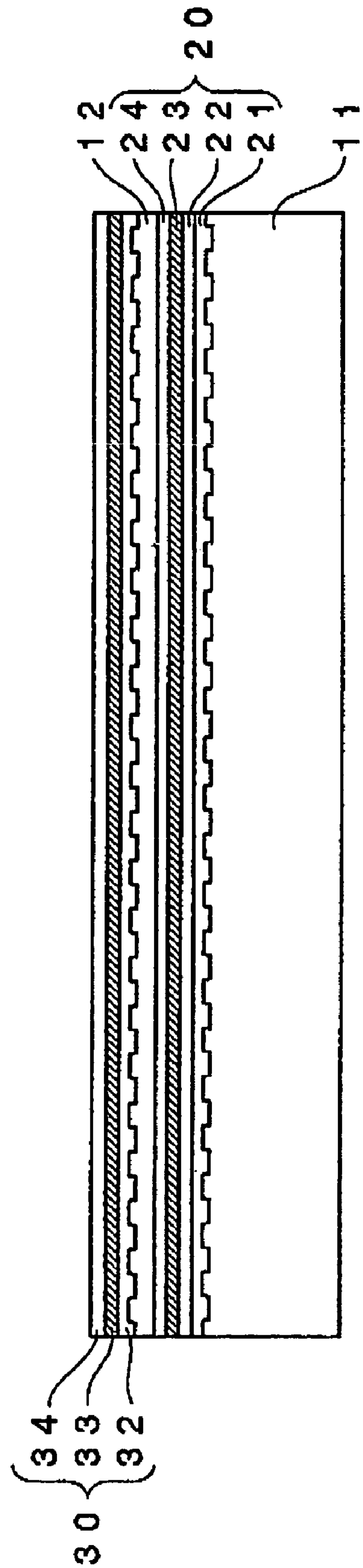
FIG. 7 is a drawing showing a step of a method for fabricating an optical recording medium shown in FIG. 1.

Further, as shown in FIG. 7, the first dielectric film 34 is formed on the L1 recording layer 33 by the gas phase growth process using chemical species containing elements of the first dielectric film 34, thereby forming the L1 layer 30.

Then, an ultraviolet ray curable resin is coated on the L1 layer 30 by the spin coating method to form a coating film and the surface of the coating film is irradiated with an ultraviolet ray, thereby forming the light transmission layer 13.

This completes the fabrication of the optical recording medium 10.

When data are to be recorded in the thus constituted optical recording medium 10, the light incident plane 13*a* of the light transmission layer 13 is irradiated with a laser beam whose power is modulated and the focus of the laser beam is adjusted onto the L0 recording layer 23 included in the L0 layer 20 or the L1 recording layer 33 included in the L1 layer 21.

A laser beam having a wavelength of 350 nm to 450 nm is preferably employed for recording data in the optical recording medium 10 and reproducing data from the optical recording medium 10 and in this embodiment, a laser beam having a wavelength of 405 nm is condensed by an objective lens having a numerical aperture of 0.85 onto the L0 recording layer 23 or the L1 recording layer 33 via the light transmission layer 13.

Figure 8:
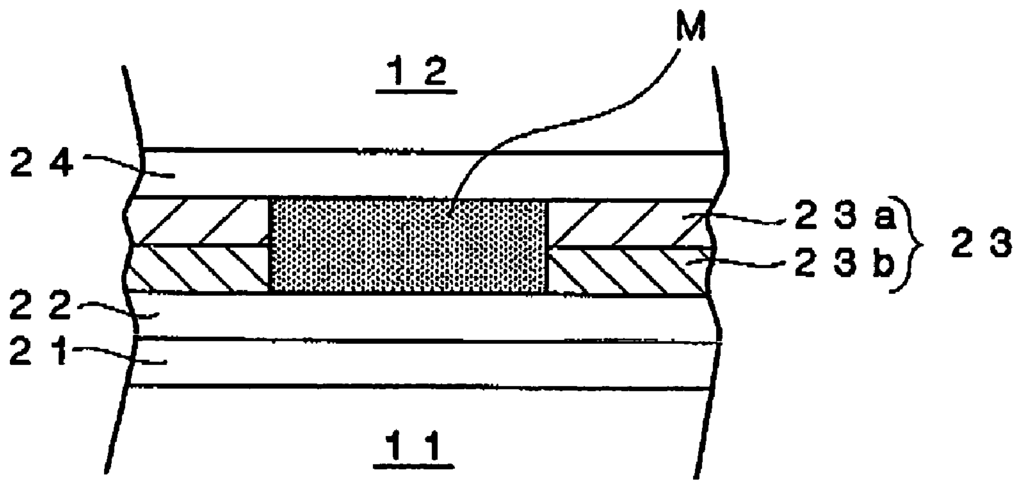
FIG. 8 is a schematic cross-sectional view showing an optical recording medium with a recording mark is formed in an L0 layer.
Figure 9:
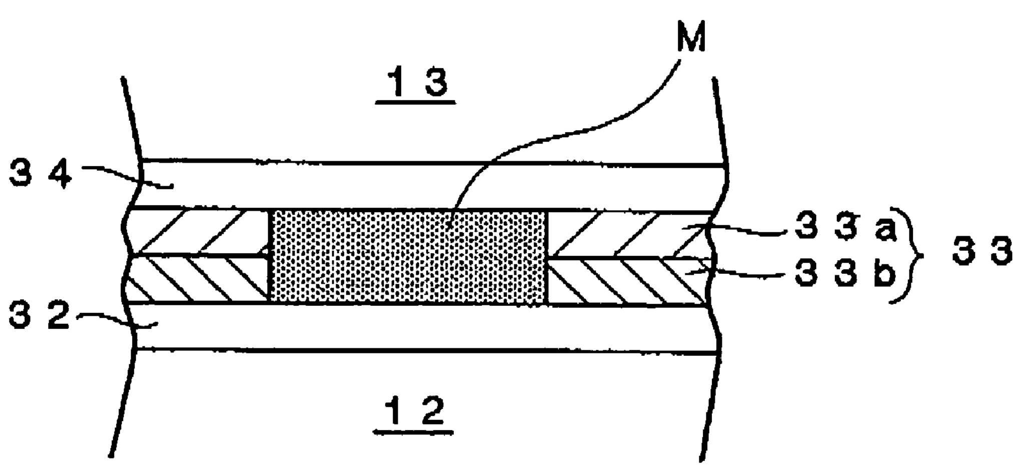
FIG. 9 is a schematic cross-sectional view showing an optical recording medium with a recording mark is formed in an L1 layer.

As a result, Si contained in the first L0 recording film 23*a* of the L0 recording Layer 23 as a primary component and Cu contained in the second L0 recording film 23*b* as a primary component are mixed with each other at a region irradiated with the laser beam and, as shown in FIG. 8, a recording mark M is formed, or Si contained in the first L1 recording film 33*a* of the L1 recording layer 30 as a primary component and Cu contained in the second recording film 33*b* as a primary component are mixed with each other at the region irradiated with the laser beam and, as shown FIG. 9, a recording mark M is formed.

In this manner, recording marks M are formed in the L0 recording layer 23 of the L0 layer 20 or L1 recording layer 33 of the L1 layer 30. whereby data are recorded therein.

Figure 10:
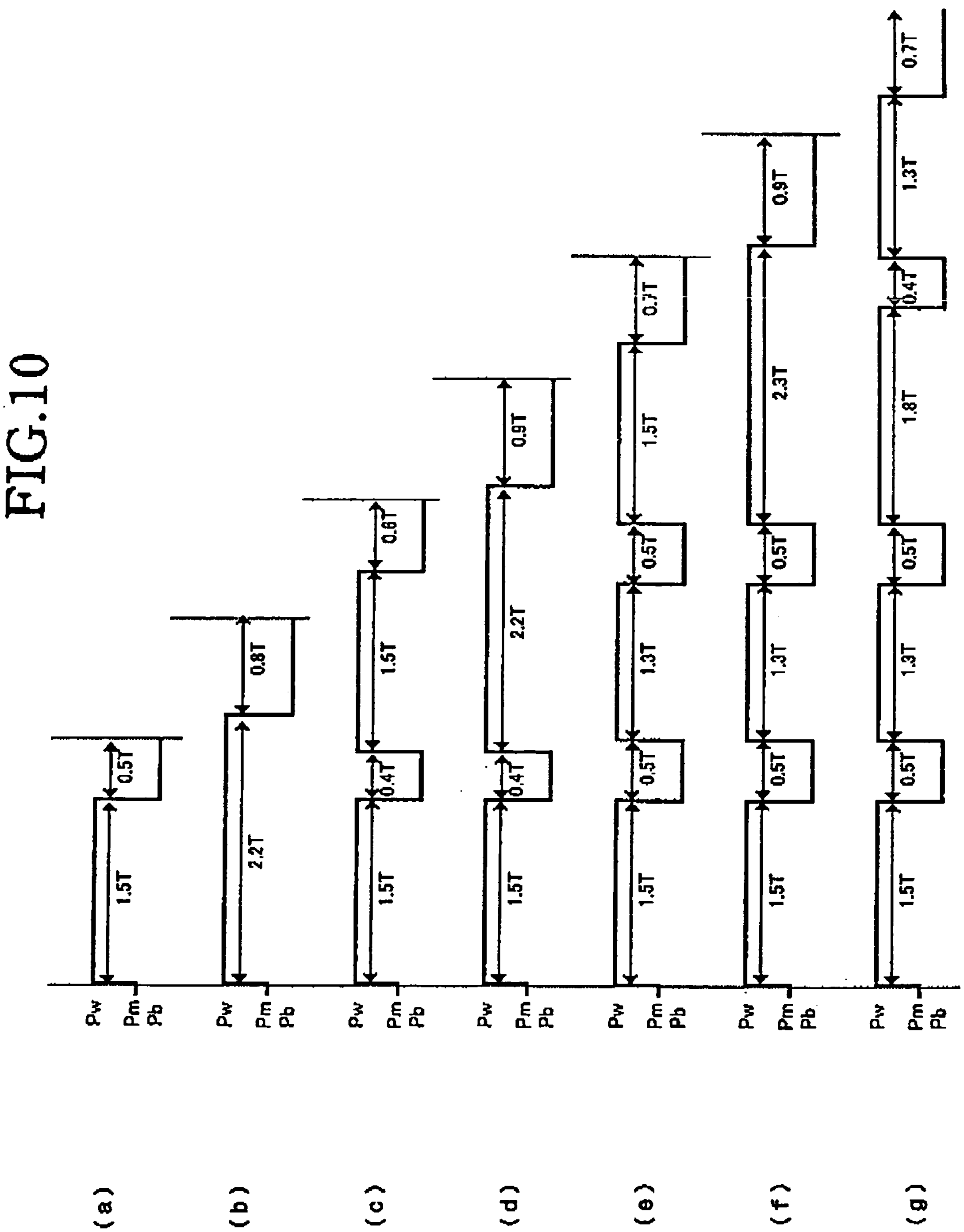
FIG. 10 is a diagram showing a conventional recording strategy used in the case where data are to be recorded in an optical recording medium at a high linear recording velocity using the (1.7)RLL Modulation Code.
Figure 11:
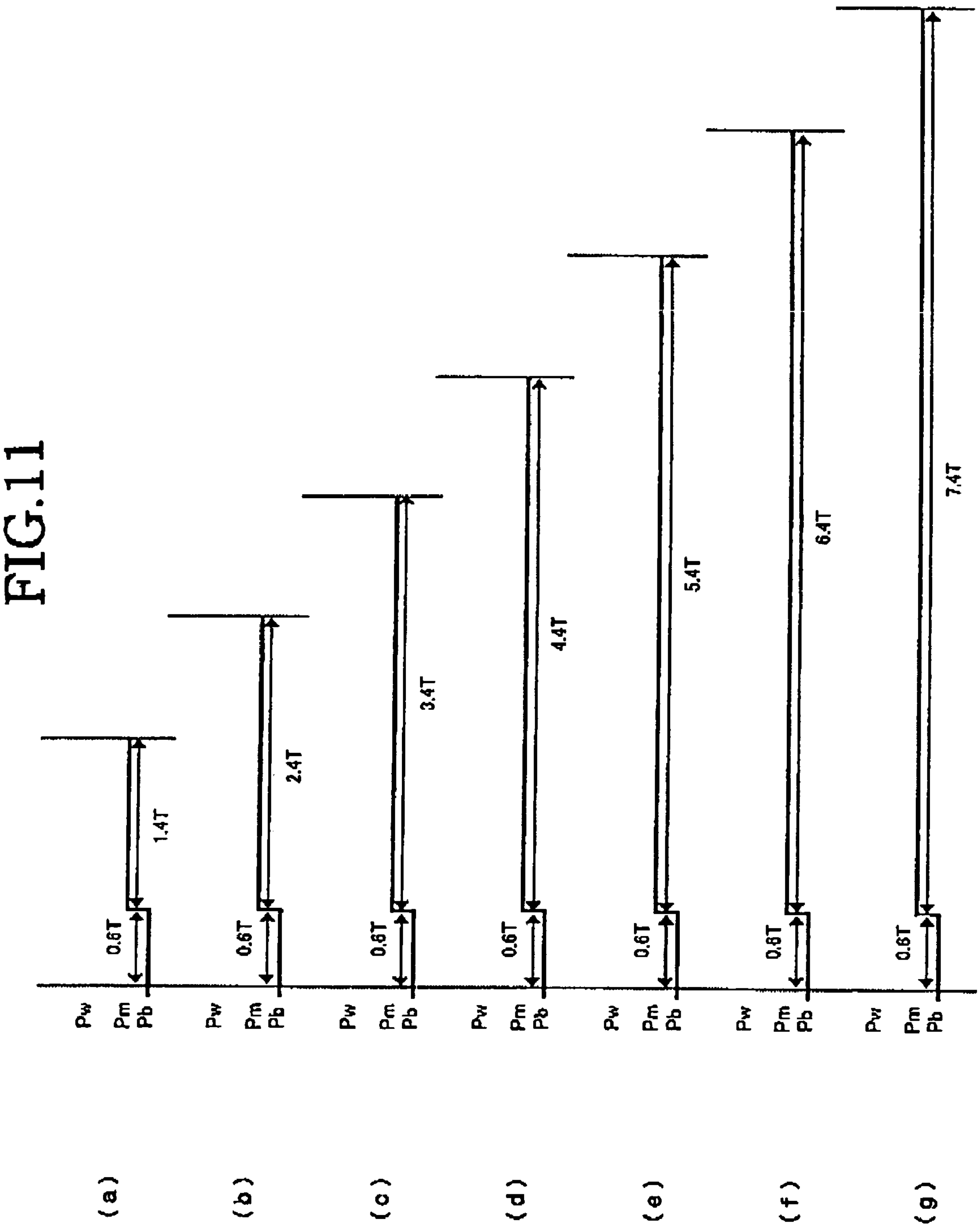
FIG. 11 is a diagram showing a conventional recording strategy used in the case where data are to be recorded in an optical recording medium at a high linear recording velocity using the (1.7)RLL Modulation Code.

FIGS. 10 and 11 are sets of diagrams showing a conventional method for modulating the power of a laser beam, namely, the conventional recording strategy used in the case where data are to be recorded in an optical recording medium at a high linear recording velocity using the (1.7) RLL Modulation Code.

Each of FIGS. 10(*a*), (*b*), (*c*), (*d*), (*e*), (*f*) and (*g*) shows the pattern for modulating a laser beam in the case where a recording mark M having a length corresponding to a 2T signal to an 8T is to be formed and each of FIGS. 11(*a*), (*b*), (*c*), (*d*), (*e*), (*f*), and (*g*) shows the pattern for modulating a laser beam in the case where a blank region having a length corresponding to a 2T signal to an 8T signal is to be formed.

As shown in FIGS. 10 and 11, in the conventional recording strategy, the power of a laser beam is modulated using a single pulse when a recording mark having a length corresponding to a 2T signal is to be formed or when a recording mark having a length corresponding to a 3T signal is to be formed; the power of a laser beam is modulated using two pulses when a recording mark having a length corresponding to a 4T signal is to be formed or when a recording mark having a length corresponding to a 5T signal is to be formed; the power of a laser beam is modulated using three pulses when a recording mark having a length corresponding to a 6T signal is to be formed or when a recording mark having a length corresponding to a 7T signal is to be formed; and the power of a laser beam is modulated using four pulses when a recording mark having a length corresponding to a 8T signal is to be formed, respectively.

As shown in FIGS. 10 and 11, the configuration is such that that the power of a laser beam is modulated by three levels such as a recording power Pw, a bottom power Pb, and an intermediate power Pm whose level is higher than the level of the bottom power Ph, and is lower than the recording power Pw. The recording strategy is determined so that the power of the laser beam is set to the recording power Pw at the top of a pulse and the power of the laser beam is set to the bottom power Pw at the bottom of a pulse in the case where a recording mark M having a length corresponding to any of a 2T signal to an 8T signal is to be formed. On the other hand, in the case where a blank region having a length corresponding to any of a 2T signal to an 8T signal is to be formed, the recording strategy is determined so that the power of a laser beam is set to the bottom power Pb at the beginning and is set to the intermediate power Pm after that.

According to such recording strategy, since the number of pulses used for modulating the power of the laser beam decreases in comparison with the (n−1) recording strategy usually used in the case where a recording mark M having a length corresponding to a 3T signal to an 8T signal is to be formed, it is possible to modulate the power of a laser beam in a desired manner even if the case of recording data at a high linear recording velocity However, in the case where the power of a laser beam is modulated using this recording strategy and data are recorded in the L1 recording layer 33 of the optical recording medium 10 or the L0 recording layer 23, it is very difficult to form a recording mark having a desired length in the L1 recording layer 33 or L0 recording layer 23 when a recording mark M having a length corresponding to a 3T signal is to be formed.

Concretely, as shown in FIGS. 10(*a*) and (*b*), since the power of the laser beam is modulated using a single pulse when a recording mark M having a length corresponding to a 3T signal is to be formed as well as when a recording mark M having a length corresponding to a 2T signal is to be formed, the term during which the power of a laser beam is set to a recording power Pw inevitably becomes longer than that for forming a recording mark M having a length corresponding to a 2T signal. Therefore, the front portion of a recording mark M extends forward through the influence of heat transmitted from the immediately preceding recording mark M formed in the L1 recording layer 33 or the L0 recording layer 23 and the length of the recording mark M becomes longer than the desired length, whereby jitter of the reproduced signal increases.

In particular, since a laser beam passes through the L1 layer 30 when data are to be recorded in the L0 layer 23 or when data recorded in the L0 layer are to be reproduced, a reflective layer is not provided in the L1 layer 30 and, therefore, a recording mark having the desired length cannot be formed when a recording mark M having a length corresponding to a 3T signal is to be formed in the L0 recording layer 23.

More specifically, since L0 layer 20 includes the reflective film 21, when a laser beam projects onto a region of the L0 recording layer 23 where a recording mark M is to be formed, it can promptly transmit heat generated by exposure to a laser beam to other regions of the L0 recording layer 23 through the reflective film 21 and, therefore, the front portion of a recording mark M is not greatly influenced by heat from the recording mark M formed immediately before the formation of the recording mark M in the L0 recording layer 23.

On the other hand, since L1 layer 30 does not include a reflective layer, when a laser beam projects onto a region of the L1 recording layer 33 where a recording mark M is to be formed, it cannot transmit heat generated by exposure to a laser beam to other regions of the L1 recording layer 33 through the reflection film and therefore, heat generated by a laser beam tends to be accumulated in the region of the L1 recording layer 33 where a recording mark M is formed, the front portion of recording mark tends to be influenced by heat transmitted from an immediately preceding recording mark formed in the L1 recording layer 33 and, as a result, the length of the recording mark M becomes longer and jitter of the reproduced signal becomes worse.

Figure 12:
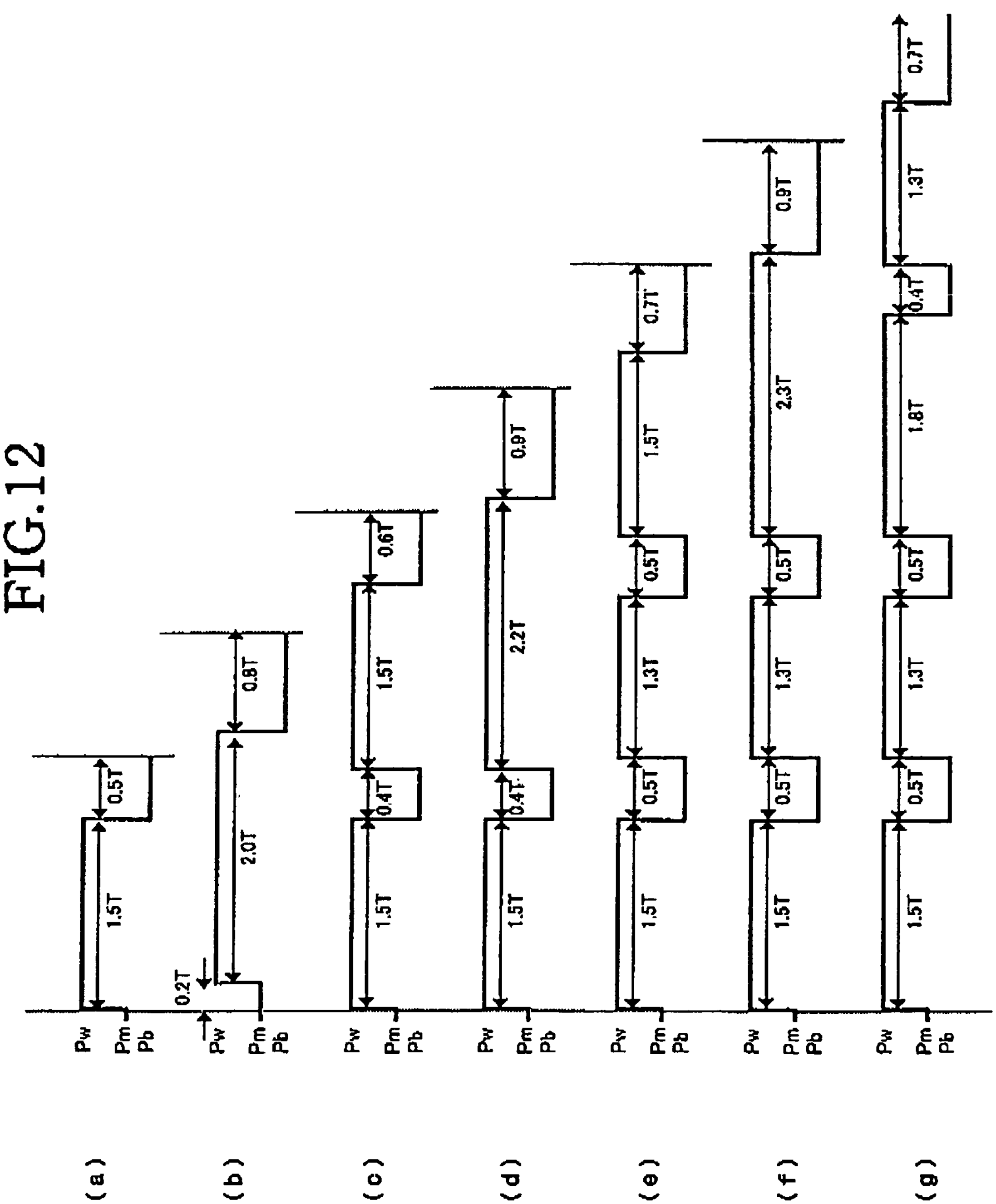
FIG. 12 is a diagram showing a recording strategy used for recording data in an L1 layer or an L0 layer of an optical recording medium using the (1.7)RLL Modulation Code in a method for recording data in an optical recording medium that is a preferred embodiment of the present invention.
Figure 13:
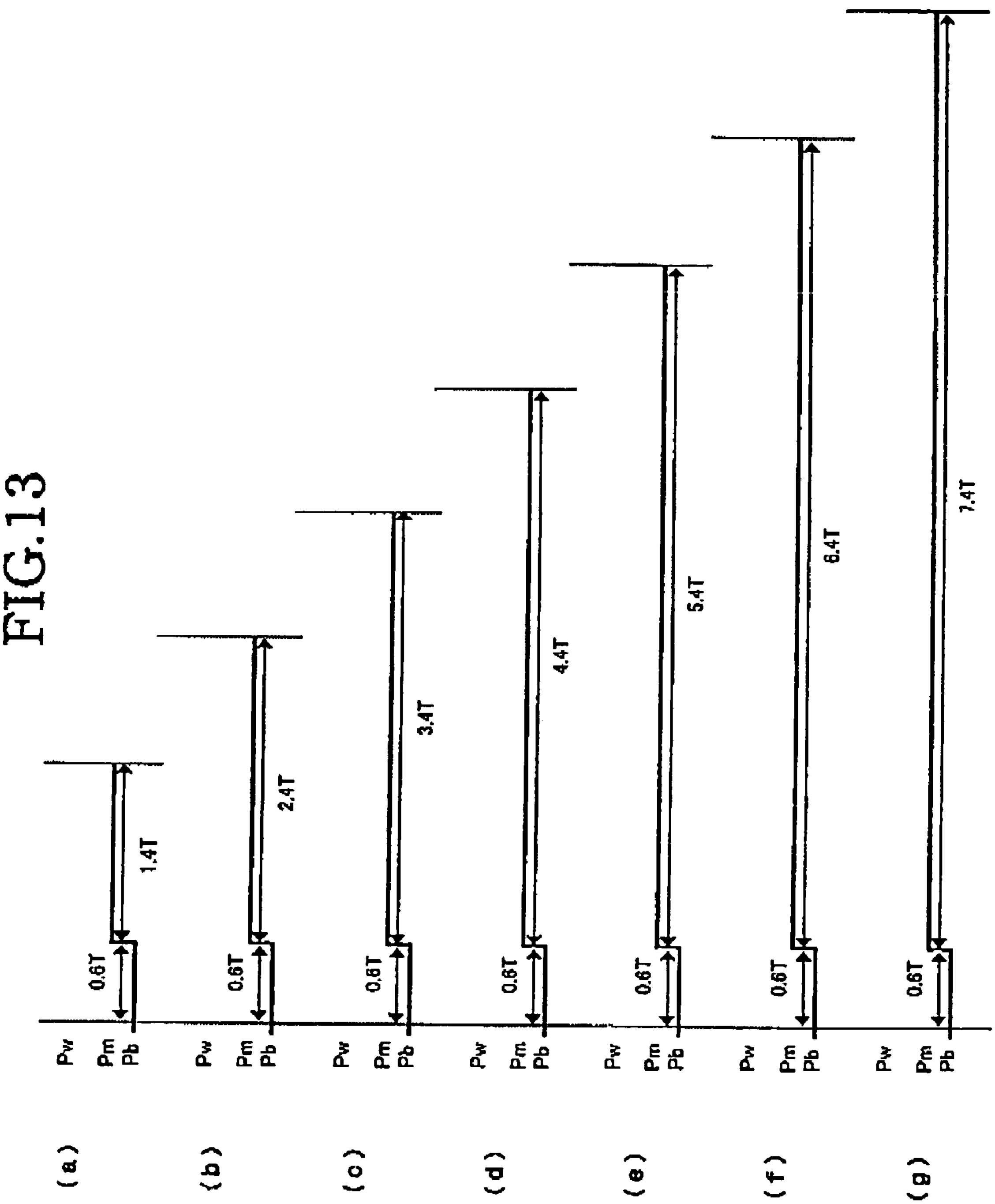
FIG. 13 is a diagram showing a recording strategy used for recording data in an L1 layer or an L0 layer of an optical recording medium using the (1.7)RLL Modulation Code in a method for recording data in an optical recording medium that is a preferred embodiment of the present invention.

FIGS. 12 and 13 are a set of diagrams showing a method for modulating the power of a laser beam, namely, the recording strategy used in the case where data are to be recorded in the L1 recording layer 33 or the L0 recording layer 23 of the optical recording medium 10 using the (1.7)RLL Modulation Code, in a method for recording data in the optical recording medium 10 that is a preferred embodiment of the present invention.

Each of FIGS. 12(*a*), (*b*), (*c*), (*d*), (*e*), (*f*) and (*g*) shows the pattern for modulating a laser beam in the case where a recording mark M having a length corresponding to a 2T signal to an 8T signal is to be formed, each of FIGS. 13(*a*), (*b*), (*c*), (*d*), (*e*), (*f*) and (*g*) shows the pattern for modulating a laser beam in the case where a recording mark M having a length corresponding to a 2T signal to an 8T signal is to be formed.

Also in the recording strategy that is this embodiment, as shown in FIG. 13, in the case where a blank region having a length corresponding to a 2T signal to an 8T signal is to be formed in the L1 recording layer 33 of the optical recording medium 10 or the L0 recording layer 23, the power of the laser beam is modulated similarly to in FIG. 11, and, as further shown in FIG. 12, in the case where a recording mark M having a length corresponding to a 2T signal to an 8T signal is to be formed, the number of the pulses used in order to modulate the power of the laser beam is the same as in FIG. 11.

However, in this embodiment, as shown in FIG. 10(*b*), in the case where a recording mark M having a length corresponding to a 3T signal is to be formed, the power of the laser beam is modulated so that the time of raising the power of the laser beam to the recording power Pw is delayed by 0.2T relative to the time of raising the power of a laser beam to the recording power Pw when a recording mark M having a length corresponding to a 2T signal is to be formed.

In a study done by the inventors of the present invention, it was found that in the case where a recording mark M having a length corresponding to a 3T signal is to be formed, if the time of raising the power of the laser beam to the recording power Pw was delayed relative to the time of raising the power of the laser beam to the recording power Pw when a recording mark M having a length corresponding to a 2T signal was to be formed, it became possible to form a recording mark M having the desired length even if a recording mark M having a length corresponding to a 3T signal was to be formed.

Therefore, according to the above described embodiment, it becomes possible to form a recording mark M having the desired length in the case where a recording mark M having a length corresponding to a 3T signal is to be formed in the L0 recording layer 23 of the optical recording medium 10 or the L1 recording layer 33, and is possible to greatly reduce the jitter of the reproduced signal.

Figure 14:
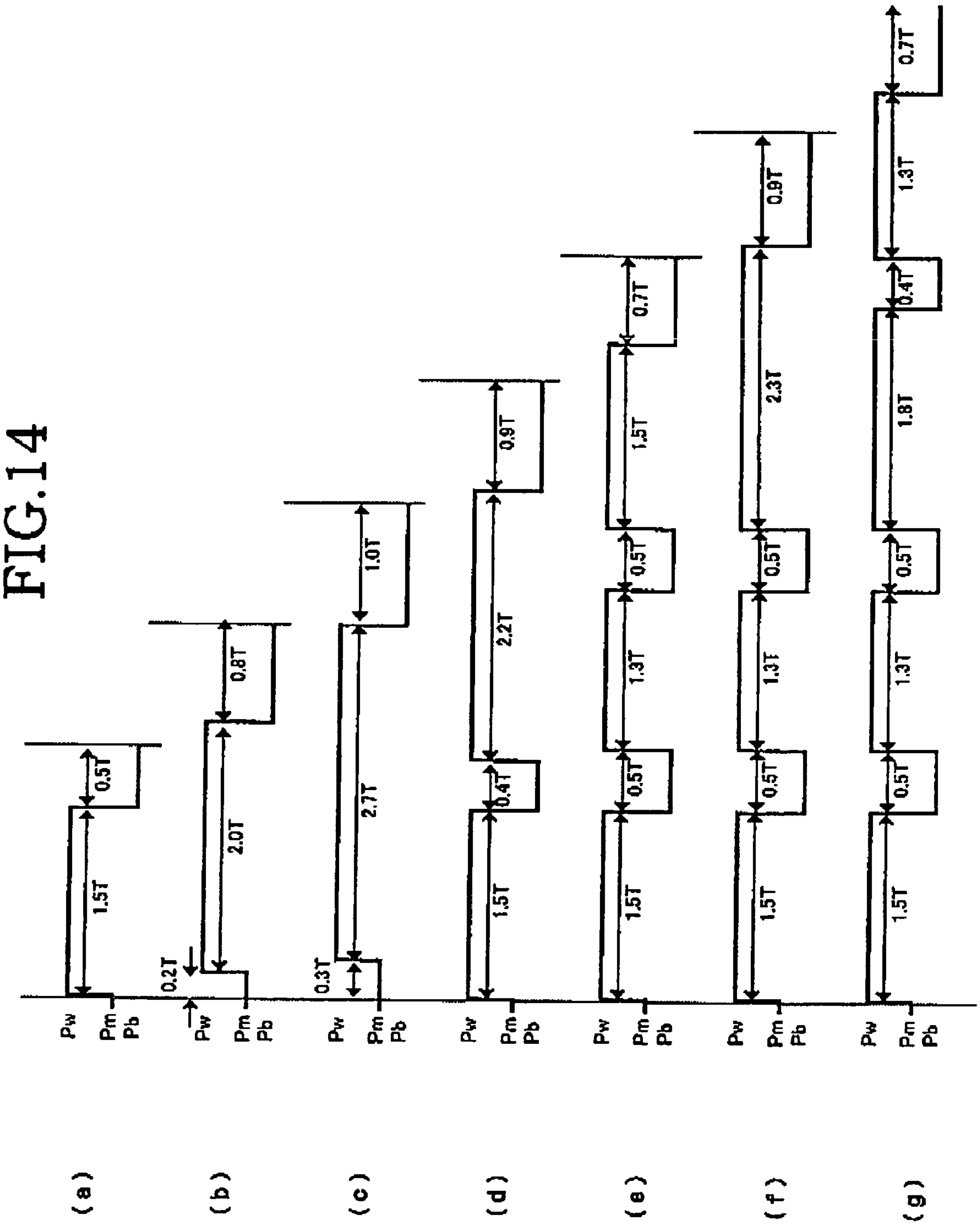
FIG. 14 is a diagram showing a recording strategy used for recording data in an L1 layer or an L0 layer of an optical recording medium using the (1.7)RLL Modulation Code in a method for recording data in an optical recording medium that is another preferred embodiment of the present invention.
Figure 15:
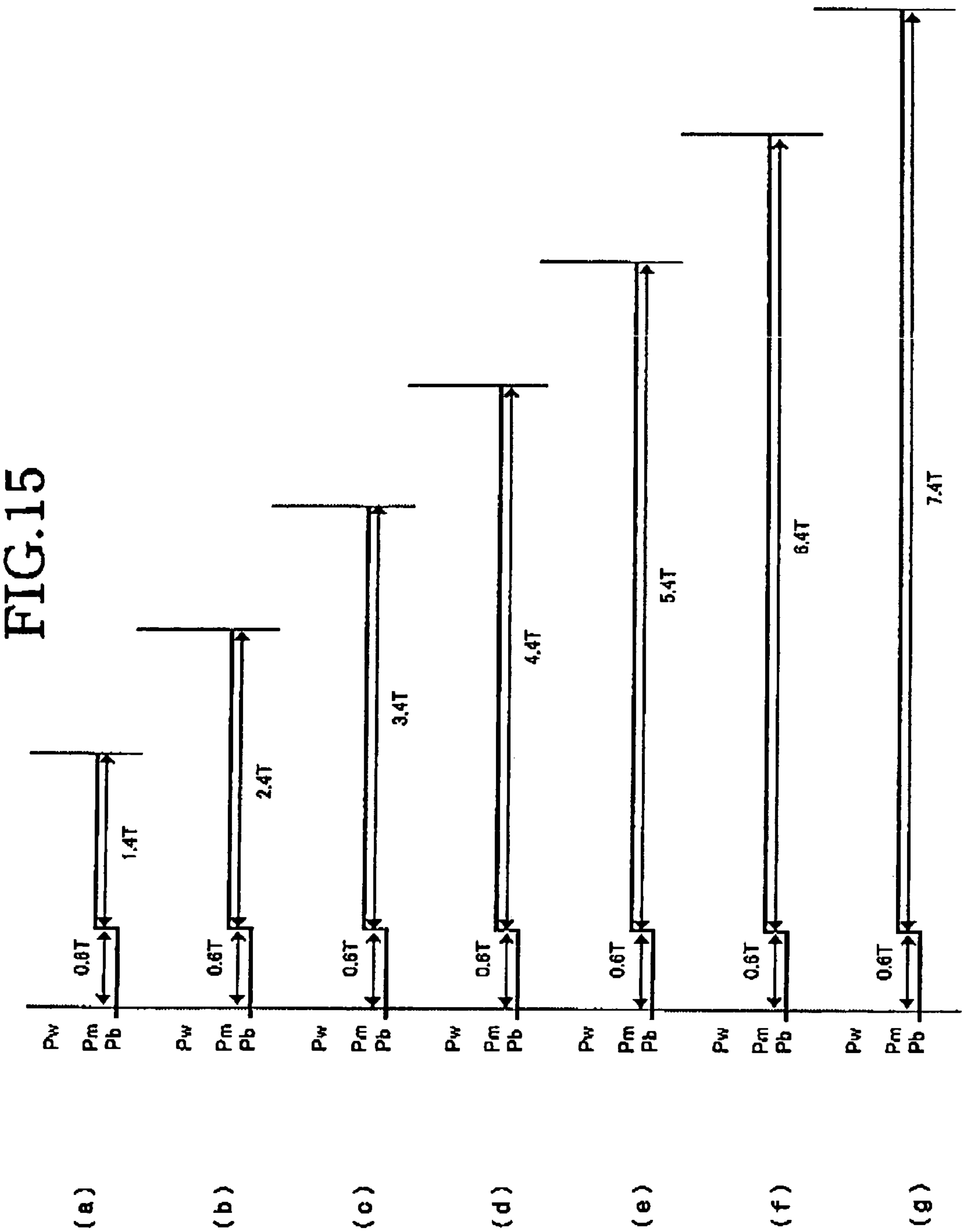
FIG. 15 is a diagram showing a recording strategy used for recording data in an L1 layer or an L0 layer of an optical recording medium using the (1.7)RLL Modulation Code in a method for recording data in an optical recording medium that is another preferred embodiment of the present invention.

FIGS. 14 and 15 are set of diagrams showing a method for modulating the power of a laser beam, namely, the recording strategy used in the case where data are to be recorded in the L1 recording layer 33 or the L0 recording layer 23 of the optical recording medium 10 using the (1.7)RLL Modulation Code, in a method for recording data in the optical recording medium 10 that is another preferred embodiment of the present invention.

Each of FIGS. 14(*a*), (*b*), (*c*), (*d*), (*e*), (*f*) and (*g*) shows the pattern for modulating a laser beam in the case where a recording mark M having a length corresponding to a 2T signal to an 8T signal is to be formed, each of FIGS. 11(*a*), (*b*), (*c*), (*d*), (*e*), (*f*) and (*g*) shows the pattern for modulating a laser beam in the case where blank regions having a length corresponding to a 2T signal to an 8T signal are to be formed.

The recording strategy according to this embodiment is preferably adopted in the case where data are to be recorded at a linear recording velocity still higher than that of the recording strategy shown in FIGS. 12 and 13.

Also in the recording strategy according to this embodiment, as shown in FIG. 15, the power of the laser beam is modulated similarly to in FIG. 11 in the case where a blank region having a length corresponding to a 2T signal to an 8T signal is to be formed in the L1 recording layer 33 or the L0 recording layer 23 of the optical recording medium 10, and further, as shown in FIG. 14, in the case where a recording mark M having a length corresponding to a 3T signal is to be formed, the power of the laser beam is modulated similarly to in FIG. 12 so that the time of raising the power of the laser beam to the recording power Pw is delayed by 0.2T relative to the time of raising the power of the laser beam to the recording power Pw when a recording mark M having a length corresponding to a 2T signal is to be formed.

However, as shown in FIG. 14(*c*) and in this embodiment, furthermore, in the case where a recording mark M having a length corresponding to a 4T signal is to be formed, the power of the laser beam is modulated using a single pulse and so that the time of raising the power of the laser beam to the recording power Pw is delayed by 0.3T relative to the time of raising the power of the laser beam to the recording power Pw when a recording mark M having a length corresponding to a 2T signal is to be formed.

In a study done by the inventors of the present invention, it was observed that in the case where a recording mark M having a length corresponding to a 4T signal was to be formed, if the power of the laser beam was modulated using a single pulse, the length of the recording mark M tended to be longer than the desired length, whereby jitter of the reproduced signal became worse.

However, the inventors found that even if the power of a laser beam was modulated using a single pulse and a recording mark M having a length corresponding to a 4T signal was to be formed, in the case where the power of the laser beam was modulated so that the time of raising the power of the laser beam to the recording power Pw was delayed by 0.3T relative to the time of raising the power of the laser beam to the recording power Pw when a recording mark M having a length corresponding to a 2T signal was to be formed, it was possible to form a recording mark M having the desired length even if a recording mark M having a length corresponding to a 4T signal was to be formed in the L1 recording layer 33, whereby it was possible to greatly reduce jitter of the reproduced signal.

Therefore, according to this embodiment, it is possible to form a recording mark M having the desired length and is possible to greatly reduce jitter of the reproduced signal even if a recording mark M having a length corresponding to a 4T signal is to be formed in the L0 recording layer 23 or the L1 recording layer 33 of the optical recording medium 10 and data are to be recorded therein.

Figure 16:
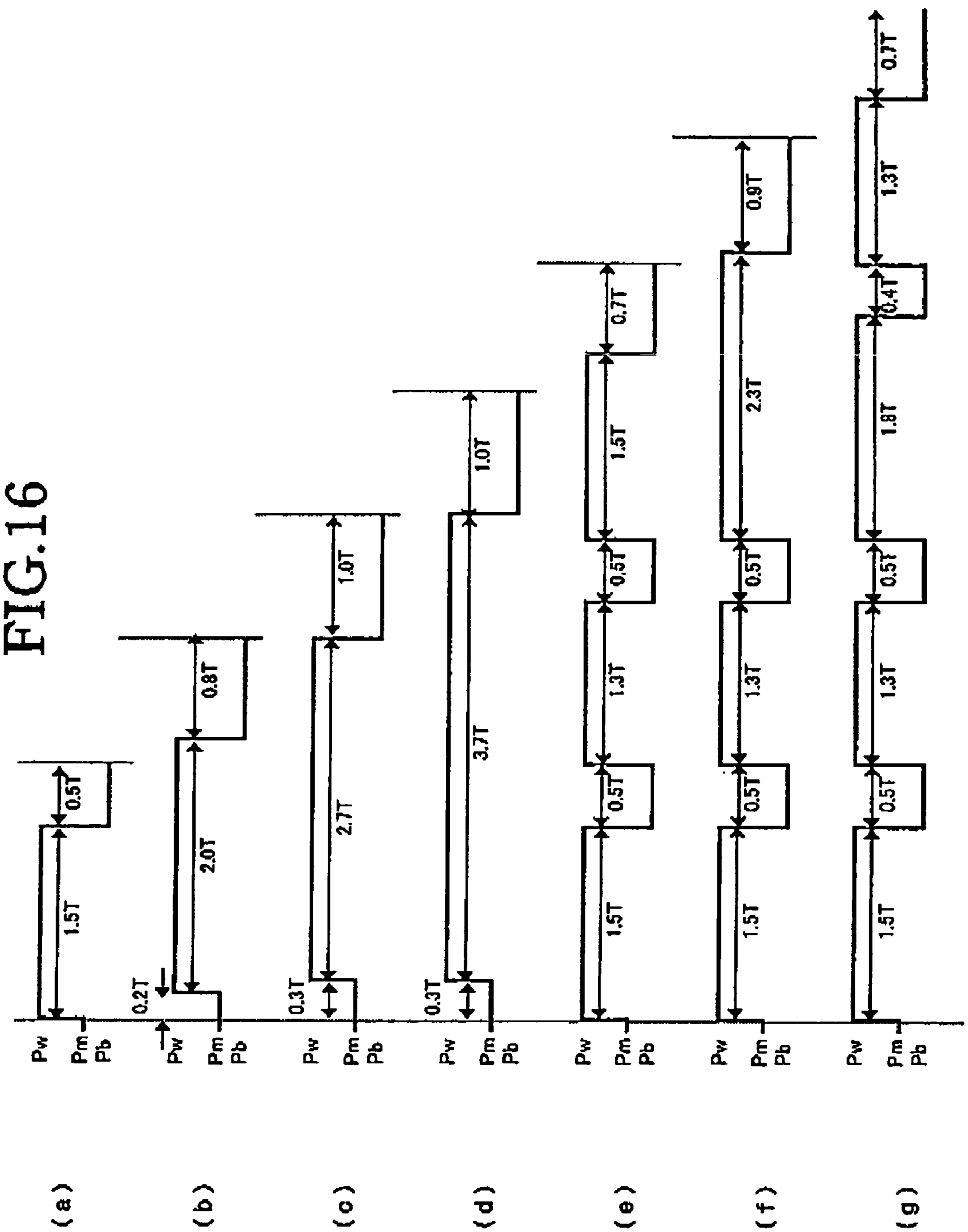
FIG. 16 is a diagram showing a recording strategy used for recording data in an L1 layer or an L0 layer of an optical recording medium using the (1.7)RLL Modulation Code in a method for recording data in an optical recording medium that is a further preferred embodiment of the present invention.
Figure 17:
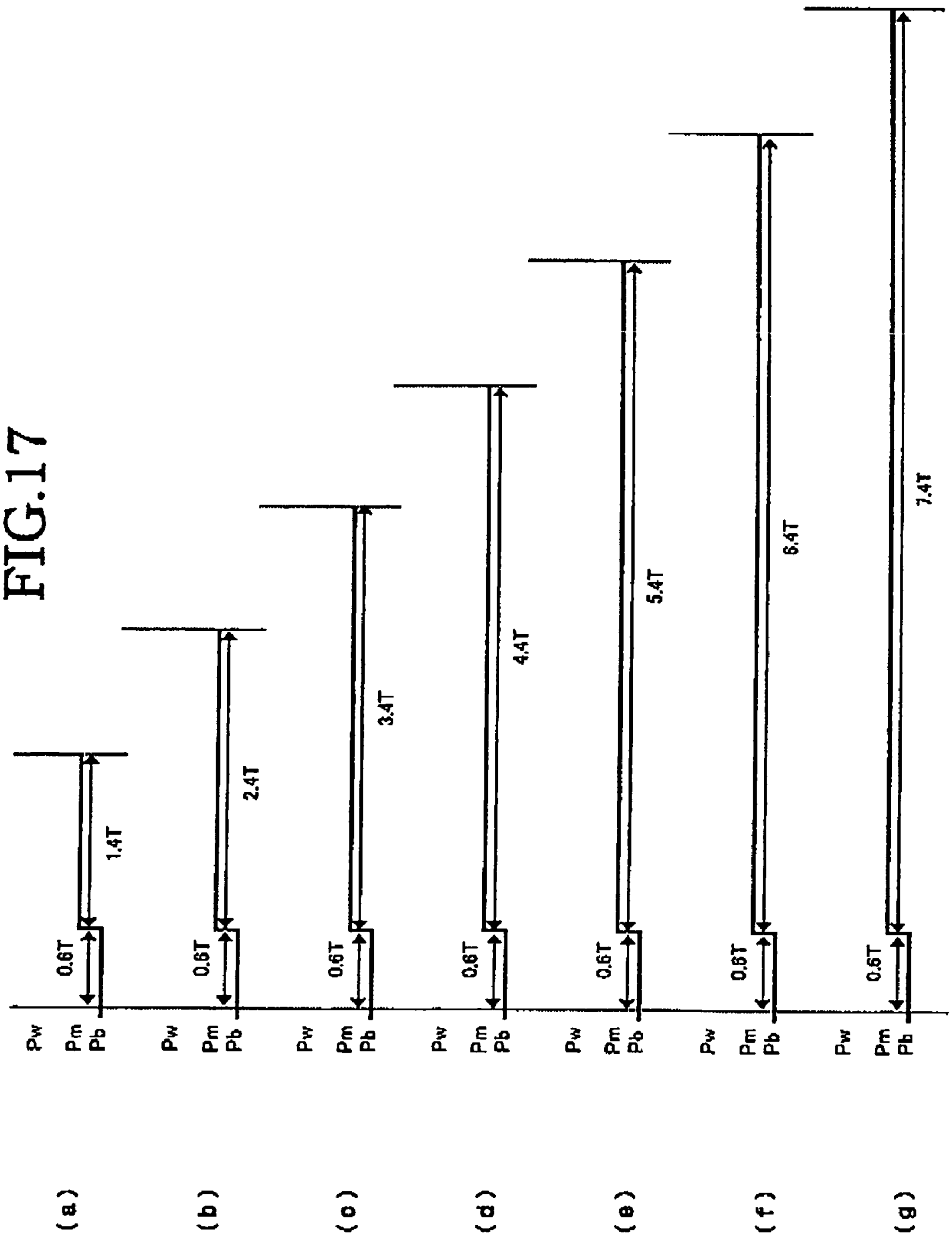
FIG. 17 is a diagram showing a recording strategy used for recording data in an L1 layer or an L0 layer of an optical recording medium using the (1.7)RLL Modulation Code in a method for recording data in an optical recording medium that is a further preferred embodiment of the present invention.

FIGS. 16 and 17 are a set of diagrams showing a method for modulating the power of a laser beam, namely, the recording strategy used in the case where data are to be recorded in the L1 recording layer 33 or the L0 recording layer 23 of the optical recording medium 10 using the (1.7)RLL Modulation Code, in a method for recording data in the optical recording medium 10 that is a further preferred embodiment of the present invention.

Each of FIGS. 16(*a*), (*b*), (*c*), (*d*), (*e*), (*f*) and (*g*) shows the pattern for modulating a laser beam in the case where a recording mark M having a length corresponding to a 2T signal to an 8T signal is to be formed, each of FIGS. 17(*a*), (*b*), (*c*), (*d*), (*e*), (*f*) and (*g*) shows the pattern for modulating a laser beam in the case where blank regions having a length corresponding to a 2T signal to an 8T signal are to be formed.

Also in the recording strategy according to this embodiment, as shown in FIG. 17, the power of the laser beam is modulated similarly to in FIG. 11 in the case where a blank region having a length corresponding to a 2T signal to an 8T signal is to be formed in the L1 recording layer 33 or the L0 recording layer 23 of the optical recording medium 10; in the case where a recording mark M having a length corresponding to a 3T signal is to be formed, the power of a laser beam is modulated similarly to in FIG. 14 so that the time of raising the power of the laser beam to the recording power Pw is delayed by 0.2T relative to the time of raising the power of the laser beam to the recording power Pw when a recording mark M having a length corresponding to a 2T signal is to be formed; in the case where a recording mark M having a length corresponding to a 4T signal is to be formed, the power of the laser beam is modulated similarly to in FIG. 14 using a single pulse and so that the time of raising the power of the laser beam to the recording power Pw is delayed by 0.3T relative to the time of raising the power of the laser beam to the recording power Pw when a recording mark M having a length corresponding to a 2T signal is to be formed.

However, as shown in FIG. 16(*d*) and in this embodiment, furthermore, in the case where a recording mark M having a length corresponding to a 5T signal is to be formed, the power of a laser beam is modulated using a single pulse and so that the time of raising the power of the laser beam to the recording power Pw is delayed by 0.3T relative to the time of raising the power of the laser beam to the recording power Pw when a recording mark M having a length corresponding to a 2T signal is to be formed.

In a study done by the inventors of the present invention, it was observed that in the case where a recording mark M having a length corresponding to a 5T signal is to be formed, if the power of a laser beam was modulated using a single pulse, the length of a recording mark M tended to be longer than the desired length, whereby jitter of the reproduced signal became worse.

However, the inventors found that even if the power of a laser beam was modulated using a single pulse and a recording mark M having a length corresponding to a 5T signal was to be formed, in the case where the power of the laser beam was modulated so that the time of raising the power of the laser beam to the recording power Pw was delayed by 0.3T relative to the time of raising the power of the laser beam to the recording power Pw when a recording mark M having a length corresponding to a 2T signal is to be formed, it was possible to form a recording mark M having the desired length even if a recording mark M having a length corresponding to a 5T signal was to be formed in the L1 recording layer 33, whereby it was possible to greatly reduce jitter of the reproduced signal.

Therefore, according to this embodiment, it is possible to form a recording mark M having the desired length and is possible to greatly reduce jitter of the reproduced signal even if a recording mark M having a length corresponding to a 5T signal was to be formed in the L0 recording layer 23 or the L1 recording layer 33 of the optical recording medium 10 and data are to be recorded therein.

Figure 18:
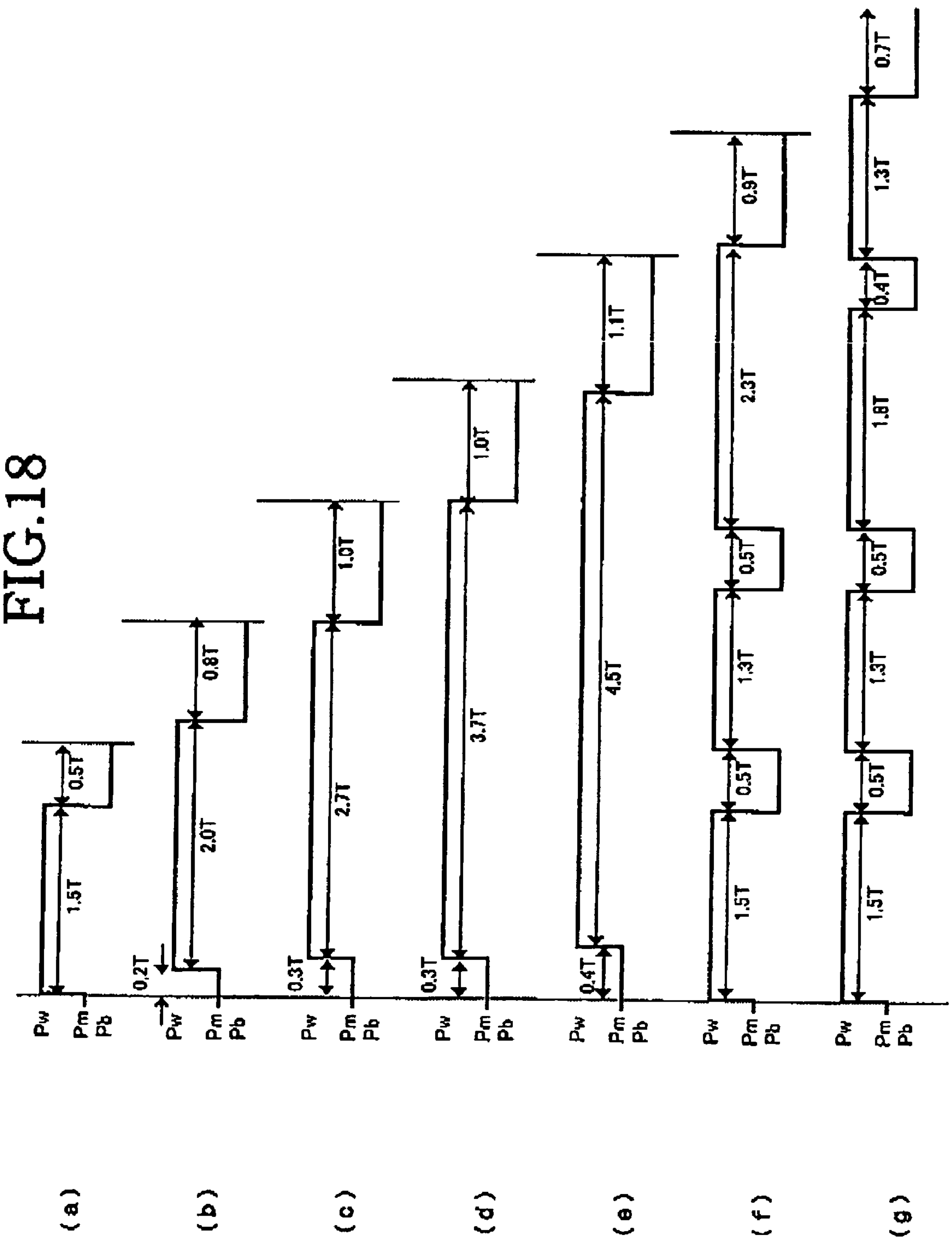
FIG. 18 is a diagram showing a recording strategy used for recording data in an L1 layer or an L0 layer of an optical recording medium using the (1.7)RLL Modulation Code in a method for recording data in an optical recording medium that is a still further preferred embodiment of the present invention.
Figure 19:
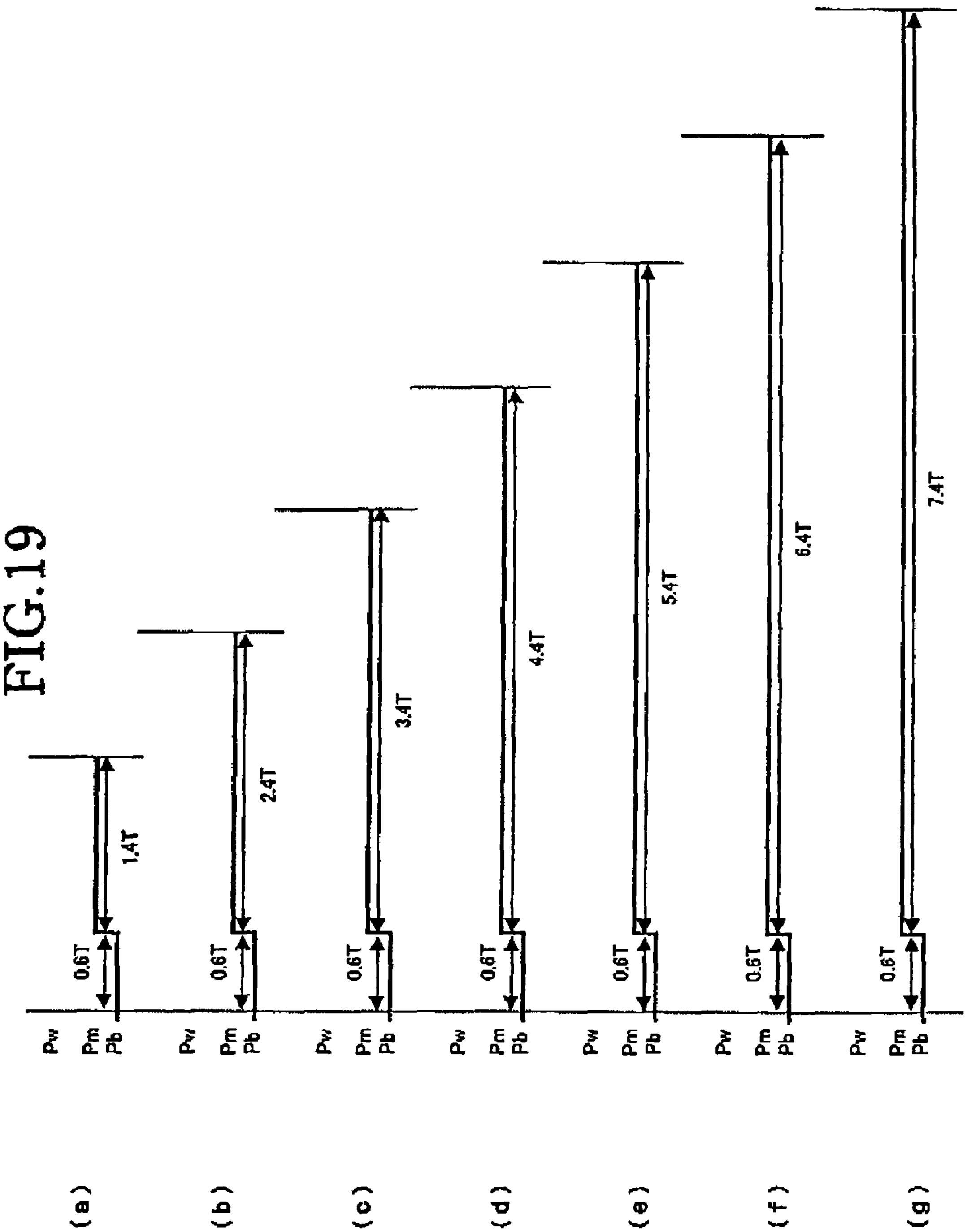
FIG. 19 is a diagram showing a recording strategy used for recording data in an L1 layer or an L0 layer of an optical recording medium using the (1.7)RLL Modulation Code in a method for recording data in an optical recording medium that is a still further preferred embodiment of the present invention.

FIGS. 18 and 19 are set of diagrams showing a method for modulating the power of a laser beam, namely, the recording strategy used in the case where data are to be recorded in the L1 recording layer 33 or the L0 recording layer 23 of the optical recording medium 10 using the (1.7)RLL Modulation Code, in a method for recording data in the optical recording medium 10 that is a further preferred embodiment of the present invention.

Each of FIGS. 18(*a*), (*b*), (*c*), (*d*), (*e*), (*f*) and (*g*) shows the pattern for modulating a laser beam in the case where a recording mark M having a length corresponding to from a 2T signal to an 8T signal is to be formed, and each of FIGS. 19(*a*), (*b*), (*c*), (*d*), (*e*), (*f*) and (*g*) shows the pattern for modulating a laser beam in the case where blank regions having a length corresponding to a 2T signal to an 8T signal is to be formed.

Also in the recording strategy according to this embodiment, as shown in FIG. 19, the power of the laser beam is modulated similarly to FIG. 11 in the case where a blank region having a length corresponding to a 2T signal to an 8T signal is to be formed in the L1 recording layer 33 or the L0 recording layer 23 of the optical recording medium 10, and further, as shown in FIG. 18, in the case where a recording mark M having a length corresponding to a 3T signal to a 5T signal is to be formed, the power of the laser beam is modulated using a single pulse respectively and is modulated similarly to in FIG. 16 so that the time of raising the power of the laser beam to the recording power Pw is delayed relative to the time of raising the power of the laser beam to the recording power Pw when a recording mark M having a length corresponding to a 2T signal is to be formed.

However, as shown in FIG. 18(*e*) and in this embodiment, furthermore, in the case where a recording mark M having a length corresponding to a 6T signal is to be formed, the power of the laser beam is modulated using a single pulse and is modulated so that the time of raising the power of the laser beam to the recording power Pw is delayed by 0.4T relative to the time of raising the power of the laser beam to the recording power Pw when a recording mark M having a length corresponding to a 2T signal is to be formed.

In a study done by the inventors of the present invention, it was observed that in the case where a recording mark M having a length corresponding to a 6T signal was to be formed, if the power of the laser beam was modulated using a single pulse, the length of a recording mark M tended to be longer than the desired length, whereby jitter of the reproduced signal became worse.

However, the inventors found that even if the power of the laser beam was modulated using a single pulse and a recording mark M having a length corresponding to a 6T signal was to be formed, in the case where the power of a laser beam was modulated so that the time of raising the power of the laser beam to the recording power Pw was delayed by 0.4T relative to the time of raising the power of the laser beam to the recording power Pw when a recording mark M having a length corresponding to a 2T signal was to be formed, it was possible to form a recording mark M having the desired length even if a recording mark M having a length corresponding to a 6T signal was to be formed in the L1 recording layer 33, whereby it was possible to greatly reduce jitter of the reproduced signal.

Therefore, according to this embodiment, it is possible to form a recording mark M having the desired length and is possible to greatly reduce jitter of the reproduced signal even if a recording mark M having a length corresponding to a 6T signal is recorded in the L0 recording layer 23 or the L1 recording layer 33 of the optical recording medium 10 and data are to be recorded therein.

Figure 20:
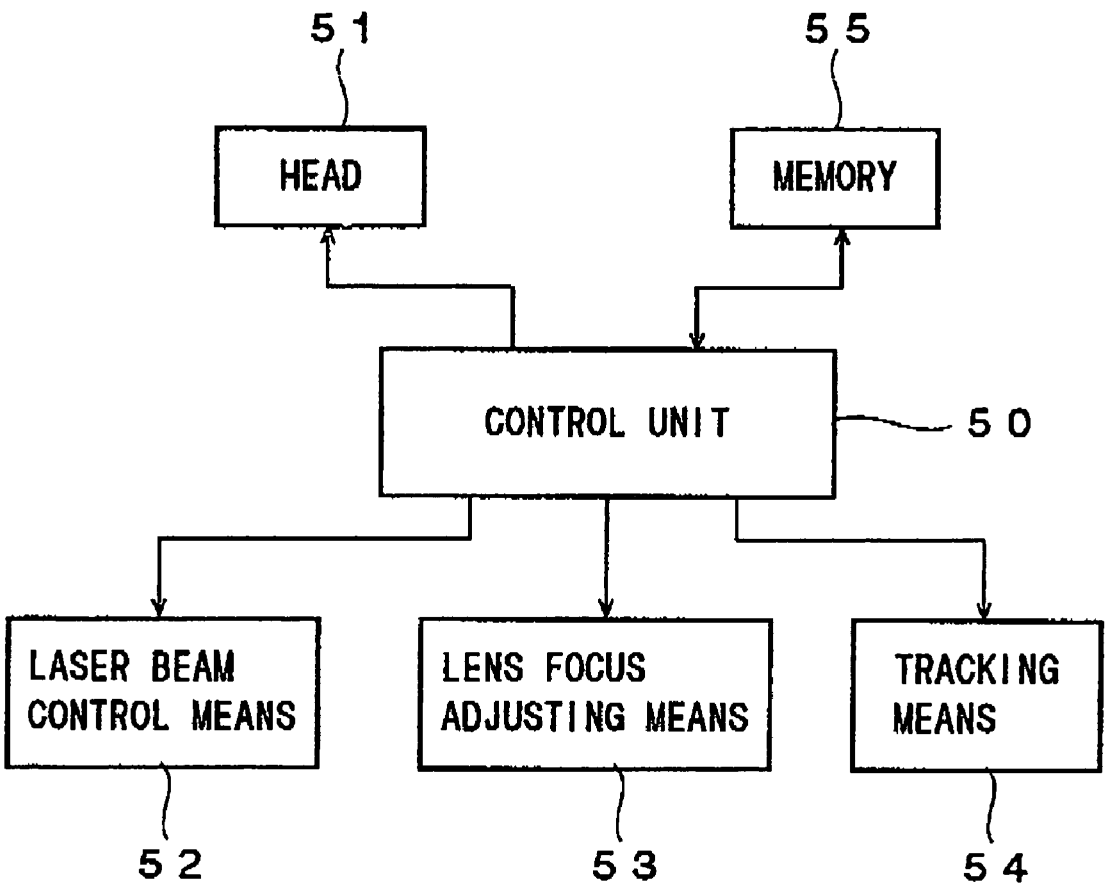
FIG. 20 is a block diagram showing an apparatus for recording data in an optical recording medium that is a preferred embodiment of the present invention.

FIG. 20 is a block diagram showing a data recording apparatus that is a preferred embodiment of the present invention.

As shown in FIG. 20, a data recording apparatus according to this embodiment includes a controlling unit 50 for controlling the overall operation of the recording apparatus, a head 51 including a laser beam source (not shown) for emitting a laser beam and an objective lens (not shown) whose numerical aperture is 0.85, a laser beam controlling means 52, a lens focus controlling means 53, a tracking means 54 for controlling the position of the head 51 so that a laser beam emitted from the laser source can follow the center of the track of the optical recording medium 10, and a memory 55.

In this embodiment, the recording strategy used for modulating the power of the laser beam is stored in the memory of the data recording apparatus according to the kind of the optical recording medium 10.

In this embodiment, the recording strategy shown in FIG. 10, the recording strategy shown in FIG. 11, the recording strategy shown in 12, the recording strategy shown in FIG. 13 and other recording strategies are stored in the memory of the data recording apparatus.

When the data are recorded in the optical recording medium 10, the optical recording medium 10 is first set in the data recording apparatus.

After the optical recording medium 10 has been set in the recording apparatus, the controlling unit 50 outputs a lens focus controlling signal to the lens focus controlling means 53 and causes the lens focus controlling means 53 to control the position of the object lens (not shown) so that the laser beam is focused on whichever of the L0 recording layer 23 and the L1 recording layer 33 data are to be recorded in.

Subsequently, the controlling unit 50 outputs a tracking execution signal to the tracking means 54, and causes the tracking means 51 to control the position of a head 51.

In this embodiment, ID data which specifies the kind of the optical recording medium 10 are recorded as a wobble or prepits in the optical recording medium 10, therefore the controlling unit 50 reads the ID data recorded in the optical recording medium 10, and stores them in a memory 55.

Subsequently, the controlling unit 50 creates the recording strategy based on ID data read from the memory 55, generates a laser power controlling signal according to the created recording strategy, and outputs the laser power controlling signal to a laser beam controlling means 52 that causes a laser beam whose power is modulated according to the recording strategy to be projected onto the L0 recording layer 23 or the L1 recording layer 33 of the optical recording medium 10 and the data are recorded in the L0 recording layer 23 or the L1 recording layer 33 of the optical recording medium 10.

According to this embodiment, the controlling unit 50 of the data recording apparatus creates the most suitable recording strategy for the kind of the recording medium 10 and recording linear velocity among the recording strategy shown in FIGS. 12 and 13, the recording strategy shown in FIGS. 14 and 15, the recording strategy shown in FIGS. 16 and 17 and the recording strategy shown in FIGS. 18 and 19, based on the ID data recorded in the optical recording medium 10, and modulates the power of a laser beam according to the created recording strategy to record data in the L0 recording layer 23 or the L1 recording layer 33 of the optical recording medium 10, whereby it is possible to generate a reproduced signal with greatly reduced jitter.

WORKING EXAMPLES AND A COMPARATIVE EXAMPLE

Hereinafter, a working example and comparative example will be set out in order to further clarify the advantages of the present invention.

Working Example 1

An optical recording medium sample #1 was fabricated in the following manner.

A disk-like polycarbonate substrate having a thickness of 1.1 mm and a diameter of 120 mm and formed with grooves and lands on the surface thereof was first fabricated by injection molding process so that the truck pitch (groove pitch) was equal to 0.32 μm.

Then, the polycarbonate substrate was set on a sputtering apparatus, a reflective film consisting of an alloy of Ag, Pd and Cu and having a thickness of 100 nm, a fourth dielectric film containing a mixture of ZnS and $SiO_2$ and having a thickness of 28 nm, a second L0 recording film containing Cu as a primary component and having a thickness of 5 nm, a first L0 recording film containing Si as a primary component and having a thickness of 5 nm, a third dielectric film containing a mixture of ZnS and $SiO_2$ and having a thickness of 25 nm were sequentially formed on the surface of the polycarbonate substrate on which the grooves and the lands using the sputtering process, thereby forming an L0 layer.

The mole ratio of ZnS to $SiO_2$ in the mixture of ZnS and $SiO_2$ contained in the third dielectric film and the fourth dielectric film was 80:20.

Further, the polycarbonate substrate formed with the L0 layer on the surface thereof was set on a spin coating apparatus and the third dielectric film was coated with a resin solution prepared by dissolving acrylic ultraviolet curable resin in a solvent to form a coating layer while the polycarbonate substrate was being rotated. Then, a stamper formed with grooves and lands was placed on the surface of the coating layer and the surface of the coating layer was irradiated with an ultraviolet ray via the stamper, thereby curing the acrylic ultraviolet curable resin. A transparent intermediate layer having a thickness of 25 μm and formed with grooves and lands the surface thereof so that the track pitch (groove pitch) was equal to 0.32 μm was formed by removing the stamper.

Then, the polycarbonate substrate formed with the L0 layer and the transparent intermediate layer on the surface thereof was set on the sputtering apparatus and a second dielectric film containing a mixture of ZnS and $SiO_2$ and having a thickness of 115 nm, a second L1 recording film containing Cu as a primary component and having a thickness of 5 nm, a first L1 recording film containing Si as a primary component and having a thickness of 4 nm and a first dielectric film containing a mixture of ZnS and $SiO_2$ and having a thickness of 30 nm were sequentially formed on the surface of the transparent intermediate layer using the sputtering process, thereby forming an L1 layer on the surface of the transparent intermediate layer.

The mole ratio of ZnS to $SiO_2$ in the mixture of ZnS and $SiO_2$ contained in the second dielectric film was 80:20.

Further, the first dielectric film was coated using the spin coating method with a resin solution prepared by dissolving acrylic ultraviolet curing resin in a solvent to form a coating layer and the coating layer was irradiated with ultraviolet rays, thereby curing the acrylic ultraviolet curing resin to form a light transmission layer having a thickness of 75 $\mu$m. Thus, the optical recording medium sample #1 was fabricated.

The optical recording medium sample #1 was set in a DDU1000 optical recording medium evaluation apparatus manufactured by Pulstec Industrial Co., Ltd., a blue laser beam having a wavelength of 405 nm was employed as the leaser beam for recording data and a laser beam was condensed onto the first L1 recording film and the second L1 recording film via the light transmission layer using an objective lens whose numerical aperture was 0.85 and the power of a laser beam was modulated according to the recording strategy shown in FIGS. 12 and 13, and data were recorded therein under the following recording conditions.

Modulation Code: (1.7)RLL

Channel Bit Length: 0.112 $\mu$m

Recording Linear Velocity: 19.7 m/sec

Channel Clock: 264 MHz

Recording Signal: Random signals including a 2T signal to an 8T signal

The recording power Pw of a laser beam was set to 9.2 mW, the bottom power Pb was set to 1.8 mW and the intermediate power Pm was set to 5.5 mW.

Then, the random signals including a 2T signal to an 8T signal were recorded in the L1 recording film of the optical recording medium sample #1 and the second L1 recording film were reproduced using the above mentioned optical recording medium evaluation apparatus and jitter of reproduced signal was measured. When data were reproduced, a laser beam having a wavelength of 405 nm and the object lens having a numerical aperture of 0.85 were used and the power of the laser beam was set to 0.7 mW.

Similarly, random signals including a 2T signal to an 8T signal were recorded in the first L1 recording film and the second L1 recording film while varying the recording power Pw of a laser beam up to 11.4 mW by 0.2 mW. Then, the thus recorded random signals including a 2T signal to an 8T signal were reproduced and jitter of the reproduced signals was measured.

Figure 21:
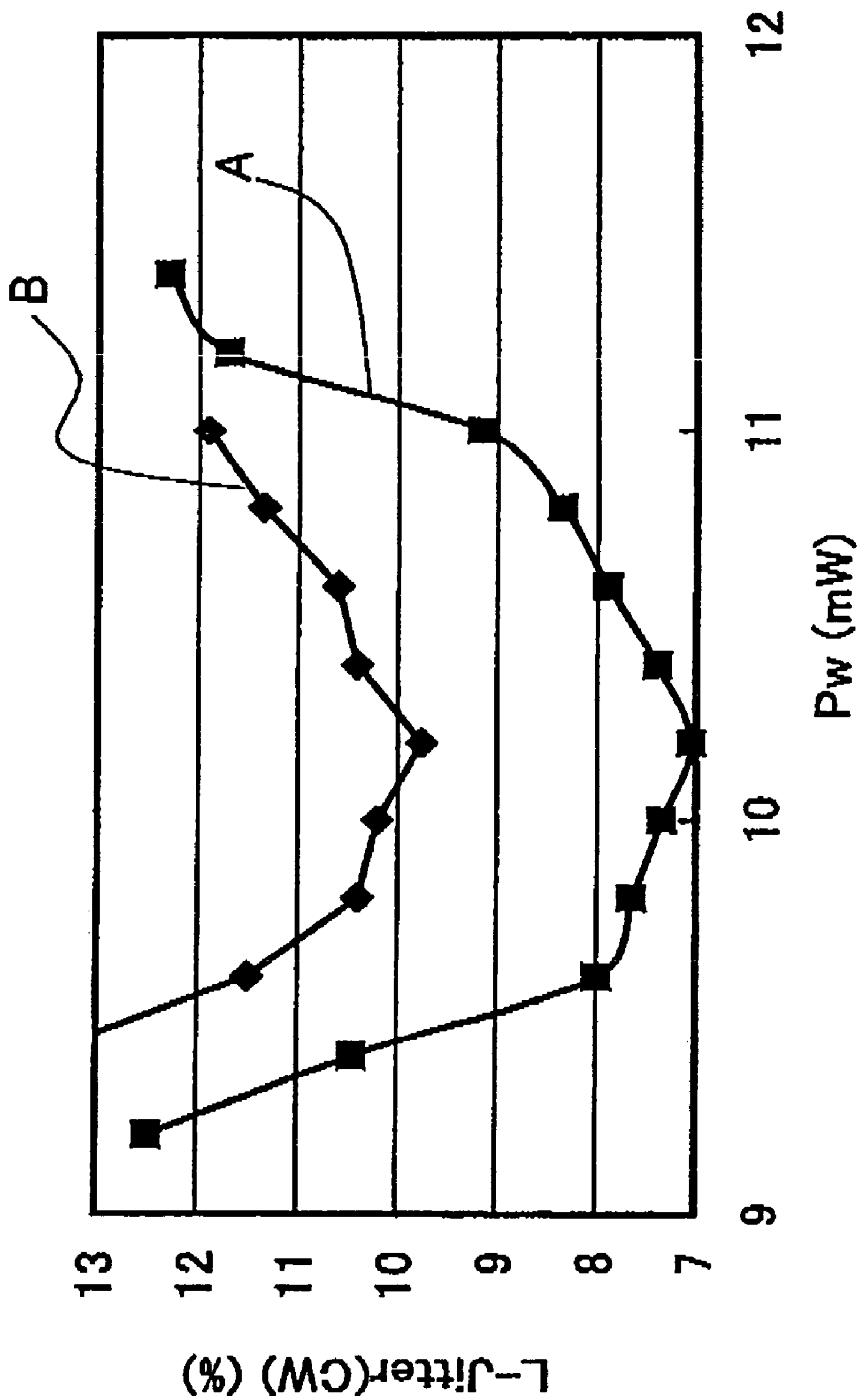
FIG. 21 is graph showing the relationship between jitter of a reproduced signal and a recording power Pw of a laser beam used for recording data, which were measured in Working Example 1 and Comparative Example 1.

The results of the measurement are shown by the curve A of FIG. 21.

Comparative Example 1

Random signals including a 2T signal to an 8T signal were recorded in the first L1 recording film of the optical recording medium sample #1 and the second L1 recording film, thus recorded random signals including a 2T signal to an 8T signal were reproduced and jitter of the reproduced signals was measured in the manner of the Working Example 1, except that the power of a laser beam was modulated according to the recording strategy shown in FIGS. 10 and 11 and the recording power Pw of a laser beam was varied between 9.4 mW and 11.0 mW in 0.2 mW increments.

The results of the measurement are shown by the curve B of FIG. 21.

As shown in FIG. 21, it was observed that when the power of the laser beam was modulated using a single pulse and a recording mark having a length corresponding to a 3T signal was to be formed in the first L1 recording film and the second L1 recording film of the optical recording medium sample #1, in the case where the power of the laser beam was modulated so that the time of raising the power of the laser beam to the recording power Pw was delayed by 0.2T relative to the time of raising the power of the laser beam to the recording power Pw when a recording mark having a length corresponding to a 2T signal was to be formed, the jitter of the reproduced signal was, as shown in FIGS. 10 and 11, greatly reduced in comparison with that when the power of the laser beam was modulated so that the time of raising its power to the recording power Pw was the same as the time of raising the power of the laser beam to the recording power Pw when a recording mark having a length corresponding to any of a 2T signal to an 8T signal was to be formed therein.

Working Example 2

Random signals including a 2T signal to an 8T signal were recorded in the first L1 recording film of the optical recording medium sample #1 and the second L1 recording film, the thus recorded random signals including a 2T signal to an 8T signal were reproduced and jitter of the reproduced signals was measured in the manner of the Working Example 1, except that the power of the laser beam was modulated according to the recording strategy shown in FIGS. 14 and 15 and the recording power Pw of the laser beam was varied between 9.2 mW and 11.2 mW in 0.2 mW increments.

Figure 22:
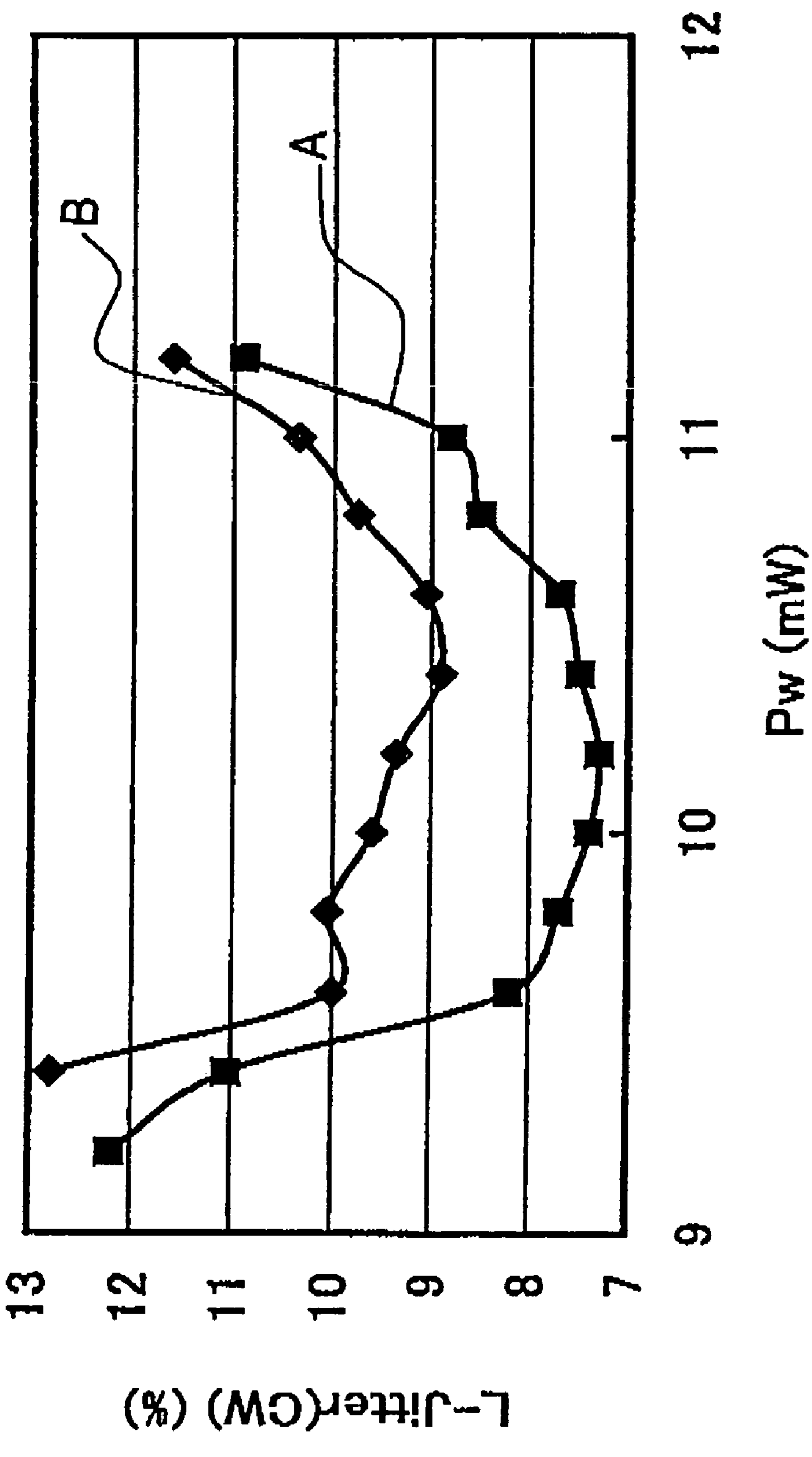
FIG. 22 is graph showing the relationship between jitter of a reproduced signal and a recording power Pw of a laser beam used for recording data, which were measured in Working Example 2 and Comparative Example 2.

The results of the measurement are shown by the curve A of FIG. 22.

Comparative Example 2

Figure 23:
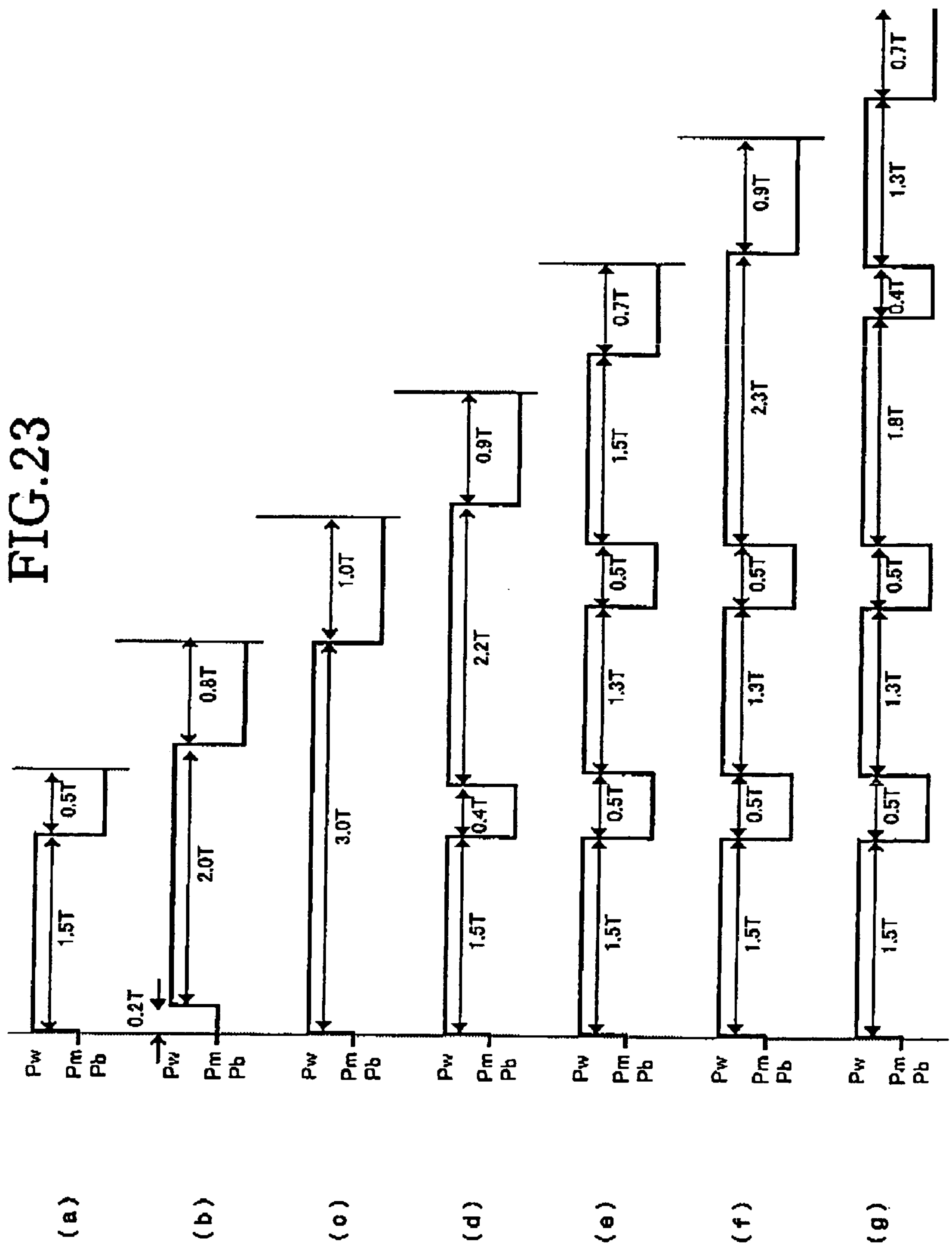
FIG. 23 is a diagram showing a recording strategy used for modulating the power of a laser beam in Comparative Example 2.
Figure 24:
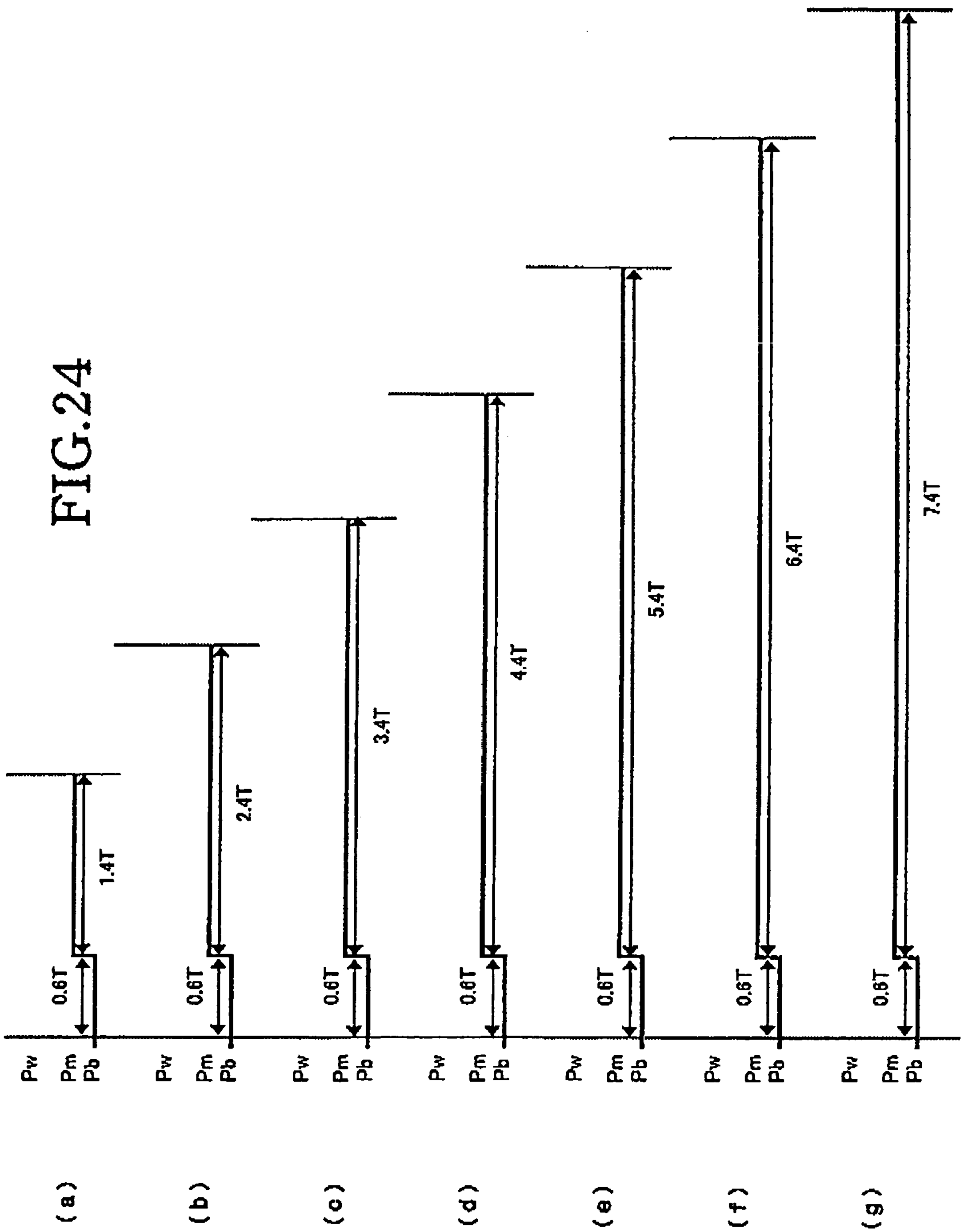
FIG. 24 is a diagram showing s recording strategy used for modulating the power of a laser beam in Comparative Example 2.

Random signals including a 2T signal to an 8T signal were recorded in the first L1 recording film of the optical recording medium sample #1 and the second L1 recording film, thus recorded random signals including a 2T signal to an 8T signal were reproduced and jitter of the reproduced signals was measured in the manner of the Working Example 1, except that the power of a laser beam was modulated according to the recording strategy shown in FIGS. 23 and 24 and the recording power Pw of a laser beam was varied between 9.4 mW and 11.2 mW in 0.2 mW increments.

The results of the measurement are shown by the curve B of FIG. 22.

As shown in FIG. 22, it was observed that when the power of a laser beam was modulated using a single pulse and a recording mark having a length corresponding to a 4T signal was to be formed in the first L1 recording film and the second L1 recording film of the optical recording medium sample #1, in the case where the power of a laser beam was modulated so that the time of raising the power of the laser beam to the recording power Pw was delayed by 0.3T relative to the time of raising the power of the laser beam when a recording mark having a length corresponding to a 2T signal was to be formed, the jitter of reproduced signal was greatly reduced in comparison with the case in which a recording mark having a length corresponding to a 4T signal was to be formed in the first L1 recording film and the second L1 recording film of the optical recording medium sample #1 using the recording strategy which conducted modulation so that the time of raising the power of the laser beam to the recording power Pw was the same as the time of raising the power of the laser beam to the recording power Pw when a recording mark having a length corresponding to a 2T signal and a 5T signal to an 8T signal was to be formed therein.

Working Example 3

Random signals including a 2T signal to an 8T signal were recorded in the first L1 recording film of the optical recording medium sample #1 and the second L1 recording film, thus recorded random signals including a 2T signal to an 8T signal were reproduced and jitter of the reproduced signals was measured in the manner of the Working Example 1, except that the power of a laser beam was modulated according to the recording strategy shown in FIGS. 16 and 17 and the recording power Pw of a laser beam was varied between 9.2 mW and 11.2 mW in 0.2 mW increments.

Figure 25:
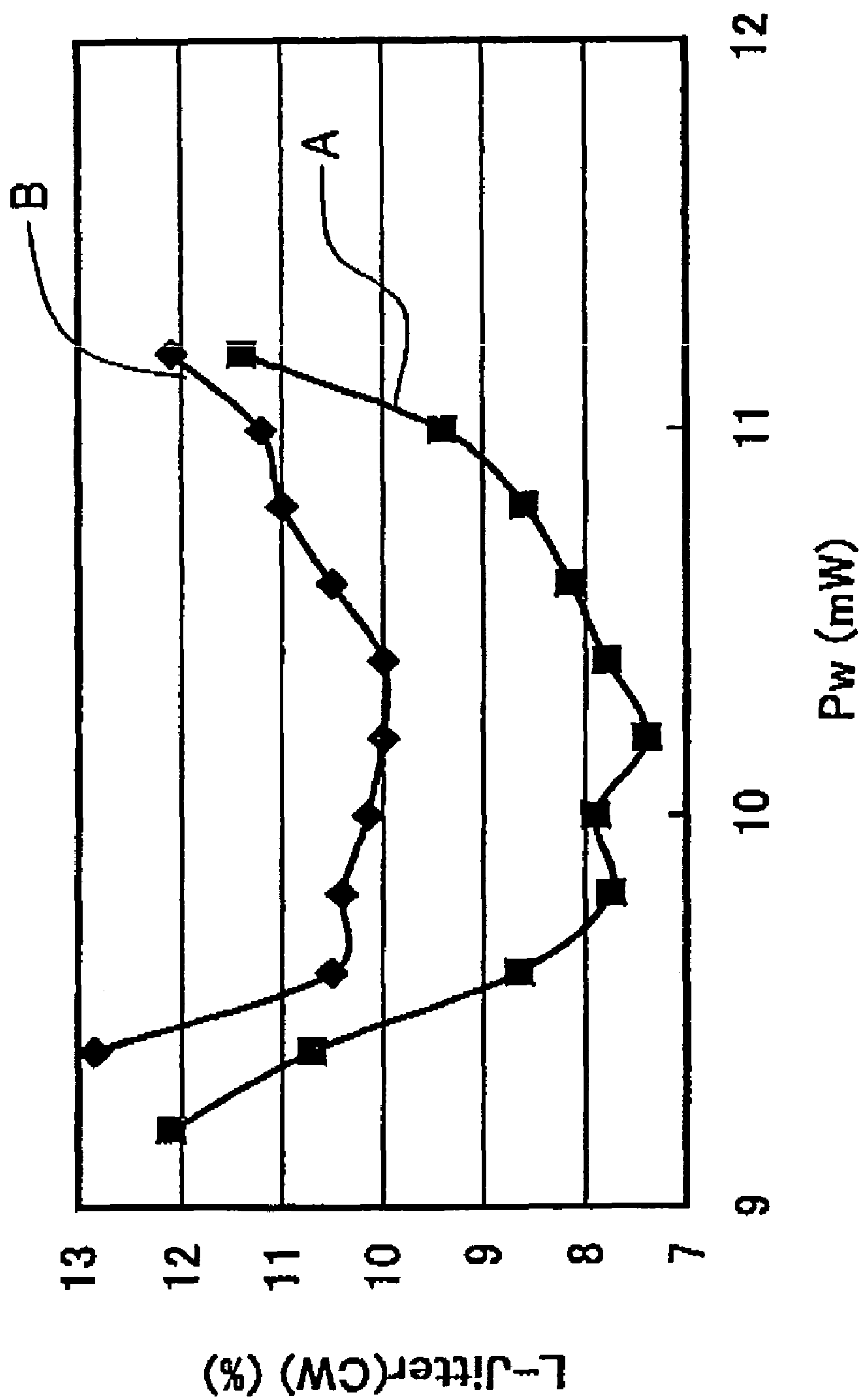
FIG. 25 is graph showing the relationship between jitter of a reproduced signal and a recording power Pw of a laser beam used for recording data, which were measured in Working Example 3 and Comparative Example 3.

The results of the measurement are shown by the curve A of FIG. 25.

Comparative Example 3

Figure 26:
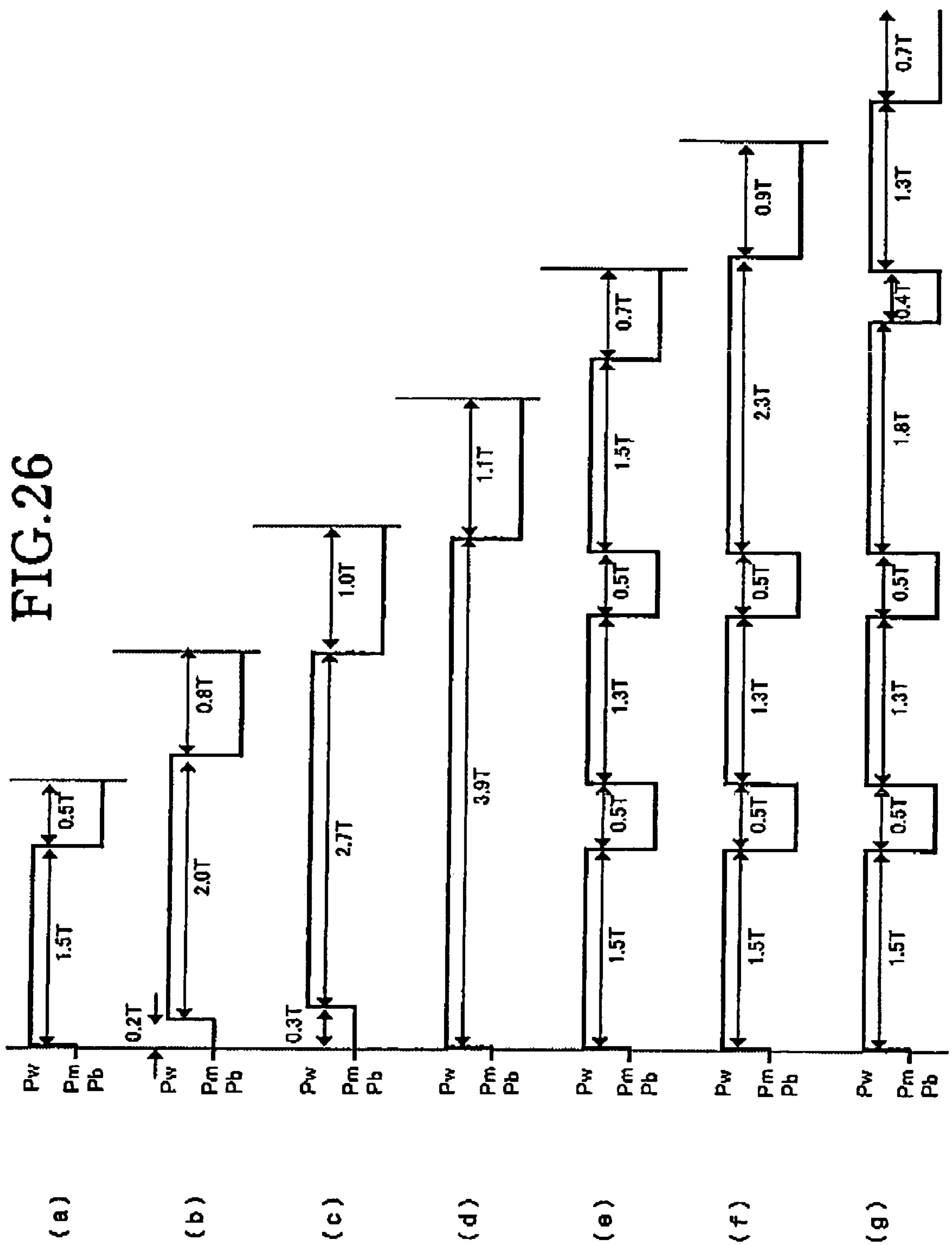
FIG. 26 is a diagram showing a recording strategy used for modulating the power of a laser beam in Comparative Example 3.
Figure 27:
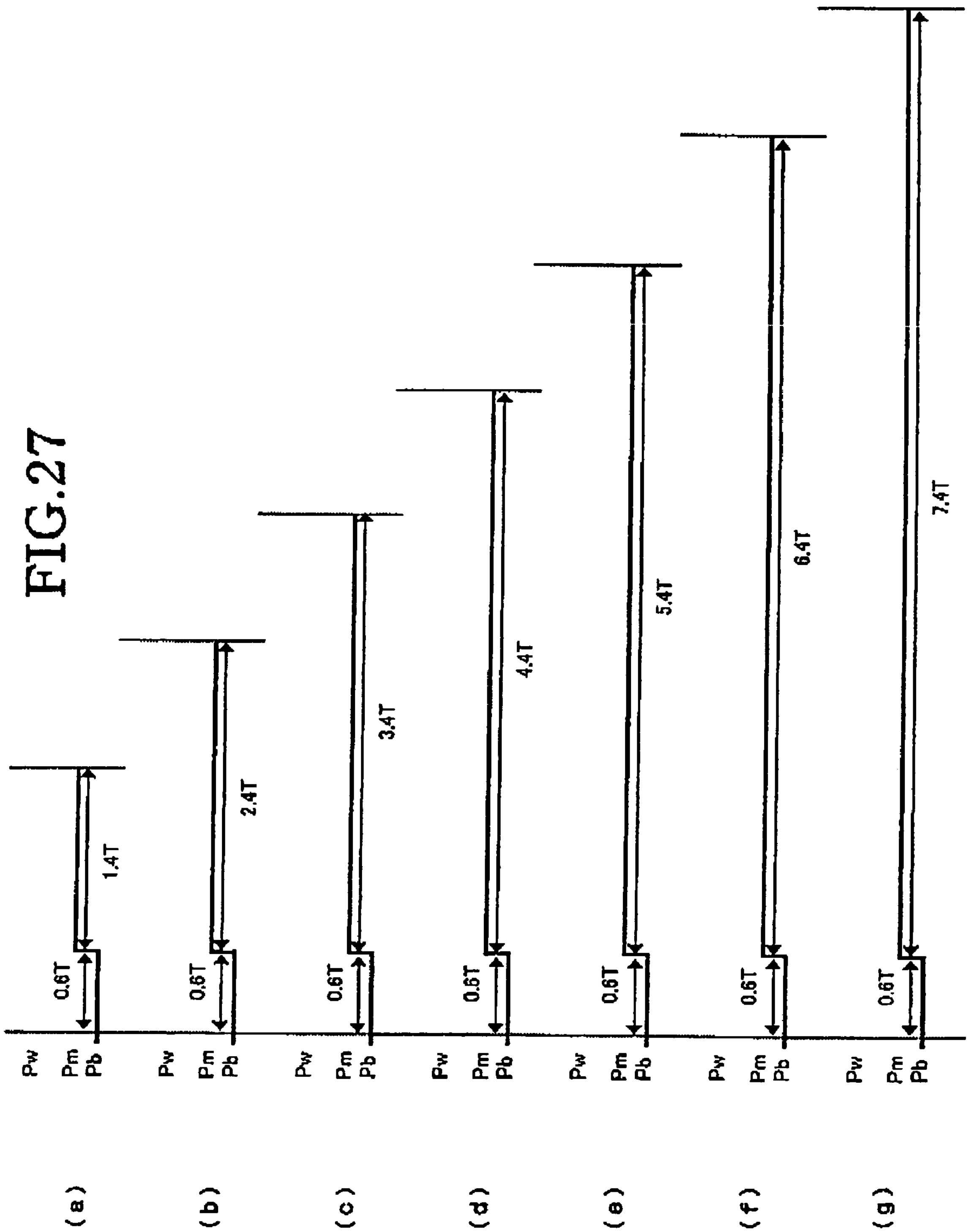
FIG. 27 is a diagram showing a recording strategy used for modulating the power of a laser beam in Comparative Example 3.

Random signals including a 2T signal to an 8T signal were recorded in the first L1 recording film of the optical recording medium sample #1 and the second L1 recording film, thus recorded random signals including a 2T signal to an 8T signal were reproduced and jitter of the reproduced signals was measured in the manner of the Working Example 1, except that the power of a laser beam was modulated according to the recording strategy shown in FIGS. 26 and 27 and the recording power Pw of a laser beam was varied between 9.4 mW and 11.2 mW in 0.2 mW increments.

The results of the measurement are shown by the curve B of FIG. 25.

As shown in FIG. 25, it was observed that when the power of a laser beam was modulated using a single pulse and a recording mark having a length corresponding to a 5T signal was to be formed in the first L1 recording film and the second L1 recording film of the optical recording medium sample #1, in the case where the power of the laser beam was modulated so that the time of raising the power of the laser beam to the recording power Pw was delayed by 0.3T relative to the time of raising the power of the laser beam when a recording mark having a length corresponding to a 2T signal and a 6T signal to an 8T signal was to be formed, the jitter of the reproduced signal was greatly reduced in comparison with the case in which a recording mark having a length corresponding to a 5T signal was to be formed in the first L1 recording film and the second L1 recording film of the optical recording medium sample #1 using the recording strategy which conducted modulation so that the time of raising the power of the laser beam to the recording power Pw was the same as the time of raising the power of the laser beam to the recording power Pw when a recording mark having a length corresponding to a 2T signal and a 6T signal to an 8T signal was to be formed therein.

Working Example 4

Random signals including a 2T signal to an 8T signal were recorded in the first L1 recording film of the optical recording medium sample #1 and the second L1 recording film, thus recorded random signals including a 2T signal to an 8T signal were reproduced and jitter of the reproduced signals was measured in the manner of the Working Example 1, except that the power of a laser beam was modulated according to the recording strategy shown in FIGS. 18 and 19 and the recording power Pw of a laser beam was varied between 9.4 mW and 11.2 mW in 0.2 mW increments.

Figure 28:
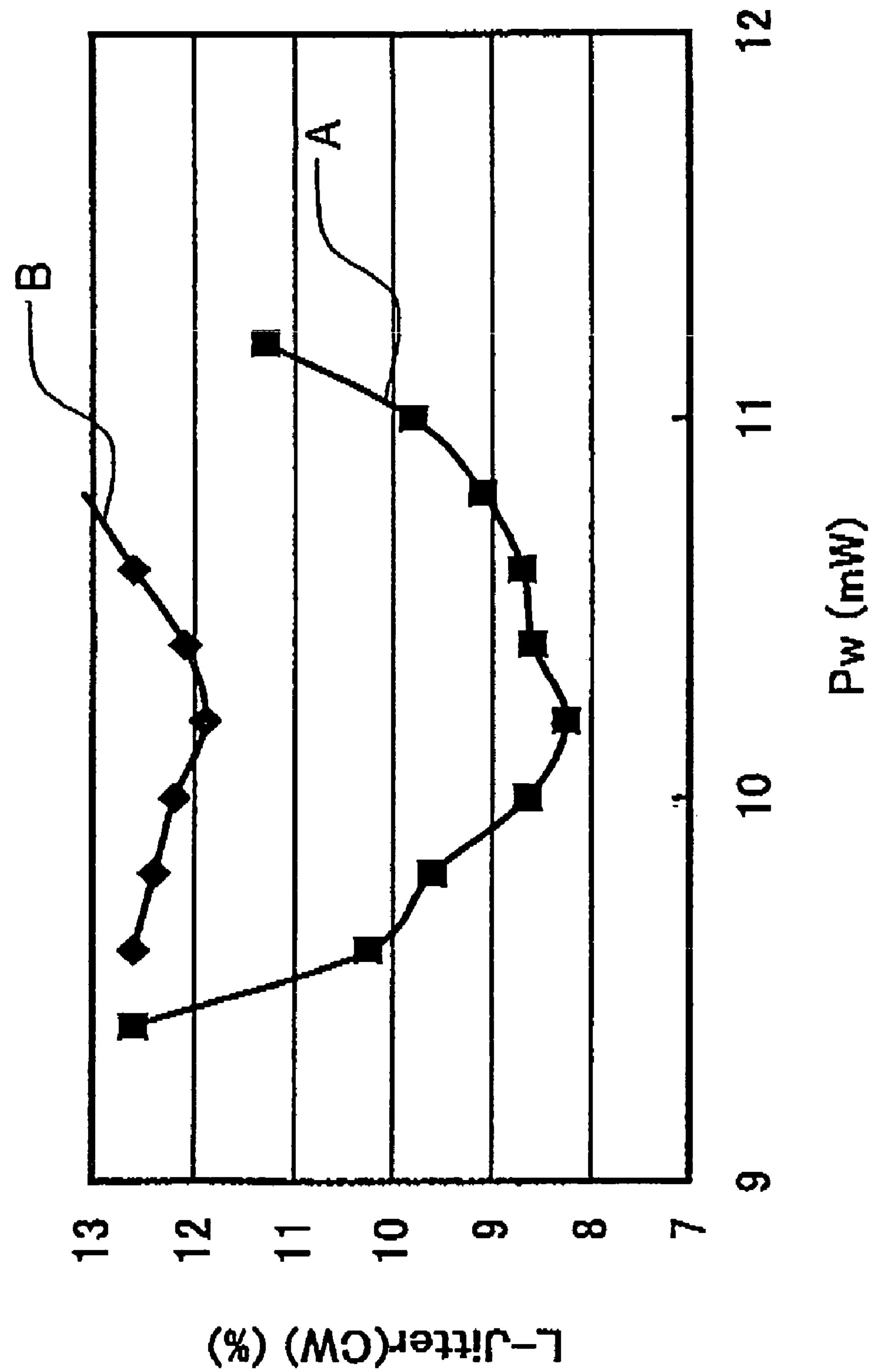
FIG. 28 is graph showing the relationship between jitter of a reproduced signal and a recording power Pw of a laser beam used for recording data, which were measured in Working Example 4 and Comparative Example 4.

The results of the measurement are shown by the curve A of FIG. 28.

Comparative Example 4

Figure 29:
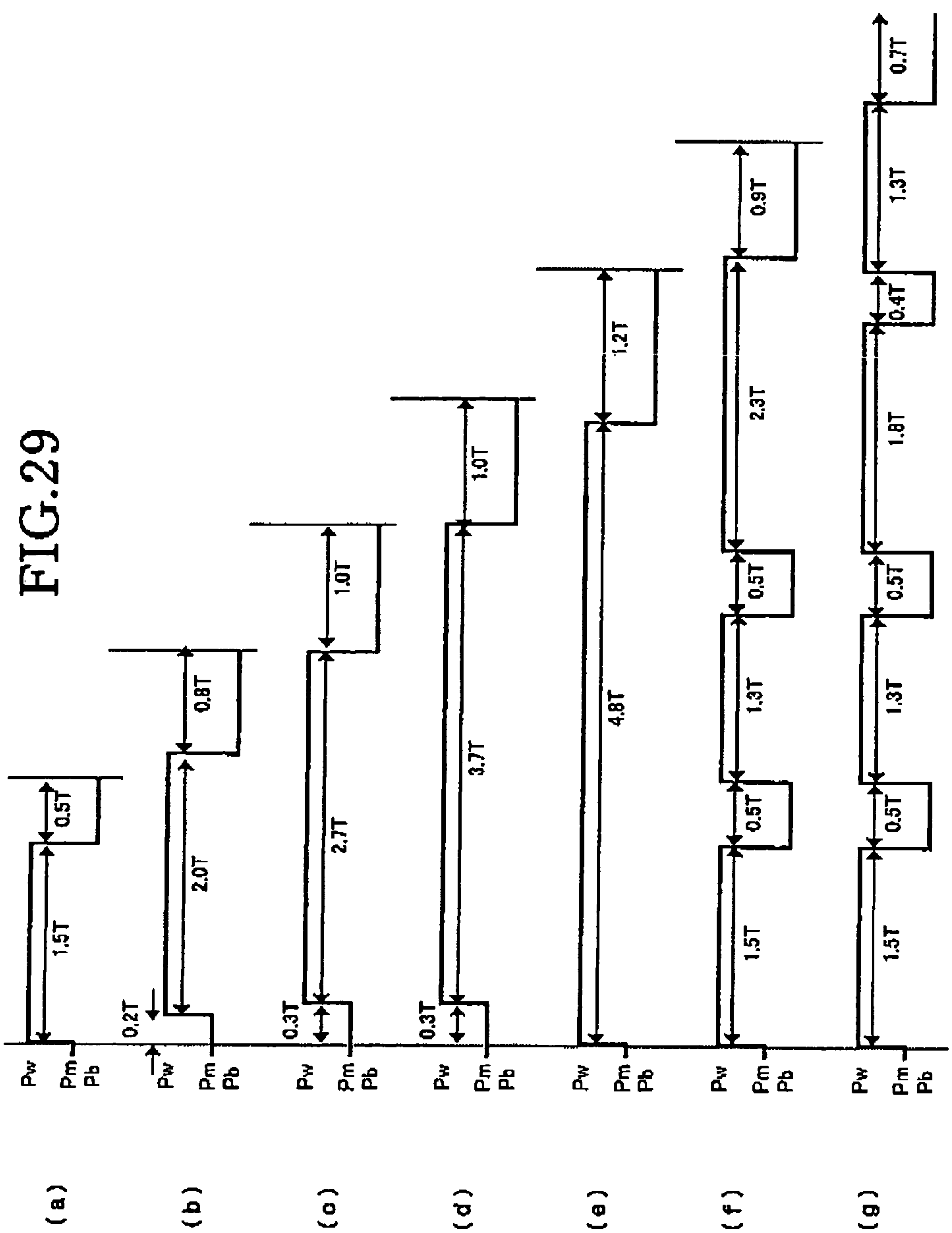
FIG. 29 is a diagram showing a recording strategy used for modulating the power of a laser beam in Comparative Example 4.
Figure 30:
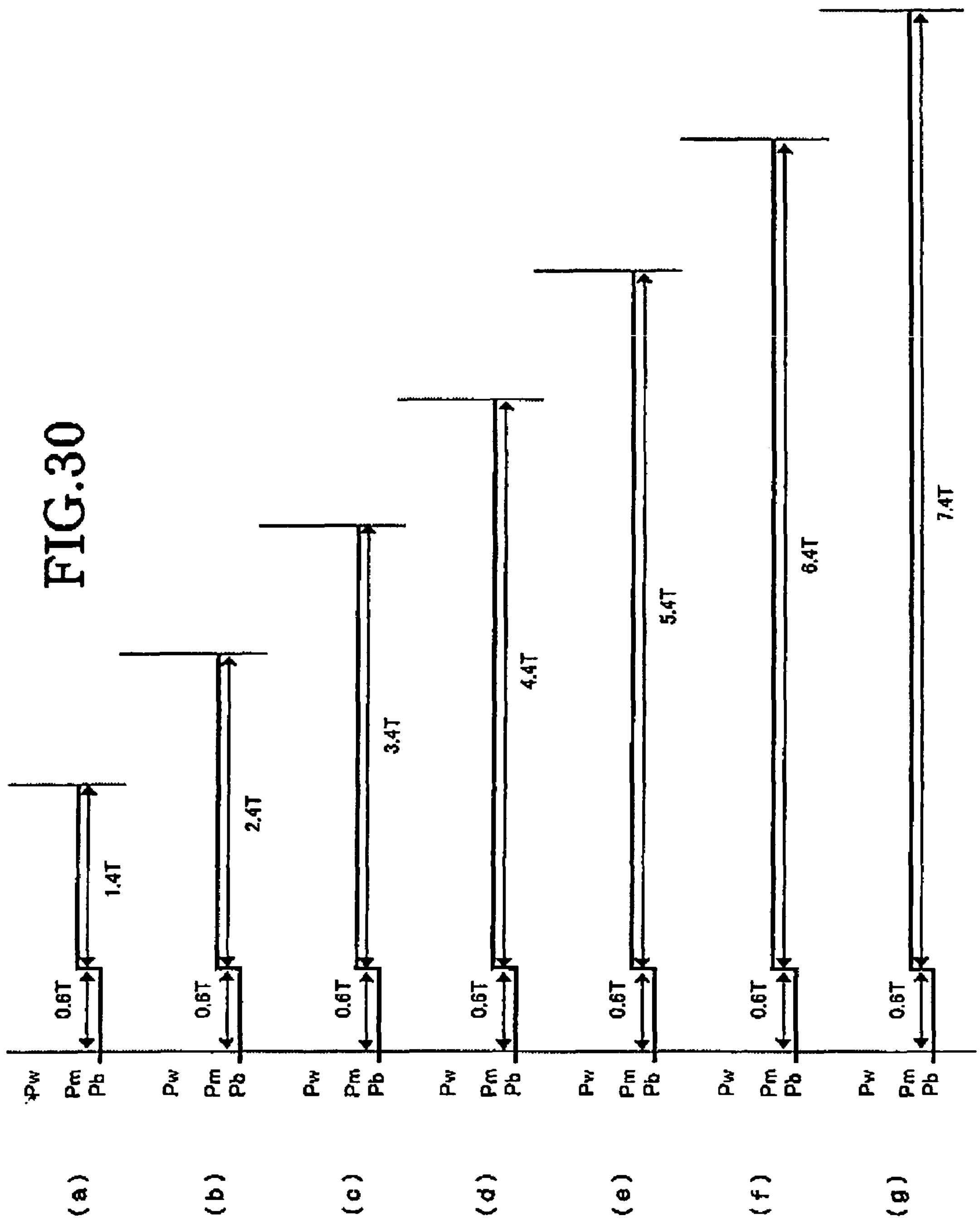
FIG. 30 is a diagram showing a recording strategy used for modulating the power of a laser beam in Comparative Example 4.

Random signals including a 2T signal to an 8T signal were recorded in the first L1 recording film of the optical recording medium sample #1 and the second L1 recording film, thus recorded random signals including a 2T signal to an 8T signal were reproduced and jitter of the reproduced signals was measured in the manner of the Working Example 1, except that the power of a laser beam was modulated according to the recording strategy shown in FIGS. 29 and 30 and the recording power Pw of a laser beam was varied between 9.6 mW and 10.8 mW in 0.2 mW increments.

The results of the measurement are shown by the curve B of FIG. 28.

As shown in FIG. 28, it was observed that when the power of a laser beam was modulated using a single pulse and a recording mark having a length corresponding to a 6T signal was to be formed in the first L1 recording film and the second L1 recording film of the optical recording medium sample #1, in the case where the power of a laser beam was modulated so that the time of raising the power of the laser beam to the recording power Pw was delayed by 0.3T relative to the time of raising the power of the laser beam to the recording power Pw when a recording mark having a length corresponding to a 2T signal, a 7T signal and an 8T signal was to be formed, the jitter of reproduced signal was greatly reduced in comparison with the case in which a recording mark having a length corresponding to a 6T signal was to be formed in the first L1 recording film and the second L1 recording film of the optical recording medium sample #1 using the recording strategy which conducted modulation so that the time of raising the power of the laser beam to the recording power Pw was the same as the time of raising the power of the laser beam to the recording power Pw when a recording mark having a length corresponding to a 2T signal, a 6T signal and an 8T signal was to be formed therein.

Working Example 5

Figure 31:
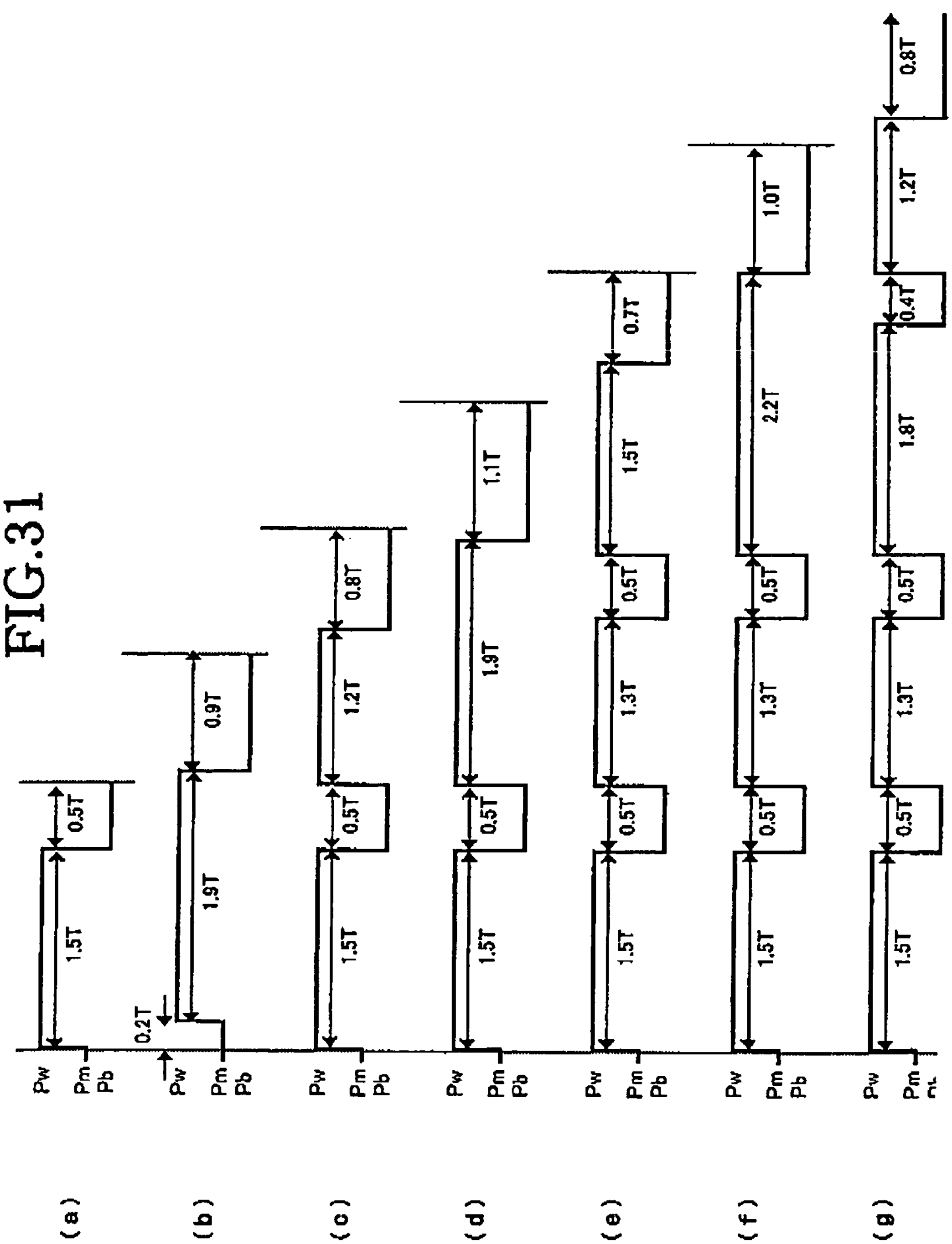
FIG. 31 is a diagram showing a recording strategy used for modulating the power of a laser beam in Working Example 5.
Figure 32:
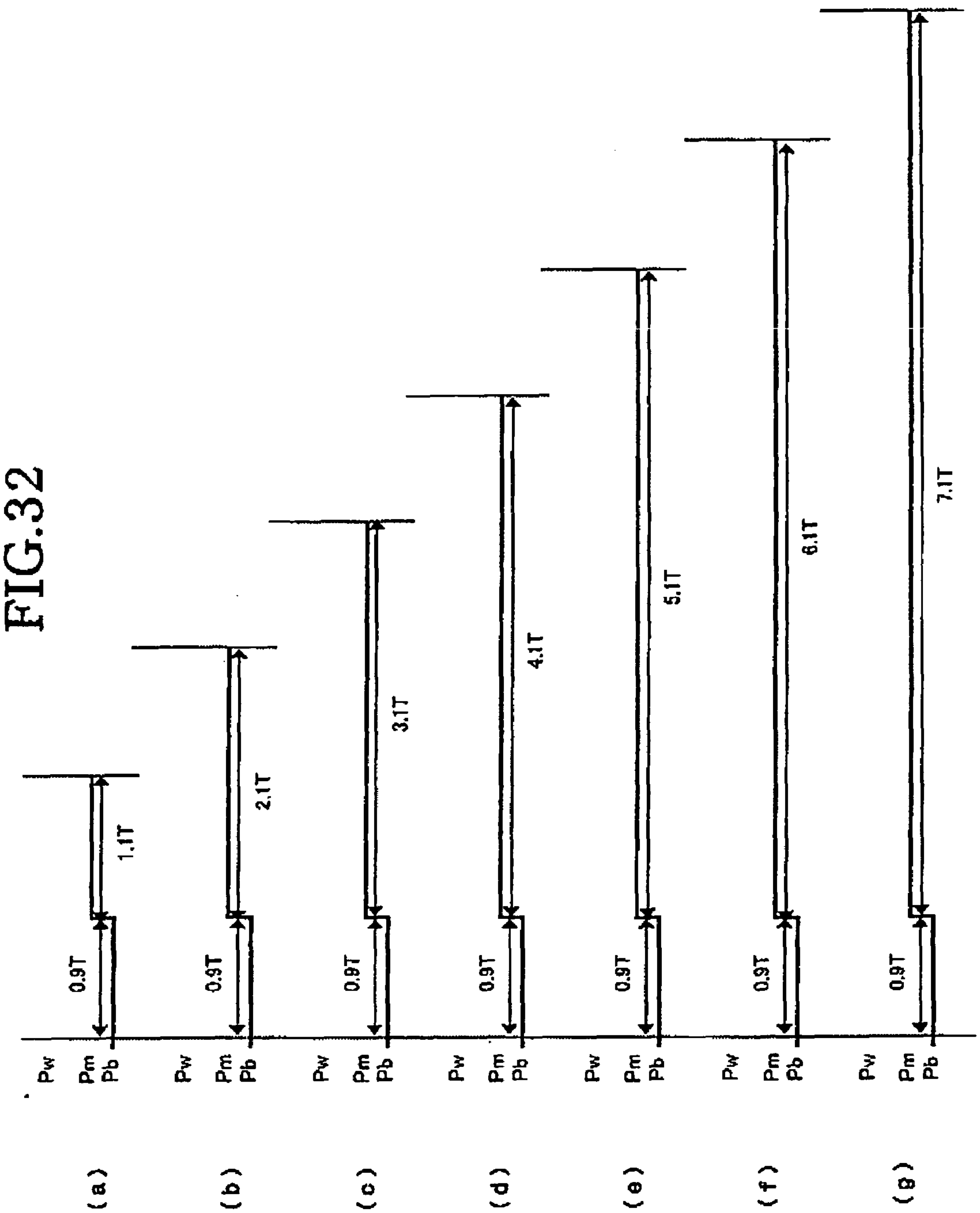
FIG. 32 is a diagram showing a recording strategy used for modulating the power of a laser beam in Working Example 5.

Random signals including a 2T signal to an 8T signal were recorded in the first L1 recording film of the optical recording medium sample #1 and the second L1 recording film, thus recorded random signals including a 2T signal to an 8T signal were reproduced and jitter of the reproduced signals was measured in the manner of the Working Example 1, except that the power of the laser beam was modulated according to the recording strategy shown in FIGS. 31 and 32, the recording linear velocity was set to 9.8 m/sec, the channel clock was set to 132 MHz, the bottom power Pb was set to 0.1 mW, and the intermediate power Pm was set to 3.3 mW, respectively, and the recording power Pw of a laser beam was varied between 6.8 mW and 8.6 mW in 0.2 mW increments.

Figure 33:
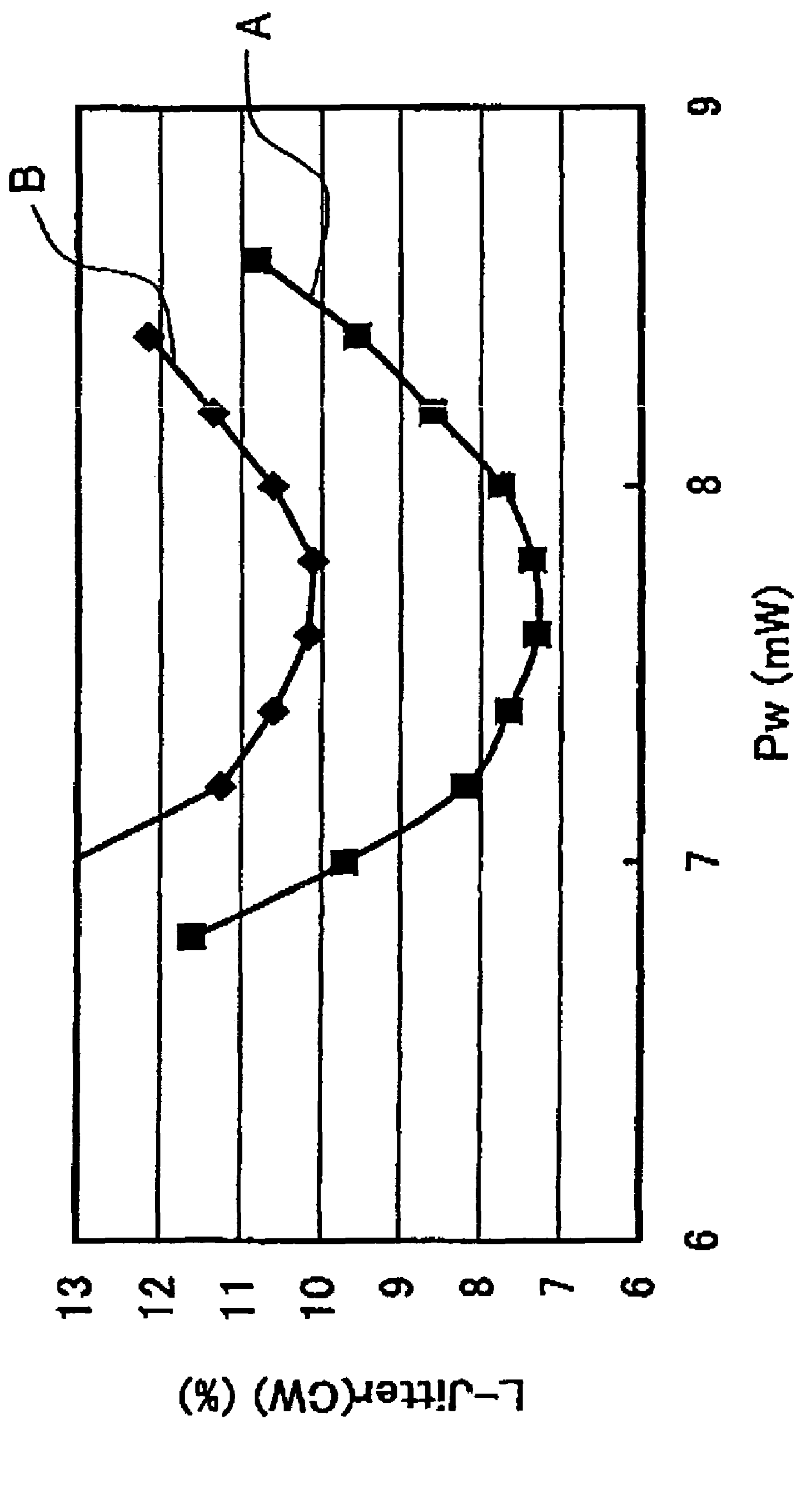
FIG. 33 is graph showing the relationship between jitter of a reproduced signal and a recording power Pw of a laser beam used for recording data, which were measured in Working Example 5 and Comparative Example 5.

The results of the measurement are shown by the curve A of FIG. 33.

Comparative Example 5

Figure 34:
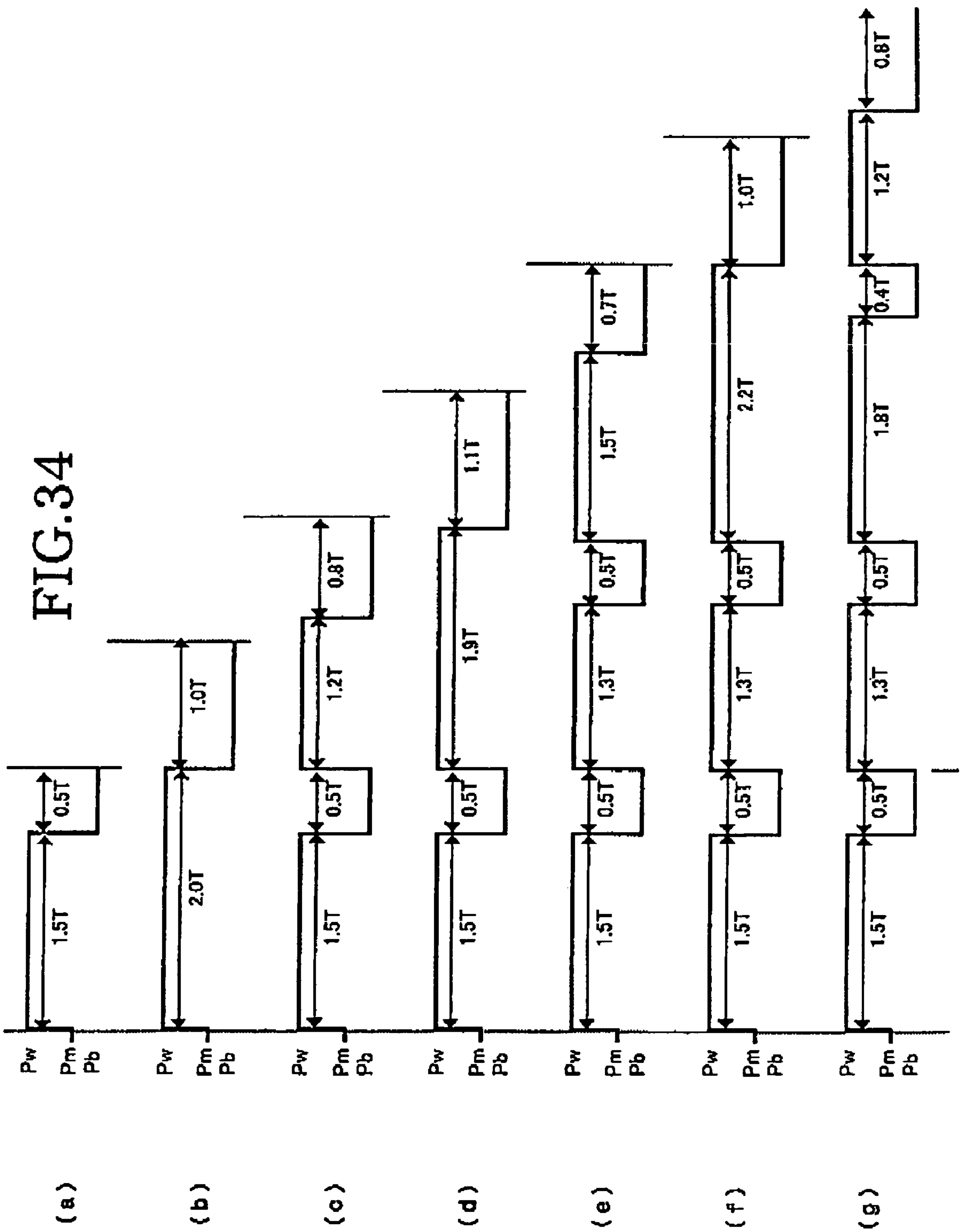
FIG. 34 is a diagram showing a recording strategy used for modulating the power of a laser beam in Comparative Example 5.
Figure 35:
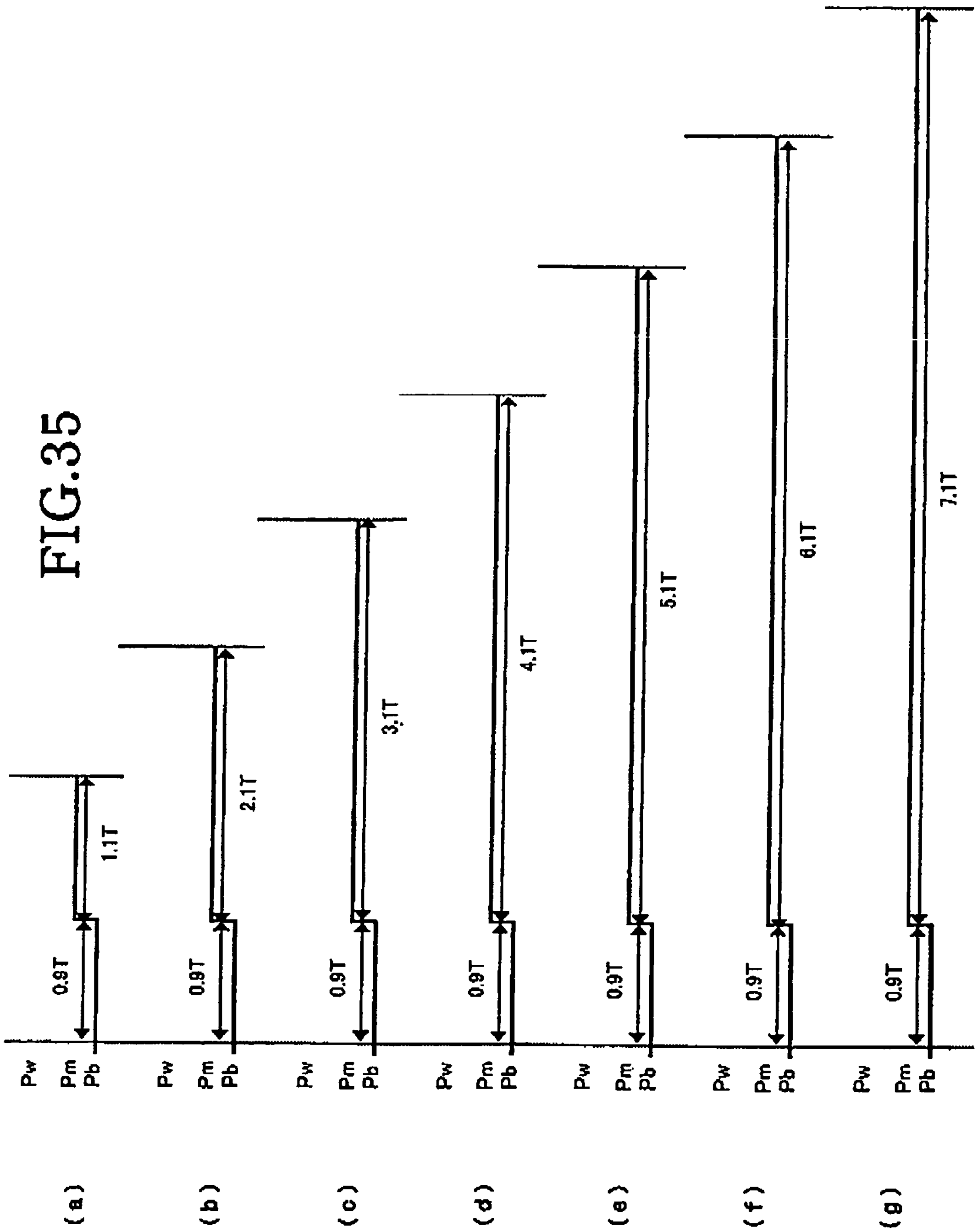
FIG. 35 is a diagram showing a recording strategy used for modulating the power of a laser beam in Comparative Example 5.

Random signals including a 2T signal to an 8T signal were recorded in the first L1 recording film of the optical recording medium sample #1 and the second L1 recording film, thus recorded random signals including a 2T signal to an 8T signal were reproduced and jitter of the reproduced signals was measured in the manner of the Working Example 5, except that the power of a laser beam was modulated according to the recording strategy shown in FIGS. 34 and 35, the bottom power Pb was set to 0.1 mW and the intermediate power Pm was set to 3.3 mW, respectively, and the recording power Pw of a laser beam was varied between 7.0 mW and 8.4 mW in 0.2 mW increments.

The results of the measurement are show by the curve B of FIG. 33.

As shown in FIG. 33, it was observed that even if the recording linear velocity was set low, when the power of the laser beam was modulated using a single pulse and a recording mark having a length corresponding to a 3T signal was formed in the first L1 recording film and the second L1 recording film of the optical recording medium sample #1, in the case where the power of the laser beam was modulated so that the time of raising the power of the laser beam to the recording power Pw was delayed by 0.2T relative to the time of raising the power of the laser beam to the recording power Pw when a recording mark having a length corresponding to a 2T signal and a 4T signal to an 8T signal was to be formed, the jitter of reproduced signal was, as shown in FIGS. 34 and 35, greatly reduced in comparison with the case where the power of the laser beam was modulated so that the time of raising the power of the laser beam to the recording power Pw was the same as the time of raising the power of the laser beam to the recording power Pw when a recording mark having a length corresponding to any of a 2T signal to an 8T signal was to be formed therein.

Therefore, it was proven that not only in the case where data were recorded in the L1 recording layer at high recording linear velocity but also in the case where data were recorded in the L1 recording layer at low recording linear velocity, jitter of the reproduced signal was greatly reduced when the power of the laser beam was modulated using a single pulse and a recording mark having a length corresponding to a 3T signal was to be formed, by modulating the power of the laser beam so that the time of raising the power of the laser beam to the recording power Pw was delayed by 0.2T relative to the time of raising the power of the laser beam to the recording power Pw when a recording mark having a length corresponding to a 2T signal and a 4T signal to an 8T signal was to be formed.

Working Example 6

An optical recording medium sample #2 was fabricated in the following manner.

A disk-like polycarbonate substrate having a thickness of 1.1 mm and a diameter of 120 mm and formed with a groove and a land on the surface thereof was first fabricated by injection molding process so that the truck pitch (groove pitch) was equal to 0.32 μm.

Then, the polycarbonate substrate was set on the sputtering apparatus, a reflective film consisting of an alloy of Ag, Pd and Cu and having a thickness of 100 nm, a second dielectric film containing a mixture of ZnS and $SiO_2$ and having a thickness of 28 nm, a second recording film containing Cu as a primary component and having a thickness of 5 nm, a first recording film containing Si as a primary component and having a thickness of 5 nm, a first dielectric film containing a mixture of ZnS and $SiO_2$ and having a thickness of 25 nm were sequentially formed on the surface of the polycarbonate substrate on which grooves and lands were formed using the sputtering process.

The mole ratio of ZnS to $SiO_2$ in the mixture of ZnS and $SiO_2$ contained in the first dielectric film and the second dielectric film was 80:20.

Further, the first dielectric film was coated using the spin coating method with a resin solution prepared by dissolving acrylic ultraviolet curing resin in a solvent to form a coating layer and the coating layer was irradiated with ultraviolet rays, thereby curing the acrylic ultraviolet curing resin to form a light transmission layer having a thickness of 100 μm. Thus, the optical recording medium sample #2 was fabricated.

The optical recording medium sample #1 was set in a DDU1000 optical recording medium evaluation apparatus manufactured by Pulstec Industrial Co., Ltd.

Figure 36:
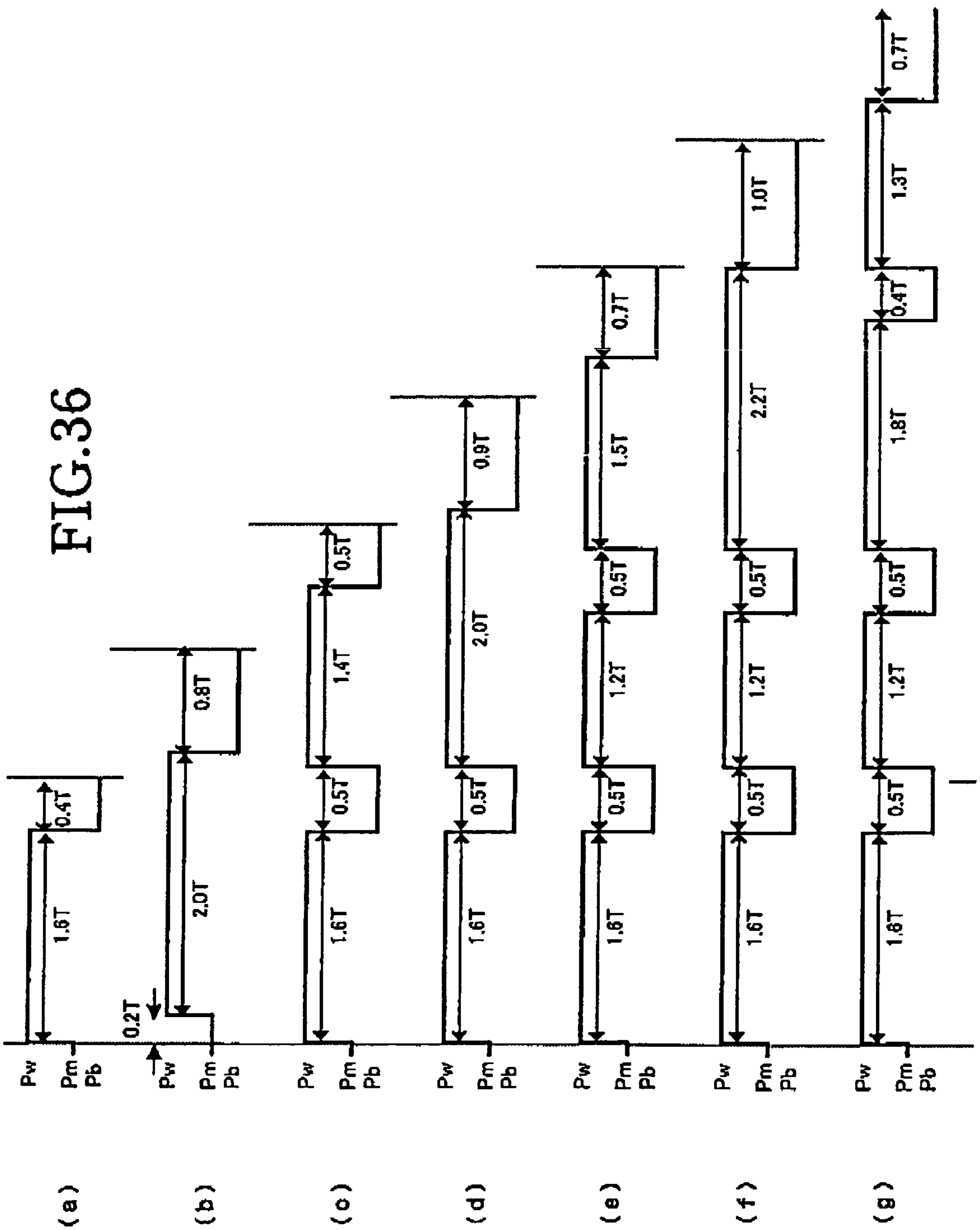
FIG. 36 is a diagram showing a recording strategy used for modulating the power of a laser beam in Working Example 6.
Figure 37:
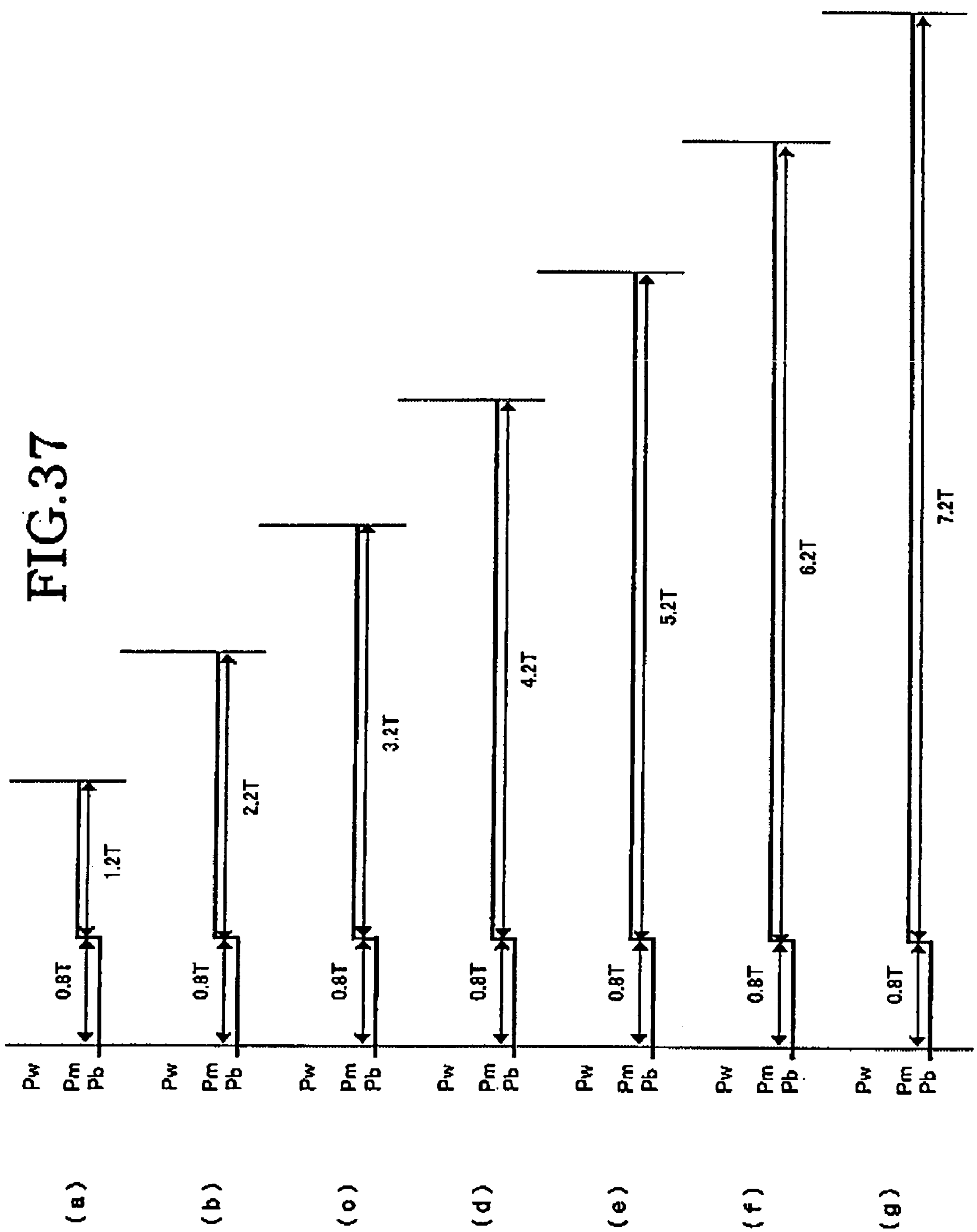
FIG. 37 is a diagram showing a recording strategy used for modulating the power of a laser beam in Working Example 6.

Then, random signals including a 2T signal to an 8T signal were recorded in the first recording film of the optical recording medium sample #2 and the second recording film, thus recorded random signals including a 2T signal to an 8T signal were reproduced and jitter of the reproduced signals was measured in the manner of the Working Example 1, except that the power of a laser beam was modulated according to the recording strategy shown in FIGS. 36 and 37, the bottom power Pb was set to 1.0 mW and the intermediate power Pm was set to 2.5 mW, respectively, and the recording power Pw of the laser beam was varied between 5.6 mW and 6.6 mW in 0.2 mW increments.

Figure 38:
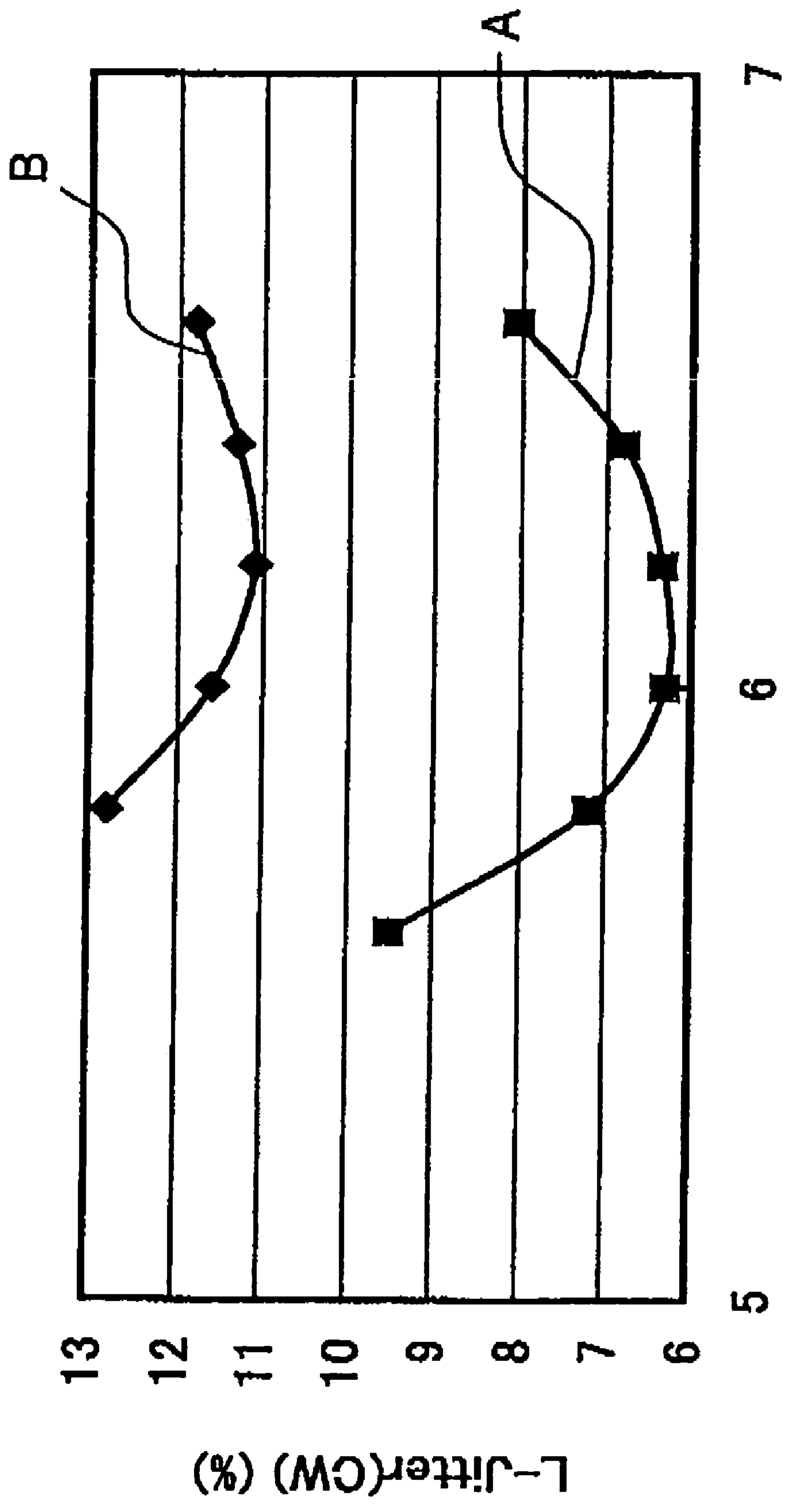
FIG. 38 is graph showing the relationship between jitter of a reproduced signal and a recording power Pw of a laser beam used for recording data, which were measured in Working Example 6 and Comparative Example 6.

The results of the measurement are shown by the curve A of FIG. 38.

Comparative Example 6

Figure 39:
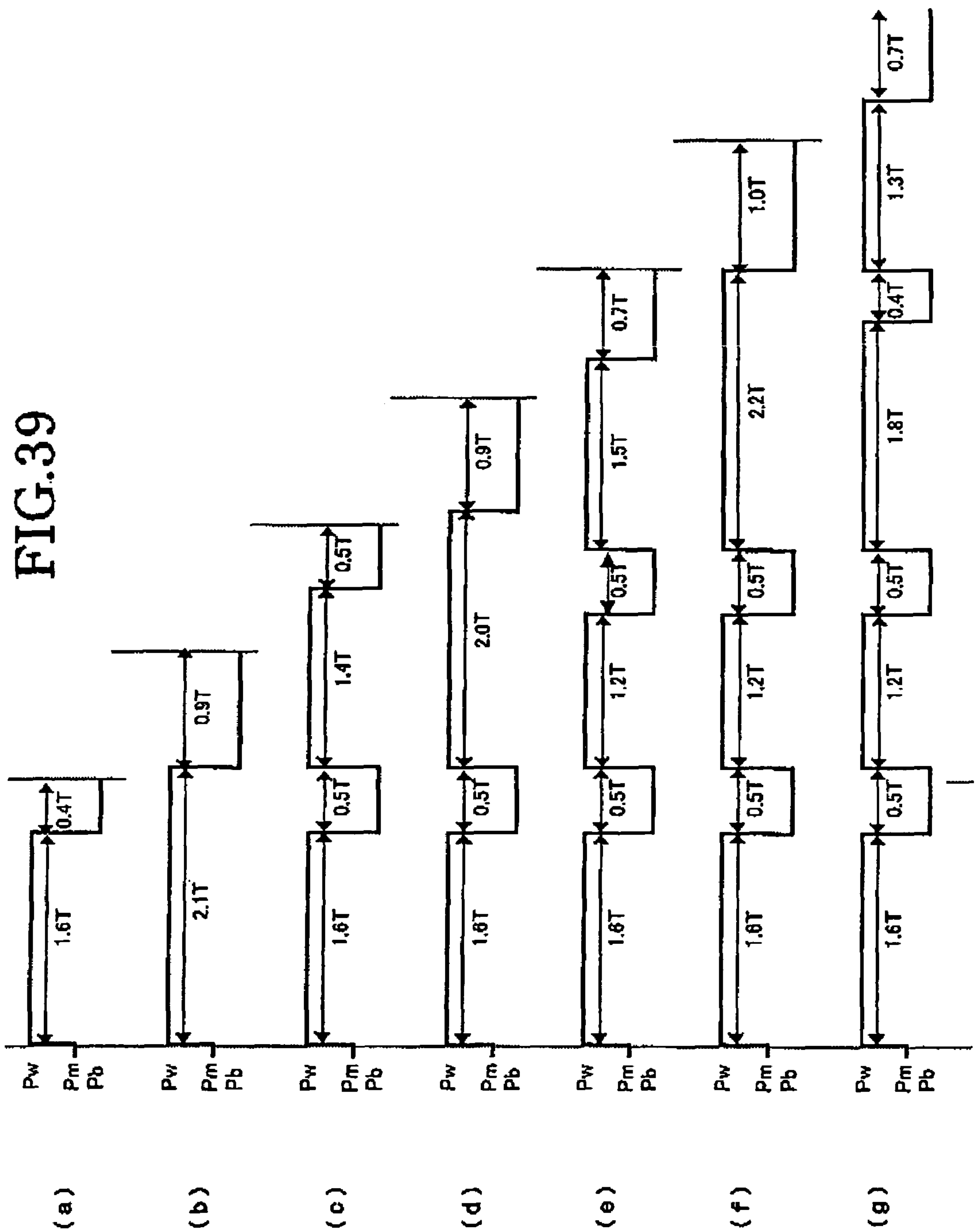
FIG. 39 is a diagram showing a recording strategy used for modulating the power of a laser beam in Comparative Example 6.
Figure 40:
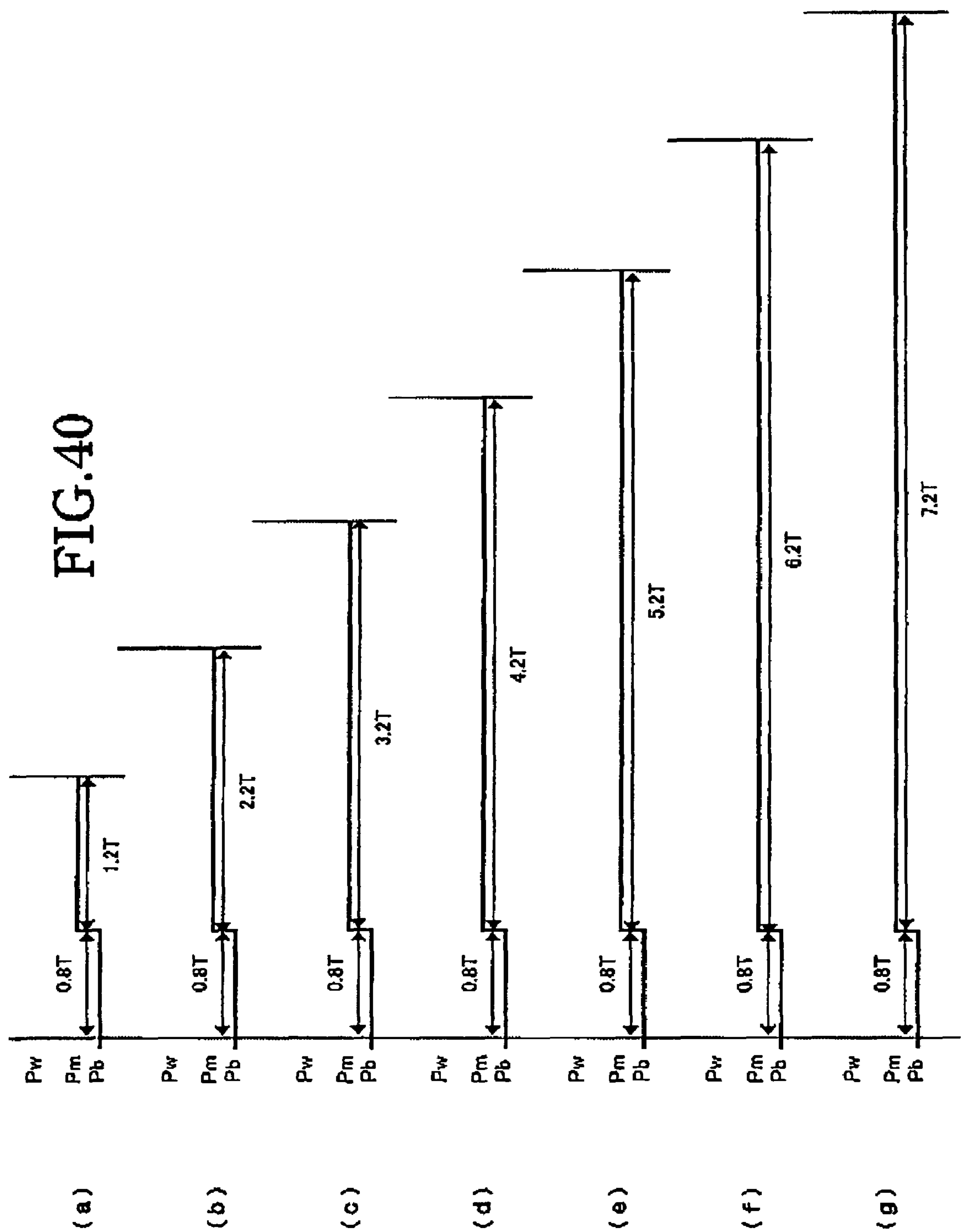
FIG. 40 is a diagram showing a recording strategy used for modulating the power of a laser beam in Comparative Example 6.

Random signals including a 2T signal to an 8T signal were recorded in the first recording film of the optical recording medium sample #2 and the second recording film, thus recorded random signals including a 2T signal to an 8T signal were reproduced and jitter of the reproduced signals was measured in the manner of the Working Example 6, except that the power of a laser beam was modulated according to the recording strategy shown in FIGS. 39 and 40, the bottom power Pb was set to 1.0 mW and the intermediate power Pm was set to 2.5 mW, respectively, and the recording power Pw of the laser beam was varied between 5.6 mW and 6.6 mW in 0.2 mW increments.

The results of the measurement are shown by the curve B of FIG. 38.

As shown in FIG. 38, it was observed that even in the case where the power of a laser beam was modulated using a single pulse and a recording mark having a length corresponding to a 3T signal was to be formed in a single recording layer including a reflective layer, when a recording mark having a length corresponding to a 3T signal was formed in the first L1 recording film of the optical recording medium sample #1 and the second L1 recording film, in the case where the power of the laser beam was modulated so that the time of raising the power of the laser beam to the recording power Pw was delayed by 0.2T relative to the time of raising the power of the laser beam to the recording power Pw when a recording mark having a length corresponding to a 2T signal, a 4T signal to an 8T signal and a 3T signal was to be formed, the jitter of reproduced signal was, as shown in FIGS. 39 and 40, greatly reduced in comparison with the case in which the power of the laser beam was modulated so that the time of raising the power of the laser beam to the recording power Pw was the same as the time of raising the power of the laser beam to the recording power Pw when a recording mark having a length corresponding to any of a 2T signal to an 8T signal was to be formed therein.

Therefore, it was proven that not only in the case where data were to be recorded in the L1 recording layer close to the light transmission layer of an optical recording medium in which the L0 recording layer and the L1 recording layer were included but also in the case where random signals including a 2T signal to an 8T signal were to be recorded in the single recording layer including a reflective layer, the jitter of the reproduced signal was greatly reduced when the power of the laser beam was modulated using a single pulse and a recording mark having a length corresponding to a 3T signal was to be formed, by modulating the power of the laser beam so that the time of raising the power of the laser beam to the recording power Pw was delayed by 0.2T relative to the time of raising the power of the laser beam to the recording power Pw when a recording mark having a length corresponding to a 2T signal and a 4T signal to an 8T signal was to be formed.

The present invention has thus been shown and described with reference to a specific embodiment and Working Examples. However, it should be noted that the present invention is in no way limited to the details of the described arrangements but changes and modifications may be made without departing from the scope of the appended claims.

For example, although the above described embodiments and Working Examples were explained with respect to the case where the power of a laser beam is modulated using a single pulse and a recording mark having a length corresponding to a 3T signal to a 6T signal is to be formed, it is possible to modulate the power of the laser beam using a single pulse and record a recording mark having a length corresponding to a 7T signal and an 8T signal, by delaying the time of raising the power of the laser beam to the recording power Pw relative to the time of raising the power of the laser beam to the recording power Pw when a recording mark having a length corresponding to a 2T signal is to be formed according to the recording linear velocity.

Further, in the above described the recording strategy shown in FIGS. 12 and 13, shown in FIGS. 31 and 32 and shown in FIGS. 36 and 37, when the power of the laser beam is modulated using a single pulse and a recording mark having a length corresponding to a 3T signal is to be formed, the time of raising the power of the laser beam to the recording power Pw is delayed by 0.2T relative to the time of raising the power of the laser beam to the recording power Pw when a recording mark having a length corresponding to a 2T signal is to be formed, in the above described the recording strategy shown in FIGS. 14 and 15, when the power of the laser beam is modulated using a single pulse and a recording mark having a length corresponding to a 4T signal is to be formed, the time of raising the power of the laser beam to the recording power Pw is delayed by 0.3T relative to the time of raising the power of the laser beam to the recording power Pw when a recording mark having a length corresponding to a 2T signal is to be formed, in the recording strategy shown in FIGS. 16 and 17, when the power of a laser beam is modulated using a single pulse and a recording mark having a length corresponding to a 5T signal is to be formed, the time of raising the power of the laser beam to the recording power Pw is delayed by 0.3T relative to the time of raising the power of the laser beam to the recording power Pw when a recording mark having a length corresponding to a 2T signal is to be formed, and in the recording strategy as shown in FIGS. 18 and 19, when the power of a laser beam is modulated using a single pulse and a recording mark having a length corresponding to a 6T signal is to be formed, the time of raising the power of the laser beam to the recording power Pw is delayed by 0.4T relative to the time of raising the power of the laser beam to the recording power Pw when a recording mark having a length corresponding to a 2T signal is to be formed; however. how long the time of raising the power of the laser beam to the recording power Pw is delayed may be appropriately determined according to the kind of the optical recording medium and is not limited to the above described embodiments and Working Examples.

Furthermore, in the above described embodiments and Working Examples, when the power of a laser beam is modulated using a single pulse and a recording mark having a length corresponding to a 3T signal is to be formed, when the power of a laser beam is modulated using a single pulse and a recording mark having a length corresponding to a 4T signal is to be formed, when the power of a laser beam is modulated using a single pulse and a recording mark having a length corresponding to a 5T signal is to be formed, and when the power of a laser beam is modulated using a single pulse and a recording mark having a length corresponding to a 6T signal is to be formed, the time of raising the power of the laser beam to the recording power Pw is delayed relative to the time of raising the power of the laser beam to the recording power Pw when a recording mark having a length corresponding to a 2T signal and the term during which the power of the laser beam is set to a recording power Pw is short; however, it is not absolutely necessary for the time of raising the power of the laser beam to the recording power Pw to be delayed relative to the time of raising the power of the laser beam to the recording power Pw when a recording mark having a length corresponding to a 2T signal and the term during which the power of a laser beam is set to the recording power Pw is short.

Further, in the above embodiments, when data are to be recorded in the L0 recording layer 23 or the recording L1 layer 33 of the optical recording layer 10, the power of a laser beam is modulated according to the recording strategy as shown in FIGS. 12 and 13, the recording strategy as shown in FIGS. 14 and 15, the recording strategy as shown in FIGS. 16 and 17, or the recording strategy as shown in FIGS. 18 and 19; however, since the L0 layer 20 includes the reflective film 21 so that it can promptly transmit heat generated in a region where a recording mark is formed by exposure to a laser beam to other regions by means of the reflective film 21, it is not absolutely necessary for the power of the laser beam to be modulated according to the recording strategy shown in FIGS. 12 and 13, the recording strategy shown in FIGS. 14 and 15, the recording strategy shown in FIGS. 16 and 17, or the recording strategy shown in FIGS. 18 and 19, when data are to be recorded in the L0 recording layer 23.

Furthermore, in the above described embodiments, although the first L0 recording film 23*a* and the second L0 recording film 23*b* of the L0 layer 23 are formed in contact with each other, it is not absolutely necessary to form the first L0 recording film 23*a* and the second L0 recording film 23*b* of the L0 layer 20 in contact with each other but it is sufficient for the second L0 recording film 23*b* to be so located in the vicinity of the first L0 recording film 23*a* as to enable formation of a mixed region including the primary component element of the first L0 recording film 23*a* and the primary component of the second L0 recording film 23*b* when the region is irradiated with a laser beam. Furthermore, one or more other films such as a dielectric film may be interposed between the first L0 recording film 23*a* and the second L0 recording film 23*b*.

Moreover, in the above described embodiments, although the first L1 recording film 33*a* and the second L1 recording film 33*b* of the L1 layer 30 are formed in contact with each other it is not absolutely necessary to form the first L1 recording film 33*a* and the second L1 recording film 33*b* of the L1 layer 30 in contact with each other but it is sufficient for the second L1 recording film 33*b* to be so located in the vicinity of the first L1 recording film 33*a* as to enable formation of a mixed region including the primary component element of the first L1 recording film 33*a* and the primary component element of the second L1 recording film 33*b* when the region is irradiated with a laser beam. Further, one or more other films such as a dielectric film may be interposed between the first L1 recording film 33*a* and the second L1 recording film 33*b*.

Further, in the above described embodiments, although each of the first L0 recording film 23*a* and the first L1 recording film 33*a* contains Si as a primary component, it is not absolutely necessary for each of the first L0 recording film 23*a* and the first L1 recording film 33*a* to contain Si as a primary component and each of the first L0 recording film 23*a* and the first L1 recording film 33*a* may contain an element selected from the group consisting of Ge, Sn, Mg, In, Zn, Bi and Al instead of Si.

Moreover, in the above described embodiments, although each of the second L0 recording film 23*b* and the second L1 recording film 33*b* contains Cu as a primary component, it is not absolutely necessary for each of the second L0 recording film 23*b* and the second L0 recording film 33*b* to contain Cu as a primary component and each of the second L0 recording film 23*b* and the second L0 recording film 33*b* may contain an element selected from the group consisting of Al, Zn, Ti, Ag and different from the element contained in the fist L0 recording film 23*a* or the first L1 recording film 33*a* as a primary component instead of Cu.

Furthermore, in the above described embodiments, although the first L0 recording film 23*a* is disposed on the side of the light transmission layer 13 and the second L0 recording film 23*b* is disposed on the side of the support substrate 11, it is possible to dispose the first L0 recording film 23*a* on the side of the support substrate 11 and the second L0 recording film 23*b* on the side of the light transmission layer 13.

Moreover, in the above described embodiments, although the first L1 recording film 33*a* is disposed on the side of the light transmission layer 13 and the second L1 recording film 33*b* is disposed on the side of the support substrate 11, it is possible to dispose the first L1 recording film 33*a* on the side of the support substrate 11 and the second L1 recording film 33*b* on the side of the light transmission layer 13.

Further, in the above described embodiments, although the L1 recording layer 33 includes the first L1 recording film 33*a* containing Si as a primary component and the second L1 recording film 33*b* containing Cu as a primary component similarly to the L0 recording layer 23, it is not absolutely necessary for the L1 recording layer 33 to include the first L1 recording film 33*a* containing Si as a primary component and the second L1 recording film 33*b* containing Cu as a primary component, the L1 recording layer 33 may be constituted as a single recording film.

Furthermore, in the above described embodiments, although the optical recording medium 10 includes the L0 layer 20 and the L1 layer 30 and includes two recording layers, the present invention is applicable to a case where data are to be recorded in an optical recording medium which includes three or more recording layers. Further the present invention is applicable to case where data are to be recorded in an optical recording medium which includes a single recording layer as described in Working Example 6.

Further, although the above described embodiments and Working Examples were explained with respect to the case where data are to be recorded in the write-once type optical recording medium, the present invention is not limited to the case where data are to be recorded in the write-once type optical recording medium and can be applied to case where data are to be recorded in the data rewritable type optical recording medium. The present invention can be widely applied to cases where data are to be recorded in an optical recording medium regardless of the layer structure of the optical recording medium or the kind of the recording film.

According to the present invention, it is possible to provide a method for recording data in a write-once type optical recording medium and an apparatus for recording data in a write-once type optical recording medium which can reduce jitter of the reproduced signal.

What is claimed is:

1. A method for recording data in an optical recording medium wherein data are recorded in an optical recording medium including a light transmission layer and at least one recording layer by projecting a laser beam whose power is pulse-like modulated between at least a recording power and a bottom power lower than the recording power onto the optical recording medium from a side of the light transmission layer and forming recording marks having different lengths, which method for recording data in an optical recording medium is constituted so that when a recording mark having a longer length than that of the shortest recording mark is to be formed in the at least one recording layer by modulating the power of a laser beam using a single pulse, a time of raising the power of the laser beam to the recording power is delayed relative to a time of raising the power of the laser beam to the recording power when the shortest recording mark is to be formed.

2. A method for recording data in an optical recording medium in accordance with claim 1, wherein the power of a laser beam is modulated between the recording power, the bottom power and an intermediate power lower than the recording power and higher than the bottom power.

3. A method for recording data in an optical recording medium in accordance with claim 1, wherein the optical recording medium comprises a plurality of recording layers.

4. A method for recording data in an optical recording medium in accordance with claim 3, wherein at least a recording layer other than a recording layer farthest from the light transmission layer among the plurality of recording layers comprises a first recording film containing an element selected from a group consisting of Si, Ge, Sn, Mg, In, Zn, Bi and Al as a primary component and a second recording film disposed in the vicinity of the first recording film and containing an element selected from a group consisting of Cu, Al, Zn, Ti and Ag and different from the element contained as a primary component in the first recording film as a primary component and the element contained in the first recording film as a primary component and the element contained in the second recording film as a primary component mix with each other when a laser beam is projected onto the optical recording medium, thereby forming a recording mark.

5. A method for recording data in an optical recording medium in accordance with claim 4, wherein the first recording film contains Si as a primary component and the second recording film contains Cu as a primary component.

6. A method for recording data in an optical recording medium in accordance with claim 4, wherein the second recording film is formed so as to be in contact with the first recording film.

7. A method for recording data in an optical recording medium in accordance with claim 1, wherein data are recorded in the optical recording medium by projecting a laser beam having a wavelength of 350 nm to 450 nm onto the optical recording medium.

8. A method for recording data in an optical recording medium in accordance with claim 2, wherein data are recorded in the optical recording medium by projecting a laser beam having a wavelength of 350 nm to 450 nm onto the optical recording medium.

9. A method for recording data in an optical recording medium in accordance with claim 1, wherein data are recorded in the optical recording medium by employing an objective lens and a laser beam whose numerical aperture NA and wavelength $\lambda$ satisfy $\lambda/NA \leqq 640$ nm, and projecting a laser beam onto the optical recording medium via the objective lens.

10. A method for recording data in an optical recording medium in accordance with claim 2, wherein data are recorded in the optical recording medium by employing an objective lens and a laser beam whose numerical aperture NA and wavelength $\lambda$ satisfy $\lambda/NA \leqq 640$ nm, and projecting a laser beam onto the optical recording medium via the objective lens.

11. An apparatus for recording data in an optical recording medium, which comprises a laser beam source for emitting a laser beam, an objective lens, a laser power controlling means for pulse-like modulating a power of a laser beam emitted from a laser beam source between a recording power and a bottom power lower than the recording power, a memory and a control unit for controlling overall operation, the control unit being constituted so as to create, based on ID data recorded in the optical recording medium and stored in the memory, a recording strategy determined so that when a recording mark having a longer length than that of the shortest recording mark is to be formed in a recording layer of the optical recording medium by modulating the power of a laser beam using a single pulse, a time of raising the power of the laser beam to the recording power is delayed relative to a time of raising the power of the laser beam to the recording power when the shortest recording mark is to be formed, thereby forming a recording mark in the recording layer.

12. An apparatus for recording data in an optical recording medium in accordance with claim 11, wherein the laser power controlling means is constituted so as to modulate the power of a laser beam between the recording power, the bottom power and an intermediate power lower than the recording power and higher than the bottom power.

13. An apparatus for recording data in an optical recording medium in accordance with claim 11, wherein the laser beam source is constituted so as to emit a laser beam having a wavelength of 350 nm to 450 nm.

14. An apparatus for recording data in an optical recording medium in accordance with claim 12, wherein the laser beam source is constituted so as to emit a laser beam having a wavelength of 350 nm to 450 nm.

15. An apparatus for recording data in an optical recording medium in accordance with claim 11, wherein a wavelength $\lambda$ of the laser beam emitted from a laser beam source and a numerical aperture NA of the objective lens satisfy $\lambda/NA \leqq 640$ nm.

16. An apparatus for recording data in an optical recording medium in accordance with claim 12, wherein a wavelength $\lambda$ of the laser beam emitted from a laser beam source and a numerical aperture NA of the objective lens satisfy $\lambda/NA \leqq 640$ nm.

* * * * *